(12) United States Patent
Smith et al.

(10) Patent No.: US 11,088,921 B2
(45) Date of Patent: Aug. 10, 2021

(54) SYSTEMS AND METHOD FOR PROVIDING AN ONTOGENESIS EMERGENCE AND CONFIDENCE ENGINE

(71) Applicant: Eagle Technology, LLC, Melbourne, FL (US)

(72) Inventors: Wayne B. Smith, Melbourne Beach, FL (US); Ronda R. Henning, West Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 16/563,657

(22) Filed: Sep. 6, 2019

(65) Prior Publication Data

US 2021/0075686 A1   Mar. 11, 2021

(51) Int. Cl.
*H04L 12/24* (2006.01)
*G06N 5/02* (2006.01)

(52) U.S. Cl.
CPC ............. *H04L 41/145* (2013.01); *G06N 5/02* (2013.01); *H04L 41/147* (2013.01)

(58) Field of Classification Search
CPC ........ H04L 41/145; H04L 41/147; G06N 5/02
See application file for complete search history.

(56) References Cited

U.S. PATENT DOCUMENTS

| | | | |
|---|---|---|---|
| 7,756,804 B2 | 7/2010 | Bloom et al. | |
| 7,882,052 B2 | 2/2011 | Szathmary et al. | |
| 10,243,993 B2 | 3/2019 | Smith et al. | |
| 2018/0152469 A1 | 5/2018 | Smith et al. | |
| 2018/0212829 A1* | 7/2018 | Reid | H04L 41/0883 |
| 2018/0295063 A1* | 10/2018 | Flores | H04L 61/1511 |
| 2019/0163517 A1* | 5/2019 | Fontoura | G06F 9/5077 |

(Continued)

OTHER PUBLICATIONS

Braha et al: "The Design Process: Properties, Paradigms, and Structure," IEEE Transactions on Systms, Man, and Cybernetics—Part A: Systems and Humans, vol. 27, No. 2, Mar. 1997.

(Continued)

*Primary Examiner* — Tonia L Dollinger
*Assistant Examiner* — Johad K Boustany
(74) *Attorney, Agent, or Firm* — Fox Rothschild LLP; Robert J. Sacco; Carol E. Thorstad-Forsyth

(57) ABSTRACT

Systems and methods for controlling operations of a Computer System ("CS"). The methods comprise: collecting information about events occurring in CS; performing automated ontogenesis operations using the collected information to determine a context of a given situation associated with CS using stored ontogenetic knowledge, define parameters for different sets of actions that could occur in the context of the given situation, simulate the sets of actions to generate a set of simulation results defining predicted consequences resulting from performance of behaviors by nodes, determine a confidence value for each simulation result that indicates a level of confidence that a successful outcome will result if action(s) associated with the simulation result are performed by CS, and analyze the confidence values to identify a simulation result with the best confidence level; and using the parameters associated with the best simulation result to control and optimize performance of CS.

24 Claims, 31 Drawing Sheets

(56) References Cited

U.S. PATENT DOCUMENTS

2019/0182105 A1* 6/2019 Stephens .............. H04L 67/125
2019/0342183 A1* 11/2019 Nunna ................... G06N 20/00
2019/0347148 A1* 11/2019 Gomes Pereira ..... G06F 11/079

OTHER PUBLICATIONS

Lungarella et al.: "Developmental robotics: a survey," Connection Science, vol. 15, No. 4, Dec. 2003, 151-190, Taylor & Francis Group.

* cited by examiner

| Identity Parameter | Description | Technique |
|---|---|---|
| IP Address | 32 bit number, Class C 254 Addresses | IP Header Manipulation Packet Data Manipulation |
| MAC Address | 6 Bytes - 281,474,976,710,656 Addresses First 3 Bytes - (OUI), Last 3 Bytes – NIC Specific | Ethernet Header Manipulation |
| Net/Subnet | Class A, B, or C Addresses | Cross Stream Fragmentation |
| TCP Sequence # | Make TCP Sequence numbers random. | TCP Header Manipulation |
| Port | 1 - 65,535 (ex. 2957) | TCP Header Manipulation |

FIG. 13

Mission Plan 2100

Variable Identity Parameter:  Mission Model 2102
IP Address
- Network Device $ND_1$
    True Value $TV_1 = 175.18.252.1$    Active, Timeslot $TS_2$
    False Value $FV_{1-1} = 176.18.252.1$    Empty
    False Value $FV_{1-2} = 175.18.252.2$    Active, Timeslot $TS_5$
    False Value $FV_{1-3} = 176.18.253.1$    Active, Timeslot $TS_1$
    False Value $FV_{1-4} = 177.18.252.2$    Active, Timeslot $TS_4$
    False Value $FV_{1-5} = 178.18.254.1$    Empty
    False Value $FV_{1-6} = 179.20.252.3$    Empty
    False Value $FV_{1-7} = 177.18.262.5$    Active, Timeslot $TS_3$
    False Value $FV_{1-8} = 179.12.263.7$    Empty
- Network Device $ND_2$
    True Value $TV_2 = 172.14.236.7$    Active, Timeslot $TS_5$
    False Value $FV_{2-1} = 176.18.252.1$    Active, Timeslot $TS_1$
    False Value $FV_{2-2} = 178.18.254.1$    Active, Timeslot $TS_2$
    False Value $FV_{2-3} = 179.20.252.3$    Active, Timeslot $TS_3$
    False Value $FV_{2-4} = 179.12.263.7$    Active, Timeslot $TS_4$
    False Value $FV_{2-5} = 172.16.242.9$    Empty
    False Value $FV_{2-6} = 170.18.251.3$    Empty
    False Value $FV_{2-7} = 170.20.242.1$    Empty
    False Value $FV_{2-8} = 172.14.262.1$    Empty Shadow Networking Activities:
Empty: Drop Packet, Forward To IA - Log Packet Activity
Old: Forward To IA - Log Packet Activity, Send Response

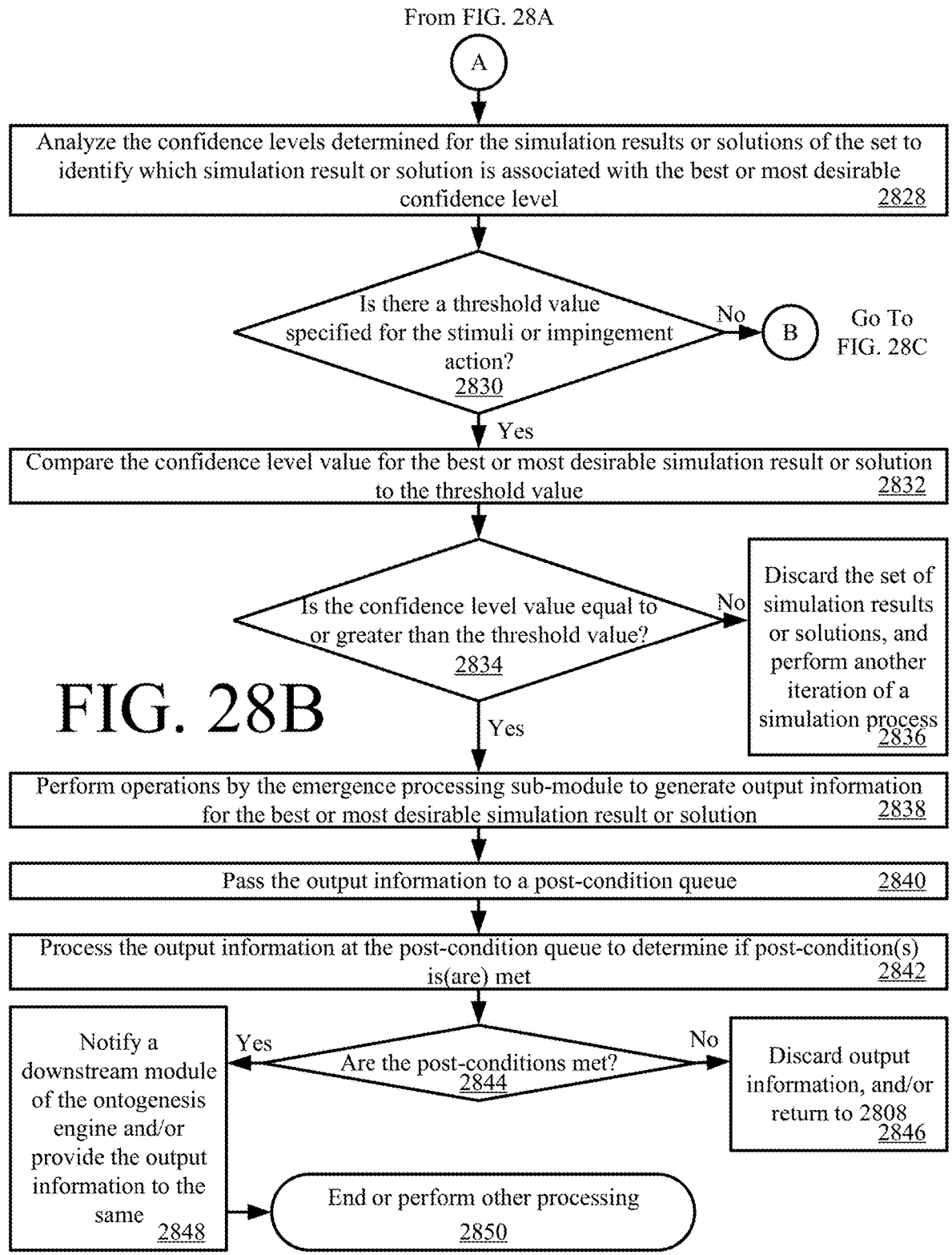

Packet 2900

| Unique Identifier 2902 | Metadata 2904 | Simulation Result Information 2906 |
|---|---|---|

FIG. 29

Packet 3000

| Unique Identifier 2902 | Metadata 2904 | Confidence Level Information 3002 | Simulation Result Information 2906 |
|---|---|---|---|

FIG. 30

Packet 3100

| Unique Identifier 2902 | Metadata 2904 | Confidence Level Information 3002 | Best Solution Indicator 3102 | Simulation Result Information 2906 |
|---|---|---|---|---|

FIG. 31

SYSTEMS AND METHOD FOR PROVIDING AN ONTOGENESIS EMERGENCE AND CONFIDENCE ENGINE

BACKGROUND

Statement of the Technical Field

The present disclosure relates to computer systems. More particularly, the present disclosure concerns methods and systems for providing an ontogenesis emergence and confidence engine.

Description of the Related Art

Many organizations are conducting research and experimentation related to cognitive engines. The idea is to limit, minimize and/or augment human involvement in data correlation and increase computer and/or computationally intelligent contributions for routine or mundane tasks such as scrolling or sifting through large volumes of real time data.

Conventional cognitive engines provide a quantitative analysis of data based on pre-defined rules generated from static models of systems or behavior. Despite the advantages of such cognitive solutions, they suffer from certain drawbacks. For example, these conventional cognitive engines require that the models be re-trained each time new data is input into the system. The conventional cognitive engines also have restricted context sensitivity and provide little temporal context.

SUMMARY

The present disclosure concerns systems and methods for controlling operations of a computer system. The methods comprise: collecting, by at least one computing device of the computer system, information about events occurring in the computer system; and performing automated ontogenesis operations by the computing device using the collected information to (A) determine a context of a given situation associated with the computer system using the stored ontogenetic knowledge, (B) define parameters for a plurality of different sets of actions that could occur in the context of the given situation, and (C) simulate the sets of actions to generate a set of simulation results defining predicted consequences resulting from the performance of certain behaviors by nodes of the computer system. The methods also comprise: determining a confidence value for each simulation result that indicates a level of confidence that a successful outcome will result if one or more actions associated with the simulation result are performed by the computer system; analyzing the confidence values to identify a simulation result of the set of simulation results that is associated with the best confidence level; considering the identified simulation result as a best simulation result; and using the parameters associated with the best simulation result to optimize control and performance of the computer system (e.g., by controlling operations of the computing system where the operation include, but are not limited to, control operations, verification or validation operations, and/or response operations).

In some scenarios, the information that is collected by the at least one computing device may specify at least one of a new object, a new relationship between two or more objects, a new simulation result and/or a new operating parameter value for a network node or system.

Additionally or alternatively, the methods also comprise: processing the set of simulation results to determine if one or more pre-conditions are met; and/or determining if a threshold value is specified for a stimuli or impingement action associated with the best simulation result. Output information is generated for the best simulation result when a determination is made that a threshold value is not specified for the stimuli or impingement action associated with the best simulation result. The output information may be processed to determine whether one or more post-conditions are met. The output information may be discarded when the one or more post-conditions are not met. The output information may be used to facilitate the control and optimization of the computer system operations when the one or more post-conditions are met.

In those or other scenarios, the methods comprise: comparing the confidence value for the best simulation result to a threshold value when a determination is made that a threshold value is specified for the stimuli or impingement action associated with the best simulation result. The set of simulation results may be discarded when the confidence value is less than the threshold value. Output information may be generated for the best simulation result when the confidence level is equal to or greater than the threshold value. The output information may be processed to determine if one or more post-conditions are met. The set of simulation results are discarded when a determination is made that the one or more post-conditions are not met. The output information may be used to facilitate the control of the computer system operations when a determination is made that the one or more post-conditions are met.

BRIEF DESCRIPTION OF THE DRAWINGS

The present solution will be described with reference to the following drawing figures, in which like numerals represent like items throughout the figures.

FIG. 13 is a table that is useful for understanding some of the types of IDPs that can be modified.

FIG. 21 is a schematic illustration of an exemplary mission plan.

FIGS. 28A-28C (collectively referred to as "FIG. 28") provide a flow diagram of a method for performing ontogenesis emergence and confidence.

FIGS. 29-31 provide illustrations of illustrative packet architectures.

DETAILED DESCRIPTION

The present solution is described with reference to the attached figures. The figures are not drawn to scale and they are provided merely to illustrate the instant solution. Several aspects of the present solution are described below with reference to example applications for illustration. It should be understood that numerous specific details, relationships, and methods are set forth to provide a full understanding of the present solution. One having ordinary skill in the relevant art, however, will readily recognize that the present solution can be practiced without one or more of the specific details or with other methods. In other instances, well-known structures or operations are not shown in detail to avoid obscuring the present solution. The present solution is not limited by the illustrated ordering of acts or events, as some acts may occur in different orders and/or concurrently with other acts or events. Furthermore, not all illustrated acts or events are required to implement a methodology in accordance with the present solution.

It should also be appreciated that the terminology used herein is for the purpose of describing particular embodiments only and is not intended to be limiting of the present solution. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Further, unless otherwise defined, all terms (including technical and scientific terms) used herein have the same meaning as commonly understood by one of ordinary skill in the art to which this solution belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Identity Agile Computer Network

Figure 1:
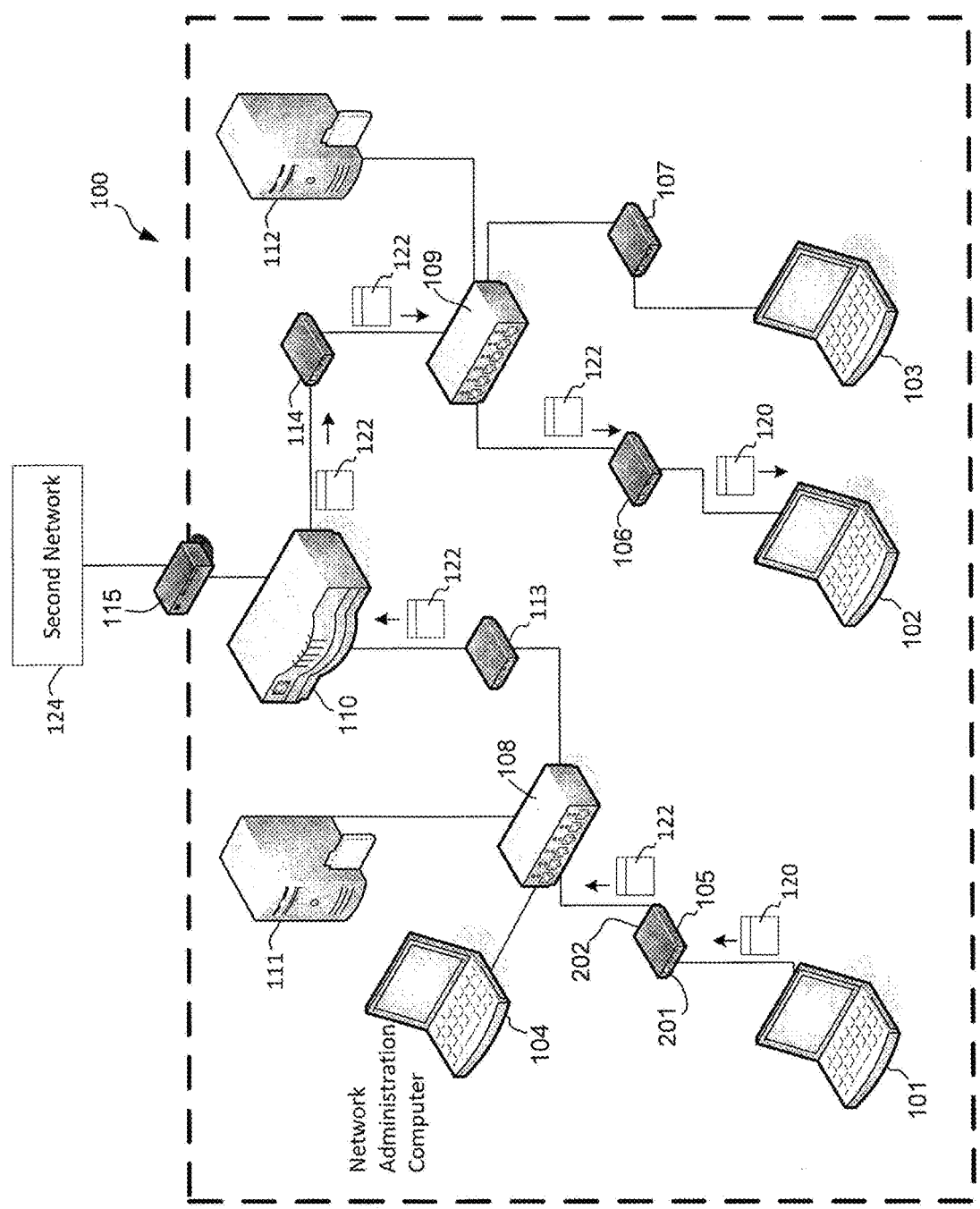
FIG. 1 is an example of a computer network.

Referring now to FIG. 1, there is shown a diagram of an exemplary network 100 which includes a plurality of computing devices. The computing devices can include client computers 101-103, Network Administration Computer ("NAC") 104, servers 111, 112, network hubs 108, 109, router 110, and a bridge 115. The client computers can be any type of computing device which might require network services, such as a conventional tablet, notebook, laptop or desktop computer. The router 110 can be a conventional routing device that forwards data packets between computer networks. The hubs 108, 109 are conventional hub devices (e.g. an Ethernet hub) as are well known in the art. Servers 111, 112 can provide various computing services utilized by client computers 101-103. For example, the servers 111, 112 can be file servers which provide a location for shared storage of computer files used by client computers 101-103.

The communication media for the network 100 can be wired, wireless or both, but shall be described herein as a wired network for simplicity and to avoid obscuring the present solution. The network will communicate data using a communication protocol. As is well known in the art, the communication protocol defines the formats and rules used for communicating data throughout the network. The network in FIG. 1 can use any communication protocol or combination of protocols which is now known or known in the future. For example, the network can use the well known Ethernet protocol suite for such communications. Alternatively, the network can make use of other protocols, such as the Internet Protocol Suite (often referred to as TCP/IP), SONET/SDH, or Asynchronous Transfer Mode ("ATM") communication protocols. In some scenarios, one or more of these communication protocols can be used in combination. Although one network topology is shown in FIG. 1, the present solution is not limited in this regard. Instead, any type of suitable network topology can be used, such as a bus network, a star network, a ring network or a mesh network.

The present solution generally concerns a method for communicating data in a computer network (e.g., in computer network 100), where data is communicated from a first computing device to a second computing device. Computing devices within the network are represented with multiple IDPs. The terms "identity parameters" and "IDPs", as used herein, can include items such as an IP address, a Media Access Control ("MAC") address, ports and so on. However, the present solution is not limited in this regard, and IDPs can also include a variety of other information which is useful for characterizing a network node. The various types of IDPs contemplated herein are discussed below in further detail. The present solution involves the use of dynamically controlled behavior models and/or Moving Target Technology ("MTT") to manipulate one or more of such IDPs for one or more computing devices within the network. This technique disguises communication patterns and network address of such computing devices. The manipulation of IDPs as described herein is generally performed in conjunction with data communications in the network, i.e., when data is to be communicated from a first computer in the network (e.g. client computer 101) to a second computer in the network (e.g., client computer 102). Accordingly, IDPs that are manipulated can include those of a source computing device (the device from which the data originated) and the destination computing device (the device to which the data is being sent). The set of IDPs that are communicated is referred to herein as an IDP set. This concept is illustrated in FIG. 1, which shows that an IDP set 120 is transmitted by client computer 101 as part of a data packet (not shown).

The process according to the inventive arrangements involves selectively modifying at a first location within the computer network, values contained in a data packet or datagram which specify one or more identify parameters of a source and/or destination computing device. The IDPs are modified in accordance with a mission plan. The location where such modification is performed will generally coincide with the location of one of the modules 105-107, 113, 114. Referring once again to FIG. 1, it can be observed that modules 105, 106, 107, 113, 114 are interposed in the network between the various computing devices which comprise nodes in such network. In these locations, the modules intercept data packet communications, perform the necessary manipulations of IDPs, and retransmit the data packets along a transmission path. In alternative scenarios, the modules 105, 106, 107, 113, 114 can perform a similar function, but can be integrated directly into one or more of the computing devices. For example, the modules could be integrated into client computers 101, 102, 103, servers 111, 112, hubs 108, 109 and/or within router 110.

Figure 2:
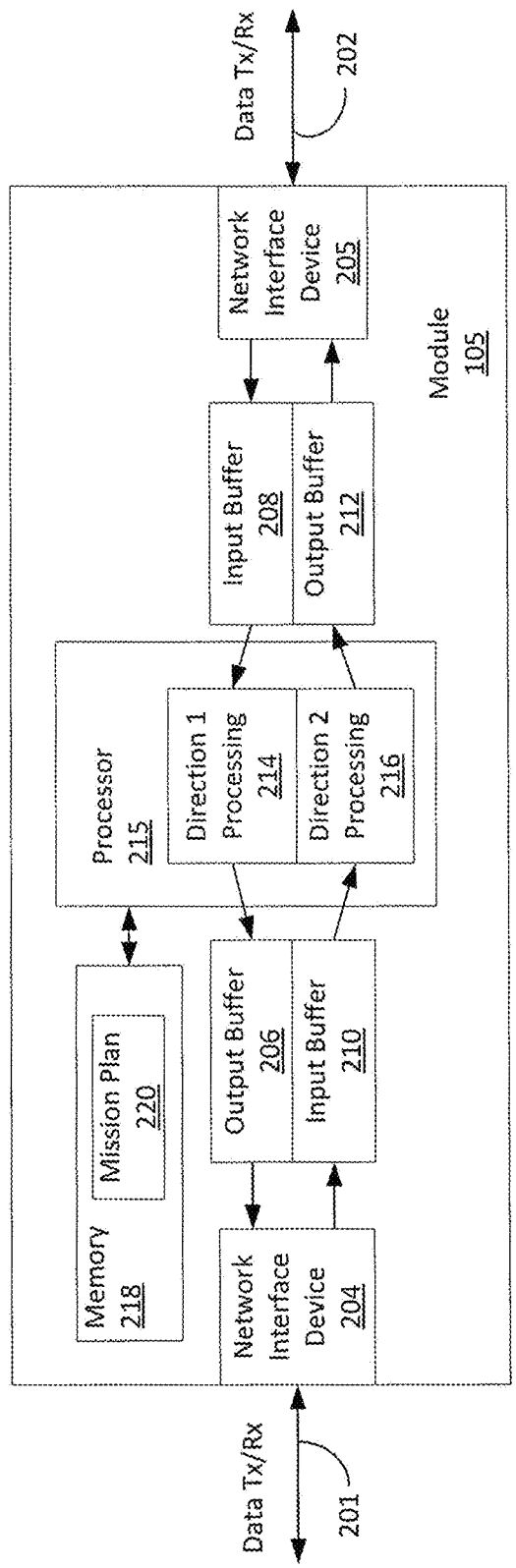
FIG. 2 is an example of a module that can be used in the present solution for performing certain manipulations of IDentity Parameters ("IDPs").

An example of a functional block diagram of a module 105 is shown in FIG. 2. Modules 106-107, 113, 114 can have a similar functional block diagram, but it should be understood that the present solution is not limited in this regard.

As shown in FIG. 2, the module 105 has at least two data ports 201, 202, each of which can correspond to a respective network interface device 204, 205. Data received at port 201 is processed at network interface device 204 and temporarily stored at an input buffer 210. The processor 215 accesses the input data packets contained in input buffer 210 and performs any necessary manipulation of IDPs as described herein. The modified data packets are passed to output buffer 212 and subsequently transmitted from port 202 using network interface device 205. Similarly, data received at port 202 is processed at network interface device 205 and temporarily stored at an input buffer 208. The processor 215 accesses the input data packets contained in input buffer 208 and performs any necessary manipulation of IDPs as described herein. The modified data packets are passed to output buffer 206 and subsequently transmitted from port 201 using network interface device 204. In each module, manipulation of IDPs is performed by processor 215 in accordance with a mission plan 220 stored in a memory 218.

It will be understood from FIG. 2 that a module is preferably configured so that it operates bi-directionally. In such scenarios, the module can implement different modification functions, depending on a source of a particular data packet. The dynamic modification function in each module can be specified in the mission plan in accordance with a source computing device of a particular data packet. Modules can determine a source of data packets by any suitable means. For example, a source address of a data packet can be used for this purpose.

At a selected module within the network 100, processor 215 will determine one or more false IDP values that are to be used in place of the true IDP values. The processor will transform one or more true IDP values to one or more false IDP values which are preferably specified by a pseudorandom function. Following this transformation, the module will forward the modified packet or datagram to the next node of the network along a transmission path. At subsequent points in the communication path, an adversary who is monitoring such network communications will observe false or incorrect information about the identity of computing devices communicating on the network.

In one scenario, the false IDPs that are specified by the pseudorandom function are varied in accordance with the occurrence of one or more trigger events. The trigger event causes the processor 215 to use the pseudorandom function to generate a new set of false IDP values into which the true IDPs are transformed. Accordingly, the trigger event serves as a basis for the dynamic variation of the false IDPs described herein. Trigger events are discussed in more detail below. However, it should be noted that trigger events for selecting a new set of false values for IDPs can be based on the passage of time and/or the occurrence of certain network events. Trigger events can also be initiated by a user command.

The transformation of IDPs described above provides one way to maneuver a computer network 100 for purposes of thwarting a cyber attack, responding to adversarial probing, or thwart adversaries' understanding of a network architecture. In some scenarios, the mission plan 220 implemented by processor 215 will also control certain other aspects of the manner in which computer network can maneuver. For example, the mission plan can specify that a dynamic selection of IDPs are manipulated. The dynamic selection can include a choice of which IDPs are selected for modification, and/or a number of such IDPs that are selected. This variable selection process provides an added dimension of uncertainty or variation which can be used to further thwart an adversary's effort to infiltrate or learn about a computer network 100. As an example of this technique, consider that during a first time period, a module can modify a destination IP address and a destination MAC address of each data packet. During a second time period the module could manipulate the source IP address and a source host name in each data packet. During a third period of time the module could manipulate a source port number and a source user name. Changes in the selection of IDPs can occur synchronously (all selected IDPs are changed at the same time). Alternatively, changes in the selection of IDPs can occur asynchronously (the group of selected IDPs changes incrementally as individual IDPs are added or removed from the group of selected IDPs).

A pseudorandom function is preferably used for determining the selection of identity values that are to be manipulated or transformed into false values. In other words, the module will transform only the IDPs selected by the pseudorandom function. In some scenarios, the selection of IDPs that are specified by the pseudorandom function is varied in accordance with the occurrence of a trigger event. The trigger event causes processor 215 use a pseudorandom function to generate a new selection of IDPs which are to be transformed into false IDPs. Accordingly, the trigger event serves as a basis for the dynamic variation of the selection of IDPs described herein. Notably, the values of the IDPs can also be varied in accordance with pseudorandom algorithm.

The modules are advantageously capable of also providing a third method of maneuvering the computer network for purposes of thwarting a cyber attack. Specifically, the mission plan loaded in each module can dynamically vary the location within the network where the modification or transformation of the IDPs takes place. Consider that modification of IDPs in an IDP set 120 sent from client computer 101 to client computer 102, could occur in module 105. This condition is shown in FIG. 1, where the IDPs contained in IDP set 120 are manipulated in module 105 so that IDP set 120 is transformed to a new or modified IDP set 122. At least some of the IDPs in IDP set 122 are different as compared to the IDPs in IDP set 120. But the location where such transformation occurs is preferably also controlled by the mission plan. Accordingly, manipulation of IDP set 120 could, for example, sometimes occur at module 113 or 114, instead of at module 105. This ability to selectively vary the location where manipulation of IDPs occurs adds a further important dimension to the maneuvering capability of the computer network.

The dynamic variation in the location where IDPs are modified is facilitated by selectively controlling an operating state of each module. To that end, the operational states of each module preferably includes (1) an active state in which data is processed in accordance with a current mission plan, and (2) a by-pass state in which packets can flow through the module as if the module was not present. The location where the dynamic modification is performed is controlled by selectively causing certain modules to be in an active state and certain modules to be in a standby state. The location can be dynamically changed by dynamically varying the current state of the modules in a coordinated manner.

The mission plan can include predefined sequence for determining the locations within the computer network 100 where IDPs are to be manipulated. Locations where IDPs are to be manipulated will change in accordance with the sequence at times indicated by a trigger event. For example, the trigger event can cause a transition to a new location for manipulation or transformation of IDPs as described herein. Accordingly, the trigger event serves as a basis for the occurrence of a change in the location where IDPs are modified, and the predefined sequence determines where the new location will be.

From the foregoing, it will be appreciated that a data packet is modified at a module to include false IDPs. At some point within the computer network, it is necessary to restore the IDPs to their true values, so that the IDPs can be used to properly perform their intended function in accordance with the particular network protocol. Accordingly, the present solution also includes dynamically modifying, at a second location (i.e., a second module), the assigned values for the IDPs in accordance with the mission plan. The modification at the second location essentially comprises an inverse of a process used at the first location to modify the IDPs. The module at the second location can thus restore or transform the false value IDPs back to their true values. In order to accomplish this action, the module at the second location must be able to determine at least (1) a selection of IDP value(s) that is(are) to be transformed, and (2) a correct transformation of the selected IDPs from false values to true values. In effect, this process involves an inverse of the pseudorandom process or processes used to determine the IDP selection and the changes effected to such IDP values. The inverse transformation step is illustrated in FIG. 1, where the IDP set 122 is received at module 106, and the IDP values in IDP set 122 are transformed or manipulated back to their original or true values. In this scenario, module 106 converts the IDP values back to those of IDP set 120.

Notably, a module must have some way of determining the proper transformation or manipulation to apply to each data communication it receives. In some scenarios, this determination is performed by examining at least a source address IDP contained within the received data communication. For example, the source address IDP can include an IP address of a source computing device. Once the true identity of the source computing device is known, the module consults the mission plan (or information derived from the mission plan) to determine what actions it needs to take. For example, these actions could include converting certain true IDP values to false IDP values. Alternatively, these changes could include converting false IDP values back to true IDP values.

Notably, there will be instances where the source address IDP information contained in a received data communication has been changed to a false value. In those circumstances, the module receiving the data communication will not immediately be able to determine the identity of the source of the data communication. However, the module which received the communication can in such instances still identify the source computing device. This is accomplished at the receiving module by comparing the false source address IDP value to a Look-Up-Table ("LUT") which lists all such false source address IDP values in use during a particular time. The LUT also includes a list of true source address IDP values that correspond to the false source address values. The LUT can be provided directly by the mission plan or can be generated by information contained within the mission plan. In either case, the identification of a true source address IDP value can be easily determined from the LUT. Once the true source address IDP has been determined, then the module which received the data communication can use this information to determine (based on the mission plan) what manipulations to the IDPs are needed.

Notably, the mission plan can also specify a variation in the second location where IDPs are restored to their true values. For example, assume that the IDPs are dynamically modified at a first location comprising module 105. The mission plan can specify that the restoration of the IDPs to their true values occurs at module 106 as described, but can alternatively specify that dynamic modification occur instead at module 113 or 114. In some scenarios, the location where such manipulations occur is dynamically determined by the mission plan in accordance with a predefined sequence. The predefined sequence can determine the sequence of locations or modules where the manipulation of IDPs will occur.

The transition involving dynamic modification at different locations preferably occurs in accordance with a trigger event. Accordingly, the predefined sequence determines the pattern or sequence of locations where data manipulations will occur, and the trigger event serves as a basis for causing the transition from one location to the next. Trigger events are discussed in more detail below; however, it should be noted that trigger events can be based on the passage of time, user control, and/or the occurrence of certain network events. Control over the choice of a second location (i.e., where IDPs are returned to their true values) can be effected in the same manner as described above with regard to the first location. Specifically, operating states of two or more modules can be toggled between an active state and a bypass state. Manipulation of IDPs will only occur in the module which has an active operating state. The module with a bypass operating state will simply pass data packets without modification.

Alternative methods can also be used for controlling the location where manipulation of IDPs will occur. For example, a network administrator can define in a mission plan several possible modules where IDPs can be converted from true values to false values. Upon the occurrence of a trigger event, a new location can be selected from among the several modules by using a pseudorandom function, and using a trigger time as a seed value for the pseudorandom function. If each module implements the same pseudorandom function using the same initial seed values then each module will calculate the same pseudorandom value. The trigger time can be determined based on a clock time, such as a GPS time or system clock time). In this way, each module can independently determine whether it is currently an active location where manipulation of IDPs should occur. Similarly, the network administrator can define in a mission plan several possible modules where dynamic manipulation returns the IDPs to their correct or true values. The selection of which module is used for this purpose can also be determined in accordance with a trigger time and a pseudorandom function as described herein. Other methods are also possible for determining the location or module where IDP manipulations are to occur. Accordingly, the present solution is not intended to be limited to the particular methods described herein.

Notably, varying the position of the first and/or second locations where identity functions are manipulated will often result in varying a physical distance between the first and second location along a network communication path. The distance between the first and second locations is referred to herein as a distance vector. The distance vector can be an actual physical distance along a communication path between the first and second location. However, it is useful to think of the distance vector as representing the number of network nodes that are present in a communication path between the first and second locations. It will be appreciated that dynamically choosing different position for the first and second locations within the network can have the effect of changing the number of nodes between the first and second locations. For example, in FIG. 1 the dynamic modification of IDPs is implemented in selected ones of the modules 105, 106, 107, 113, 114. The modules actually used to respectively implement the dynamic modification is determined as previously described. If module 105 is used for converting IDPs to false values and module 106 is used to convert them back to true values, then there are three network nodes 108, 110, 109 between modules 105 and 106. But if module 113 is used to convert to false values and module 114 is used to convert the IDPs back to true values, then there is only one network node 110 between modules 113 and 114. Accordingly, it will be appreciated that dynamically changing the position of locations where dynamic modification occurs can dynamically vary the distance vector. This variation of the distance vector provides an added dimension of variability to network maneuvering or modification as described herein.

In the present solution, the manipulation of IDP values, the selection of IDPs, and the locations where these IDPs are each defined as a maneuvering parameter. Whenever a change occurs in one of these three maneuvering parameters, it can be said that a network maneuver has occurred. Any time one of these three maneuvering parameters is changed, we can say that a network maneuver has occurred. In order to most effectively thwart an adversary's efforts to infiltrate a computer network 100, network maneuvering is preferably controlled by means of a pseudorandom process as previously described. Those skilled in the art will appreciate that a chaotic process can also be used for performing this function. Chaotic processes are technically different as compared to pseudorandom functions, but for purposes of the present solution, either can be used, and the two are considered equivalent. In some scenarios, the same pseudorandom process can be used for dynamically varying two or more of the maneuvering parameters. However, in some scenarios, two or more different pseudorandom processes are used so that two or more of these maneuvering parameters are modified independently of the others.

Trigger Events

As noted above, the dynamic changes to each of the maneuvering parameters is controlled by at least one trigger. A trigger is an event that causes a change to occur in relation to the dynamic modifications described herein. Stated differently, it can be said that the trigger causes the network to maneuver in a new way that is different than at a previous time (i.e., before the occurrence of the trigger). For example, during a first period of time, a mission plan can cause an IP address can be changed from value A to value B; but after the trigger event, the IP address can instead be changed from value A to value C. Similarly, during a first period of time a mission plan can cause an IP and MAC address to be modified; but after the trigger event, the mission plan can instead cause a MAC address and user name to be modified. As a third example, consider that during a first period of time a mission plan may cause IDPs to be changed when an ID set 120 arrives at module 105; but after the trigger event, can cause the IDPs to instead be changed when and ID set 120 arrives at module 113.

In its simplest form a trigger can be user activated or based on a simple timing scheme. In such scenarios, a clock time in each module could serve as a trigger. For example, a trigger event could be defined as occurring at the expiration of every sixty (60) second time interval. For such an arrangement, one or more of the maneuvering parameters could change every sixty (60) seconds in accordance with a predetermined clock time. In some scenarios, all of the maneuvering parameters can change concurrently so that the changes are synchronized. In a slightly more complex scenario, a time-based trigger arrangement can also be used, but a different unique trigger time interval can be selected for each maneuvering parameter. Thus, false IDP values could be changed at time interval X, a selection of IDPs would change in accordance with a time interval Y, and a location where such changes are performed would occur at time interval Z, where X, Y and Z are different values.

It will be appreciated that in scenarios which rely upon clock time as a trigger mechanism, it is advantageous to provide synchronization as between the clocks in various modules 105, 106, 107, 113, 114 to ensure that packets are not lost or dropped due to unrecognized IDPs. Synchronization methods are well known and any suitable synchronization mechanism can be used for this purpose. For example, the modules could be synchronized by using a highly accurate time reference such as a GPS clock time. Alternatively, a unique wireless synchronization signal could be broadcast to each of the modules from a central control facility.

Other types of triggers are also possible with the present solution. For example, trigger events can be based on the occurrence or detection of potential network security threats. According to the present solution, a potential network security threat can be identified by a network security software suite. Alternatively, the potential network security threat can be identified upon the receipt of a data packet at a module 105, 106, 107, 113, 114 where the packet contains one or more IDPs that are inconsistent with the present state of network maneuvering. Regardless of the basis for identifying a network security threat, the existence of such threat can serve as a trigger event. A trigger event based on a network security threat can cause the same types of network maneuvers as those caused by the time based triggers described above. For example, false IDPs, the selection of IDPs and the locations of IDP transformations could remain stable (i.e., unchanged) except in the case were a network security threat was detected. Such an arrangement might be chosen, for example, in computer networks where frequent network maneuvering is not desirable.

Alternatively, time based trigger events can be combined with trigger events based on potential threats to network security. In such scenarios, a trigger event based on a security threat can have a different effect on the network maneuvering as compared to time based triggers. For example, a security threat-based trigger event can cause strategic or defensive changes in the network maneuvering so as to more aggressively counter such network security threat. The precise nature of such measures can depend on the nature of the threat, but can include a variety of responses. For example, different pseudorandom algorithms can be selected, and/or the number of IDPs selected for manipulation in each IDP set 120 can be increased. In systems that already make use of time based triggers, the response can also include increasing a frequency of network maneuvering. Thus, more frequent changes can be made with respect to (1) the false IDP values, (2) the selection of IDPs to be changed in each IDP set, and/or (3) the position of the first and second locations where IDPs are changed. Accordingly, the network maneuvering described herein provides a method for identifying potential network security threats and responding to same.

Mission Plans

According to the present solution, the network maneuvering described herein is controlled in accordance with a mission plan. A mission plan is a schema that defines and controls maneuverability within the context of a network and a security model. As such, the mission plan can be represented as a data file that is communicated from the NAC 104 to each module 105-107, 113-114. The mission plan is thereafter used by each module to control the manipulation of IDPs and coordinate its activities with the actions of the other modules in the network.

The mission plan can be modified from time to time by a network administrator to update or change the way in which the network maneuvers to thwart potential adversaries. As such, the mission plan provides a network administrator with a tool that facilitates complete control over the time, place and manner in which network maneuvering will occur within the network. Such update ability allows the network administrator to tailor the behavior of the computer network to the current operating conditions and more effectively thwart adversary efforts to infiltrate the network. Multiple mission plans can be defined by a user and stored so that they are accessible to modules within the network. For example, the multiple mission plans can be stored at NAC 104 and communicated to modules as needed. Alternatively, a plurality of mission plans can be stored on each module and can be activated as necessary or desirable to maintain security of the network. For example, if the network administrator determines or suspects that an adversary has discovered a current mission plan for a network, the administrator may wish to change the mission plan. Effective security procedures can also dictate that the mission plan be periodically changed.

Figure 3:
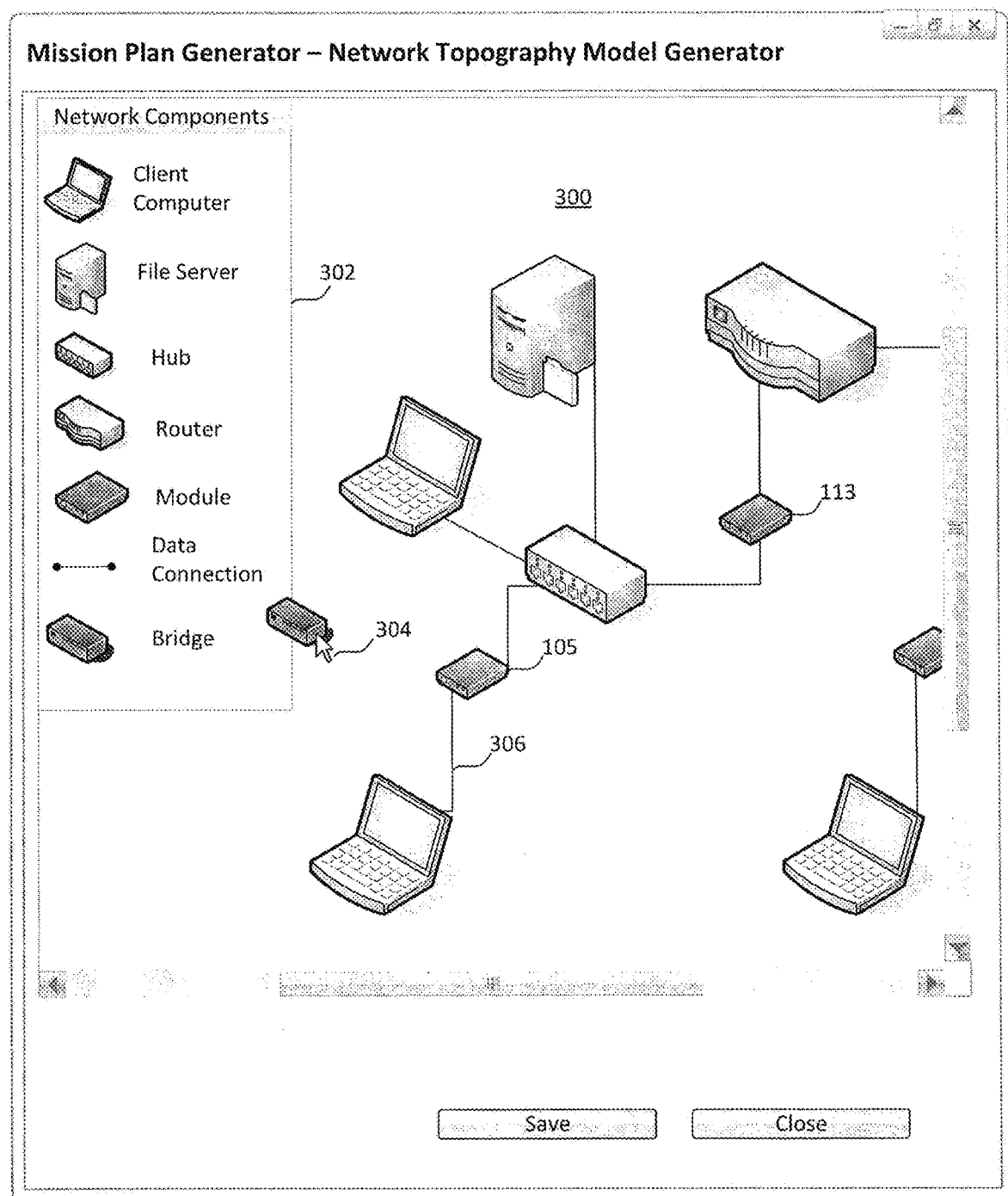
FIG. 3 is a drawing that is useful for understanding a tool that can be used to help characterize the network in FIG. 1.

The process of creating a mission plan can begin by modeling the network 100. The creation of the model is facilitated by a Network Control Software Application ("NCSA") executing on a computer or server at the network command center. For example, in the scenario shown in FIG. 1, the NCSA can execute on NAC 104. The network model preferably includes information which defines data connections and/or relationships between various computing devices included in the network 100. The NCSA will provide a suitable interface which facilitates entry of such relationship data. In some scenarios, the NCSA can facilitate entry of data into tables which can be used to define the mission plan. However, in some scenarios, a Graphic User Interface ("GUI") is used to facilitate this process. Referring now to FIG. 3, the NCSA can include a network topography model generator tool. The tool is used to assist the network administrator in defining the relationship between each of the various components of the networks. The network topography tool provides a workspace 300 in which an administrator can drag and drop network components 302 by using a cursor 304. The network administrator can also create data connections 306 between various network components 302. As part of this modeling process, the network administrator can provide network address information for the various network components, including the modules 105-107, 113, 114.

Figure 4:
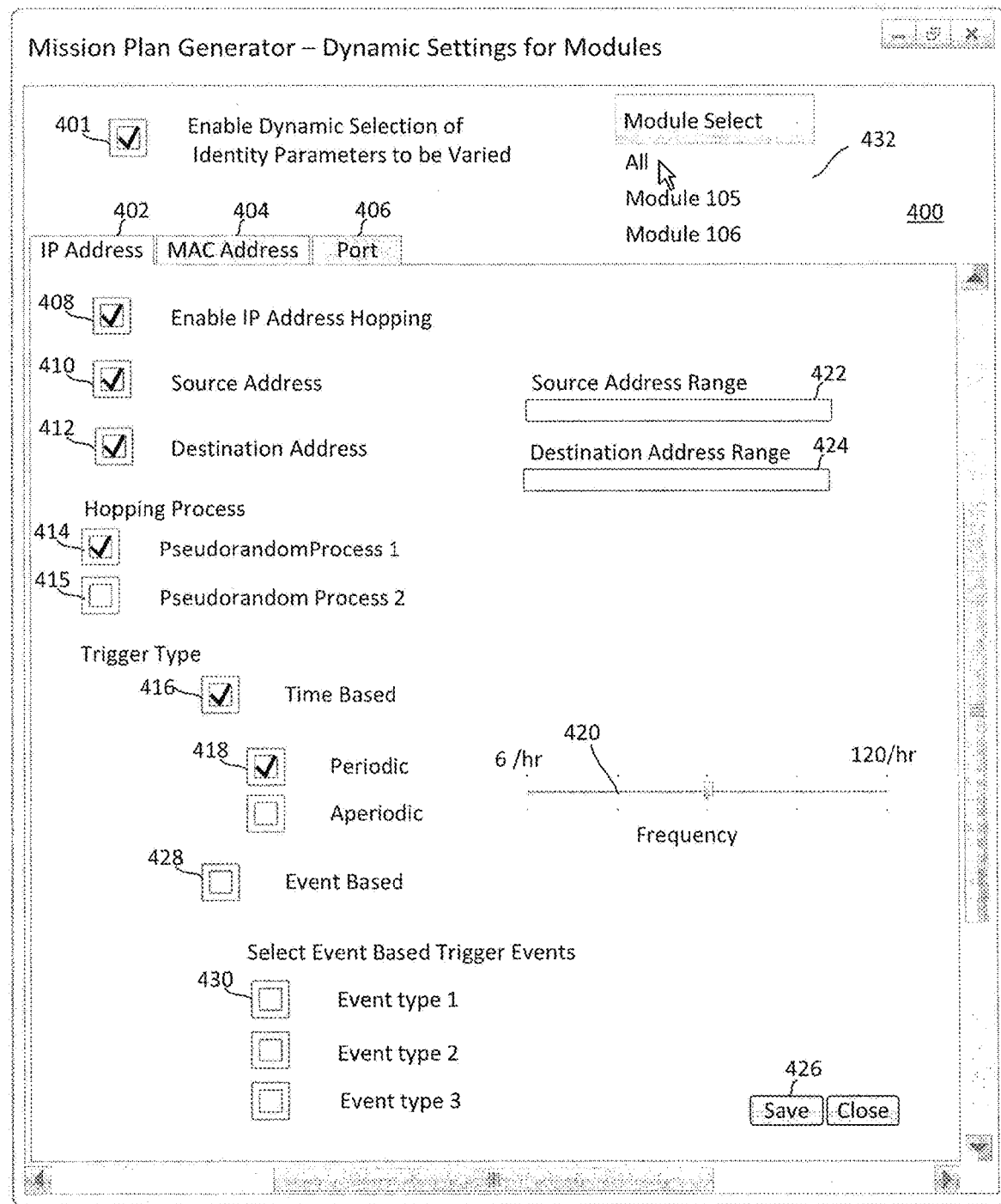
FIG. 4, is an example of a dialog box of a graphical user interface that can be used to select dynamic settings for modules in FIG. 1.

Once the network has been modeled, it can be saved and used by the network administrator to define the manner in which the various modules 105-107, 113, 114 behave and interact with one another. Referring now to FIG. 4, the NCSA can generate a dialog box 400 of which can be used to further develop a mission plan. A drop-down menu 432 can be used to select the particular module (e.g., module 105) to which the settings in dialog box 400 are to be applied. Alternatively, the network administrator can use drop-down menu 432 to indicate that the settings in dialog box 400 are intended to be applied to all modules within the network (e.g., by selecting "All" in menu 432). The process can continue by specifying whether a fixed set of IDPs will always be modified in each of the modules, or whether the set of IDPs that are manipulated shall be dynamically varied. If the selection or set of IDPs that are to be manipulated in the modules is intended to be dynamically varied, the network administrator can mark check-box 401 to indicate that preference. If the check-box 401 is not marked, that will indicate that the set of IDPs to be varied is a fixed set that does not vary over time.

The dialog box 400 includes tabs 402, 404, 406 which allow a user to select the particular IDP that he wants to work with for purposes of creating a mission plan. For purposes of this disclosure, the dialog box 400 facilitates dynamic variation of only three (3) IDPs. Specifically, these include the IP address, MAC address and Port Address. More or fewer IDPs can be dynamically varied by providing additional tabs, but the three IDPs noted are sufficient to explain the inventive concepts. In FIG. 4, the user has selected the tab 402 to work with the IP Address type of IDP. Within tab 402, a variety of user interface controls 408-420 are provided for specifying the details relating to the dynamic variation of IP addresses within the selected module. More or fewer controls can be provided to facilitate the dynamic manipulation of the IP Address type, and the controls shown are merely provided to assist the reader in understanding the concept. In the example shown, the network administrator can enable dynamic variation of IP addresses by selecting (e.g., with a pointing device such as a mouse) the check-box 408 marked: Enable IP Address Hopping. Similarly, the network administrator can indicate whether the source address, destination address or both are to be varied. In this example, the source and destination address boxes 410, 412 are both marked, indicating that both types of addresses are to be changed. The range of allowed values for the source and destination addresses can be specified by the administrator in list boxes 422, 424.

The particular pseudorandom process used to select false IP address values is specified by selecting a pseudorandom process. This selection is specified in boxes 414, 415. Different pseudorandom processes can have different levels of complexity for variable degrees of true randomness, and the administrator can choose the process that best suits the needs of the network 100.

Dialog box 400 also allows a network administrator to set the trigger type to be used for the dynamic variation of the IP Address IDP. In this example, the user has selected box 416, indicating that a time based trigger is to be used for determining when to transition to new false IP address values. Moreover, checkbox 418 has been selected to indicate that the time based trigger is to occur on a periodic basis. Slider 420 can be adjusted by the user to determine the frequency of the periodic time based trigger. In the example shown, the trigger frequency can be adjusted between six (6) trigger occurrences per hour (trigger every ten (10) minutes) and one hundred twenty (120) trigger occurrences per hour (trigger every thirty (30) seconds). In this example, selections are available for other types of triggers as well. For example, dialog box 402 includes check boxes 428, 430 by which the network administrator can select an event-based trigger. Several different specific event types can be selected to form the basis for such event-based triggers (e.g., Event type 1, Event type 2, etc.). These event types can include the detection of various potential computer network security threats. In FIG. 4, tabs 404 and 406 are similar to tab 402, but the controls therein are tailored to the dynamic variation of the MAC Address and Port value rather than the IP Address. Additional tabs could be provided for controlling the dynamic variation of other types of IDPs.

The mission plan can also specify a plan for dynamically varying the location where IDPs are modified. In some scenarios, this variable location feature is facilitated by controlling a sequence that defines when each module is in an active state or a bypass state. Accordingly, the mission plan advantageously includes some means of specifying this sequence. In some scenarios, this can involve the use of defined time intervals or time slots, which are separated by the occurrence of a trigger event.

Figure 5:
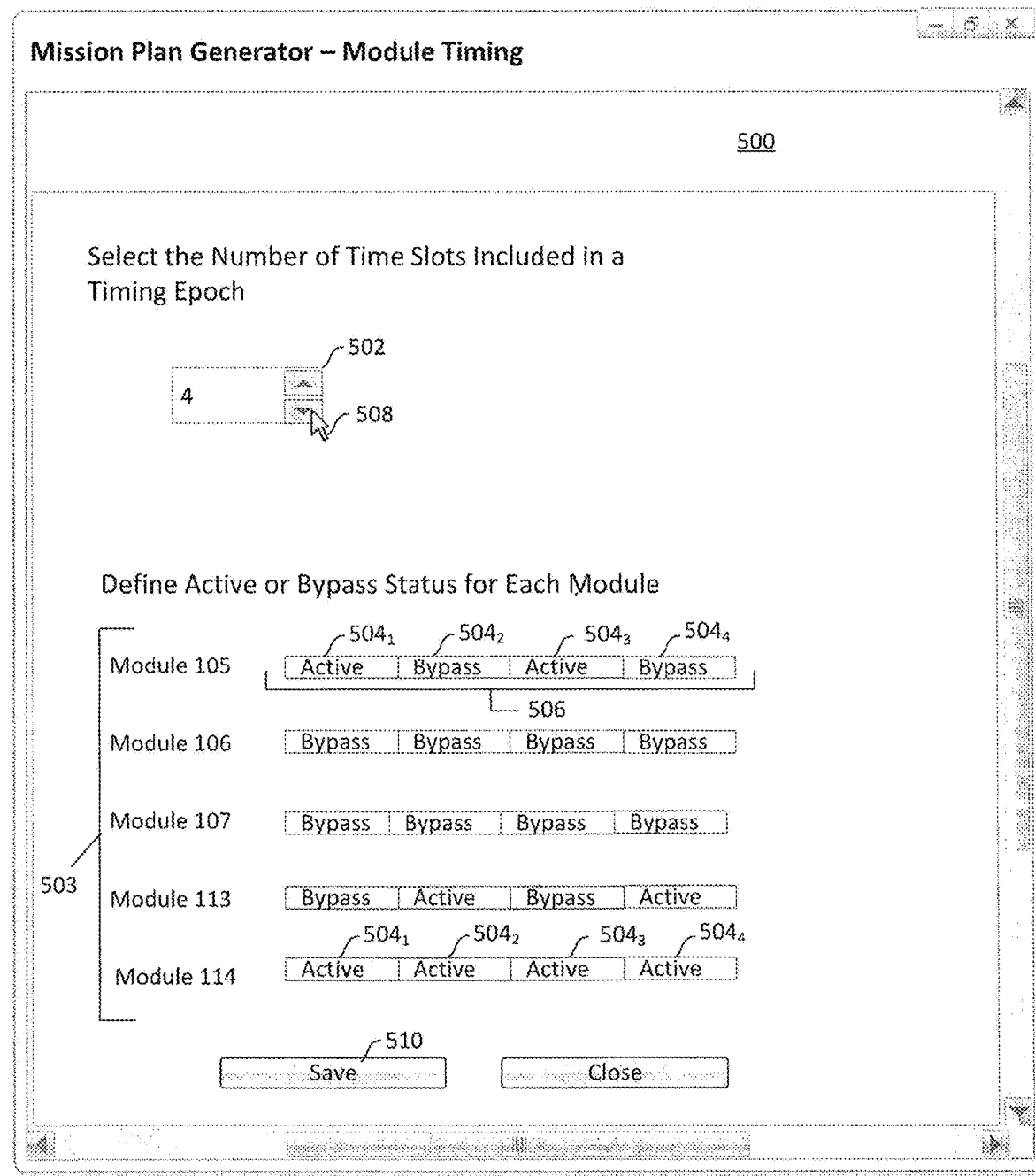
FIG. 5 is an example of a dialog box of a graphical user interface that can be used to select a sequence of active states and bypass states associated with each module in FIG. 1.

Referring now to FIG. 5, a dialog box 500 can be provided by the NCSA to facilitate coordination and entry of location sequence and timing information. Dialog box 500 can include a control 502 for selecting a number of time slots $504_1$-$504_n$ which are to be included within a time epoch 506. In the example illustrated, the network administrator has defined four (4) time slots per timing epoch. The dialog box 500 can also include a table 503 which includes all modules in the network 100. For each module listed, the table includes a graphical representation of available time slots $504_1$-$504_4$ for one timing epoch 506. Recall that dynamic control over the location where IDPs are manipulated is determined by whether each module is in an active or bypass operating states. Accordingly, within the graphical user interface, the user can move a cursor 508 and make selections to specify whether a particular module is in an active or bypass mode during each time slot. In the example shown, module 105 is active during time slot $504_1$ and $504_3$, but is in a bypass mode during time slots $504_2$, $504_4$. Conversely, module 113 is active during time slots $504_2$, $504_4$, but is in bypass mode during time slots $504_1$ and $504_3$. With reference to FIG. 1, this means that manipulation of IDPs occurs at a location associated with module 105 during time slots slot $504_1$ and $504_3$, but occurs instead at module 113 during time slots $504_2$, $504_4$.

In the example shown in FIG. 5, the network administrator has elected to have module 114 always operate in an active mode (i.e., module 114 is active during all time slots. Accordingly, for data communications transmitted from client computer 101 to client computer 103, data packets will alternately be manipulated in modules 105, 113, but will always be manipulated at module 114. Finally, in this example, the network administrator has elected to maintain modules 106 and 107 in a bypass mode during time slots $504_1$-$504_4$. Accordingly, no manipulation of IDPs will be performed at these modules during any of the defined time slots. Once the module timing has been defined in dialog box 500, the network administrator can select the button 510 to store the changes as part of an updated mission plan. The mission plan can be saved in various formats. In some scenarios, the mission plan can be saved as a simple table or other type of defined data structure that can be used by each module for controlling the behavior of the module.

Mission Plan Generation Using a Behavior Model Library

Figure 14:
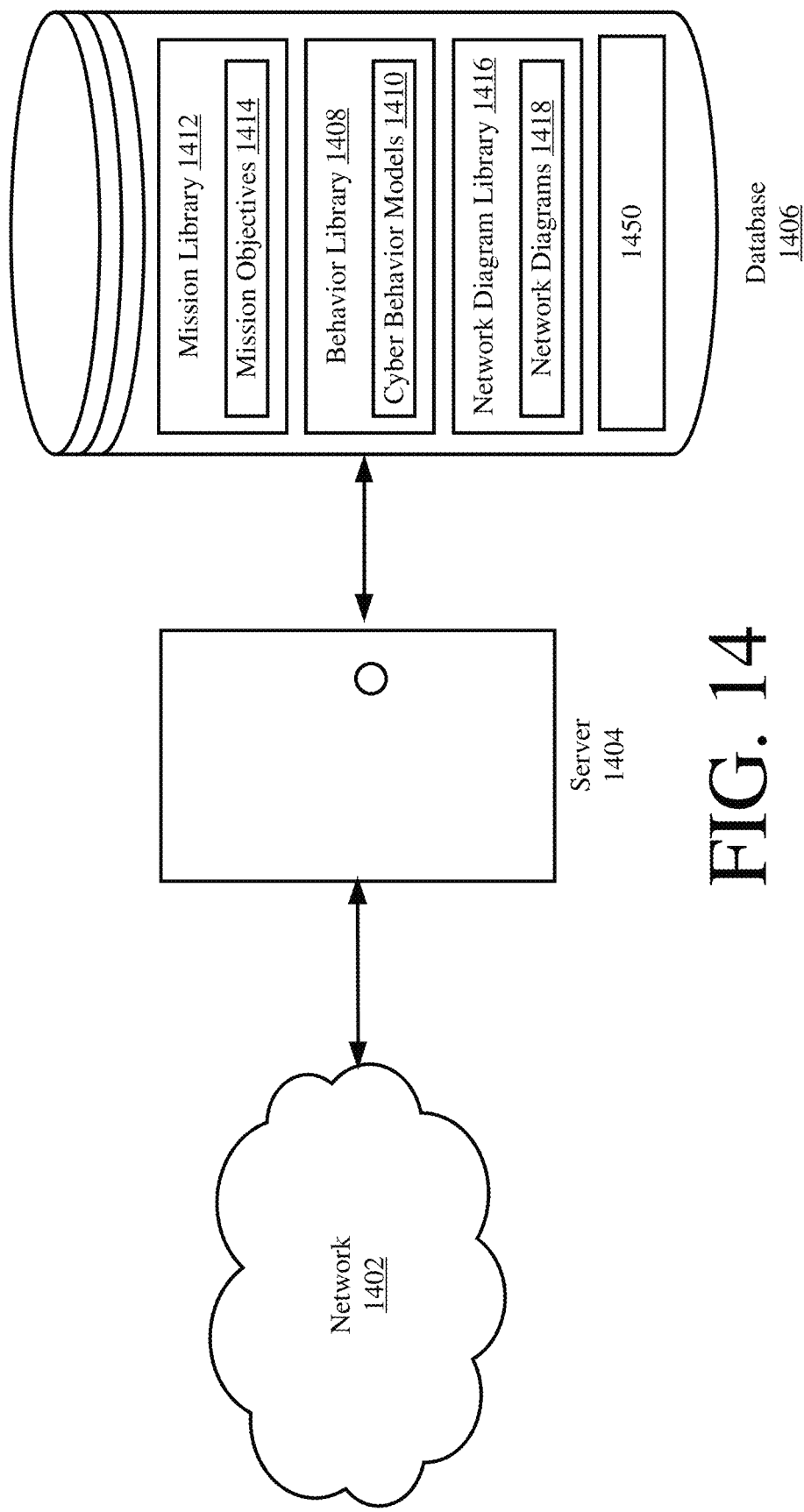
FIG. 14 is a schematic illustration of an exemplary system employing cyber behavior models to define and manage mission models.

In order to effectively manage dynamic networks, one must have extensive subject matter expertise to define strategy, behavior and maneuver schemes which are to be implemented via mission plans. The present solution provides a means to decrease the complexity of mission plan creation so that mission plans can be created by those who do not have the previously mentioned extensive subject matter expertise. In this regard, a mission library 1412, a behavior library 1408 and a network diagram library 1416 are employed as shown in FIG. 14. These libraries 1408, 1412, 1416 are accessible via a server 1404 and a network 1402. The network 1402 can be the same or different network in which IDP maneuverability is employed.

Figure 15:
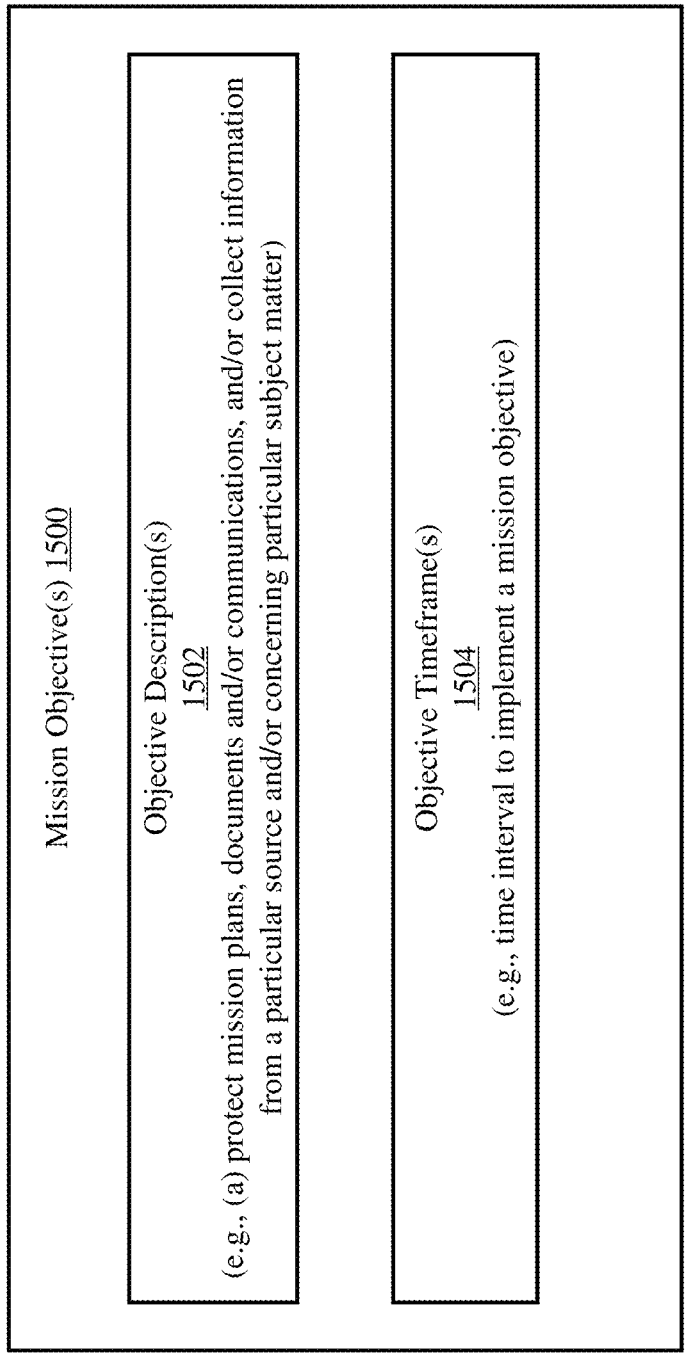
FIG. 15 is a schematic illustration of an exemplary mission objective.

The mission library 1412 comprises a plurality of mission objectives 1414. A mission objective is an end toward which effort and action are directed or coordinated. There can be a number of mission objectives in order to achieve a mission. An exemplary architecture for a mission objective is provided in FIG. 15. As shown in FIG. 15, the mission objective comprises at least one objective description 1502 and at least one objective timeframe 1504. An objective description describes the mission objective. For example, an objective description 1502 includes, but is not limited to, protect a mission model, protect certain documents (e.g., military or corporate strategy documents), protect certain communications, collect information from a particular source, and/or collect information concerning a particular subject matter. An objective timeframe 1504 includes at least one-time interval to implement at least one mission objective.

The behavior library 1408 comprises a plurality of Cyber Behavior Models ("CBMs") 1410. The CBMs 1410 are generally used to drive the definition and management of mission plans. The CBMs 1410 can be defined and composed based upon cyber behavior models derived from and within different communities. For example, the CBMs 1410 can be defined and composed based on maneuver theory, psychology, animal behavior, military theory, past military operations, music construction, etc. The present solution is not limited to the particulars of this example.

The behavior library 1408 allows for: the automation of CBM definitions; the use of a common language and models for deriving maneuver scheme definitions; the incorporation of lessons learned from previous missions to develop new maneuver schemes with improved resiliency; and the reuse of CBMs so that the dynamic network management is achieved efficiently and effectively.

The network diagram library 1416 includes information specifying a hardware and/or software architecture of a network. The hardware architecture can be constructed out of physical hardware and/or virtualized hardware. In this regard, the network diagram library 1416 comprises information indicating network node unique identifiers, network node types, operational capabilities of the network nodes, and/or wired connections between the network nodes. In some scenarios, the network diagram library also includes information organizing the network nodes into talkgroups or communities and/or information indicating security levels associated with the network nodes.

Figure 16:
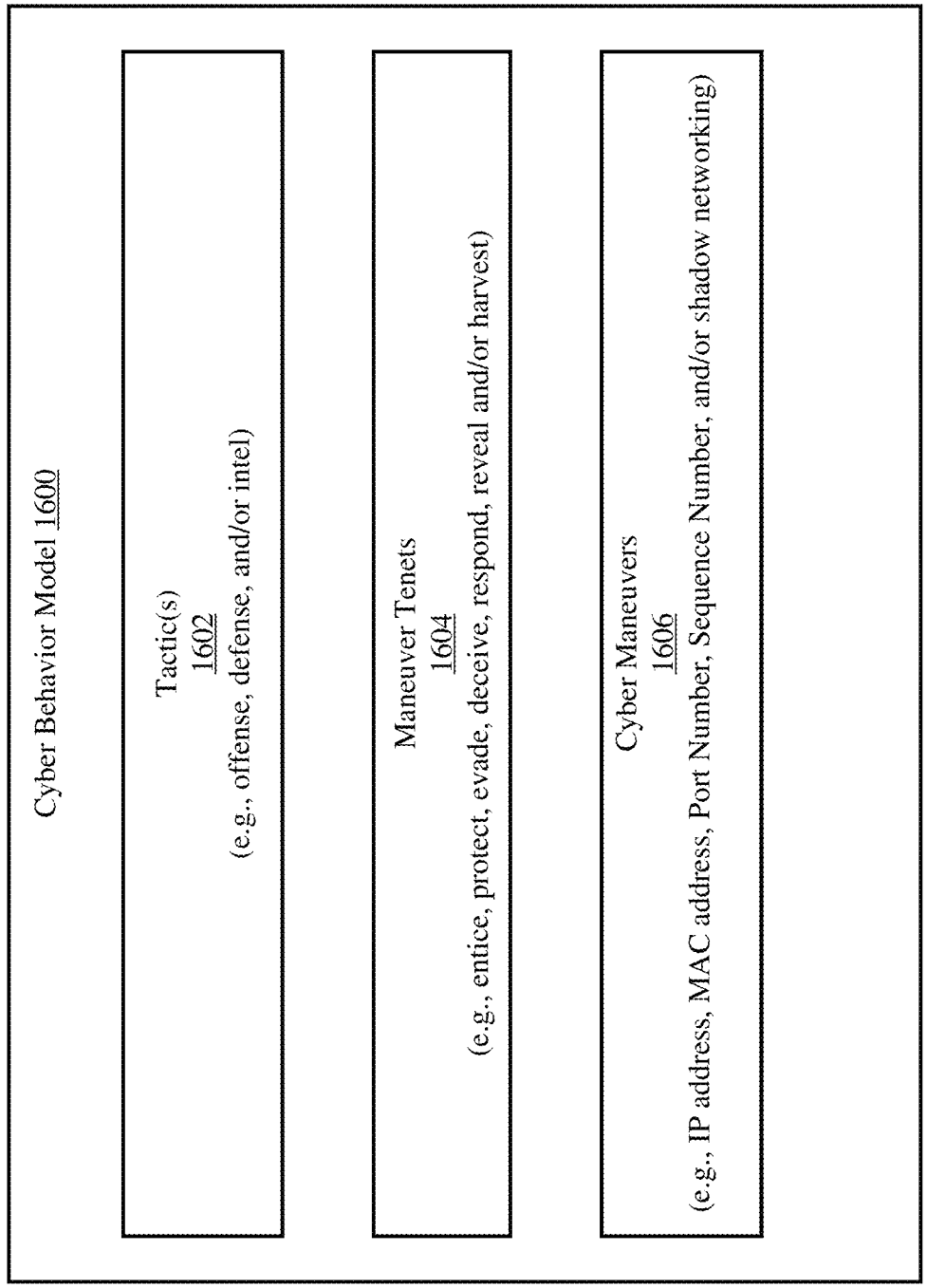
FIG. 16 is a schematic illustration of an exemplary cyber behavior model.

A schematic illustration of an exemplary CBM 1600 is provided in FIG. 16. As shown in FIG. 15, the CBM 1600 comprises information defining tactic(s) 1602, maneuver tenet(s) 1604, and cyber maneuvers 1606. A tactic 1602 is a strategy planned to achieve a specific end (or mission objective). For example, a tactic is offense, defense or intel (or intelligence gathering). An offensive tactic is an operation that seeks through a cyber-attack to gain information and/or disrupt operations of a given computer system (e.g., a computer system of an enemy). A defensive tactic is an operation designed to repel cyber-attacks on a given computer system, while also protecting the computer system from cyber-attacks. An intel tactic is an operation to identify and collect (or harvest) information that can provide guidance and direction to achieve the mission objective 1414.

A maneuver tenet 1604 is a principle of network maneuverability for implementing a specific offensive, defensive or intelligence collection strategy (or tactic). A maneuver tenet 1604 defines network operations for enticing a cyber-attack, protecting from a cyber-attack, evading a cyber-attack, deceiving cyber-attackers, responding to a cyber-attack, reveling a cyber-attack and/or harvesting information about a cyber-attack. The terms "entice", "protect", "evade", "deceive", "respond", "reveal" and "harvest" are all defined below.

The phrase "entice" means to attract or tempt (like bait) by offering pleasure or advantage. Thus, the maneuver tenet for enticing a cyber-attack comprises items or objects that can be offered as enticement. The items or objects can be dynamic. In this case, a cyber behavior model is provided that describes the dynamic nature of the items or objects. A time period may also be defined during which the items or objects will be offered as bait. The item or object can include, but is not limited to, a value stored in memory at a location which is referenced by an identifier.

The phrase "protect" means to keep safe from harm or injury. In cyber parlance, it means to keep a computer safe from an attack vector reaching the computer, operating in its memory, reading its data, etc. Protection contains the elements of: {invisibility; blocking; fortifying; extinguishing}. Thus, the maneuver tenet for protecting from a cyber-attack comprises information identifying who should be allowed to communicate with each other in accordance with a given strategy. This information can identify people, organizations, entities and/or network devices that are to implement a strategy and/or have access to information associated with the strategy. For example, a maneuver tenet includes identifiers for network devices that comprise sensitive information and/or people that have the appropriate security level to access to the sensitive information. If any of the protection elements are dynamic in nature, a cyber behavior model is provided defining the dynamic nature thereof.

The word "evade" means to escape or avoid (especially by being clever or tricky). A maneuver tenet for evading a cyber-attack has the following elements: an associated movement or assignment of two possibilities (e.g., a target moves or changes from A to B and/or the attacker misaligns or misinterprets); a target; an attacker; a cyber behavior model defining the kind of movement; a velocity of movement; and a time period during which movement will exist. As such, this maneuver tenet comprises information associated with how often a network maneuver is happening, how big a maneuver space is that certain information can move within, and/or what is the overall networking address space that computers are allowed to maneuver within. For example, a maneuver tenet includes information identifying at least one IDP for which false values are to be employed, a rate at which the IDP value should be changed, and/or timeslots of a frame in which the IDP value should be changed.

The word "deceive" means to cause someone or a system to believe something is not true. Something fake can be substituted for something real. Any item in the communication model can be substituted by a fake item in the communication model (real physical equipment or virtual equipment). If any of the objects are interposed in a dynamic fashion, a cyber behavior model is provided that describes the dynamic fashion. For example, a false IP address can be substituted in place of a real IP address. A maneuver tenet for deceiving a source of a cyber-attack has the following elements: a transformation function f(x); a velocity of transformation; and a time or timeframe associated that the transformative process will operate across. Accordingly, this maneuver tenet comprises information that identifies a deception network device associated with each false IDP value that is intended to cause a cyber-attacker and/or malicious software to believe that (s)he or it has gained access to the actual network equipment of interest (e.g., the network devices implementing network maneuverability). The deception network device can be configured to capture information indicating actions of cyber-attackers and/or information useful for tracing the hackers behind a cyber-attack.

The word "respond" means to do an action in reply to a previous action. A maneuver tenet for responding to a cyber-attack has the following elements: an action; a reply to the action; a velocity; a period of sustainment for the action to exist; and a cyber behavior model (or set of cyber behavior models) defining both actions. Therefore, this maneuver tenet comprises at least one rule specifying at least one action that should be taken when a given action occurs (e.g., a malicious attack is detected). The action can include, but is not limited to, dropping a received packet (which could be the result of or including an incorrect identity parameter value for a given timeslot), forwarding the received packet to an intrusion analysis tool or honeypot analysis tool, logging information associated with the received packet, determining a source of the received packet, sending a response to the source of the received packet, notifying an appropriate authority, and/or issuing an alarm.

The word "reveal" means to cause an action, location or intent to become visible and noticed. A maneuver tenet for reveal includes items and/or objects. There is a behavior done by an object to cause an opponent (opposing object) to make visible (reveal) their: location; intent and associated behavior; strength; and/or behavior or object that the opponent is triggering on. The originating (triggering) behavior (s) and object(s) can be dynamic as well as the opponent's behavior(s) and/or object(s). A cyber behavior model is provided that described the dynamic nature of the behaviors and objects.

The word "harvest" means to identify a set of objects and collect those objects. A maneuver tenet for harvest includes items and/or objects that can be identified and collected. An associative relationship exists between the identification algorithm and the collection function of the objects. The associative relationship can be a set of mathematical functions (e.g., collect those items "=" $x_j$, collect those items !=to $x_j$, etc.). The associative relationship can be a relationship to any of the {objectives; tactics; tenets; cyber behavior models; members of a set of maneuvers; network drawings; time frames}.

The cyber maneuvers 1606 comprise information specifying IDPs and how those IDPs are to be changed during operation of the system, as well as particulars of shadow networking techniques. In some scenarios, the cyber maneuvers 1606 can include, but are not limited to, an IP address, a MAC address, a port number, a sequence number, and/or shadow networking parameters. Shadow networking techniques are described in U.S. Pat. No. 9,075,992 to Smith et al. ("the '992 application), which is incorporated herein by reference. Any known or to be known shadow networking technique can be used herein without limitation. In some scenarios, shadow networking is used to identify, deter and/or delay malicious attacks being waged on a computer network. This is achieved by: using two (2) possible values for an IDP (e.g., an IP address) in communications to and from a network node in different timeslots of a plurality of timeslots of a time frame; comparing a value of the IDP contained in a received packet with the possible values specified for the IDP; and determining that a cyber-attack is occurring when the received packet's IDP value does not match the IDP value specified for the current timeslot.

Figure 17:
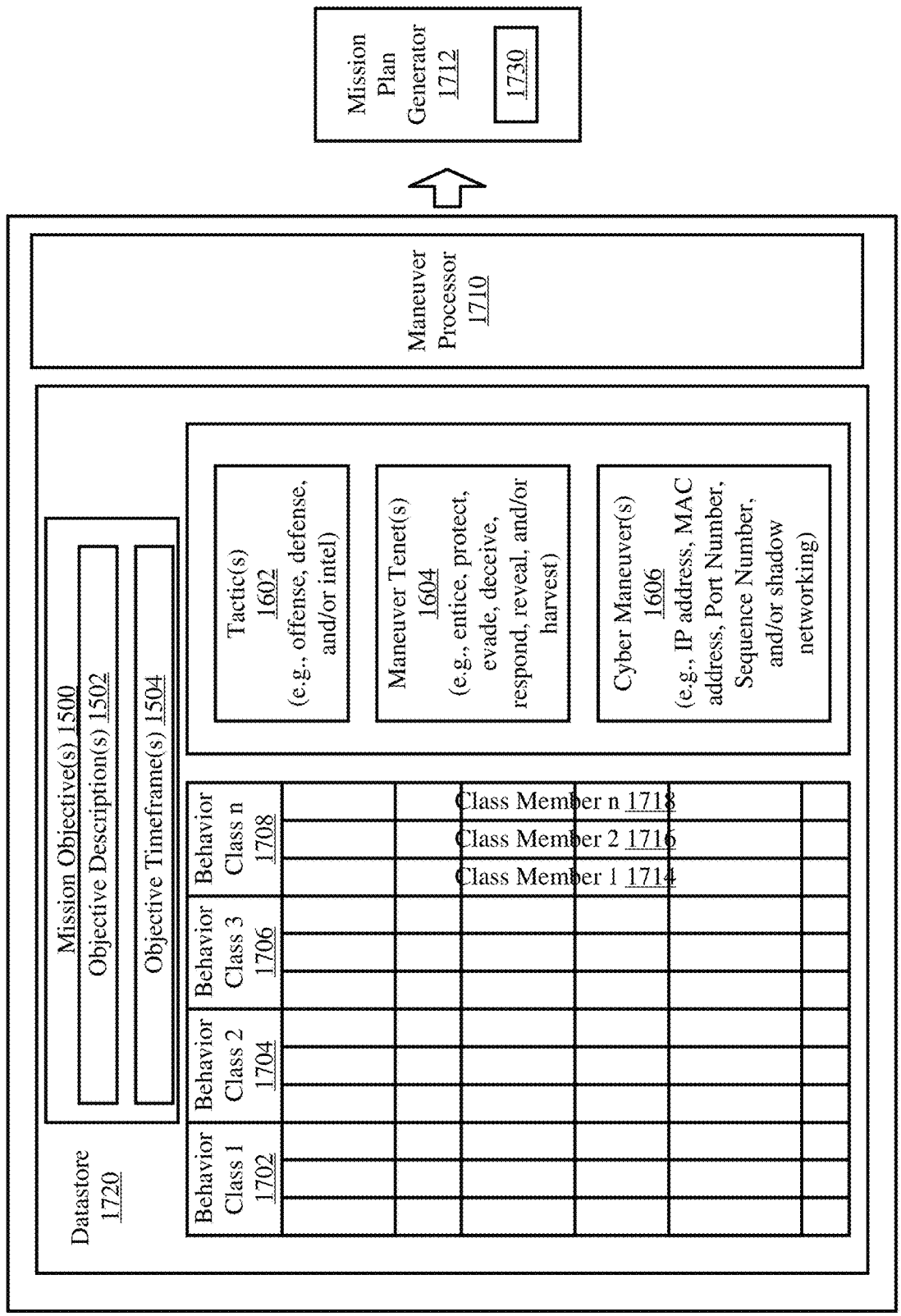
FIG. 17 is a schematic illustration that is useful for understanding how a mission plan is generated based on at least one cyber behavior model.

FIG. 17 provides a schematic illustration that is useful for understanding how mission plans are generated using CBMs (such as CBM 1600 of FIG. 16). During operation, a user is presented a graphical means for selecting CBM criteria. The graphical means can be presented via a computing device. An exemplary computing device 2200 is shown in FIG. 2, which will be discussed in detail below. The CBM criteria includes, but is not limited to, at least one mission objective 1500, at least one object description 1502, at least one objective time frame 1504, at least one tactic 1602, at least one maneuver tenet 1604, and at least one cyber-maneuver 1606. Each of the listed types of CBM criteria is discussed above.

Figure 18:
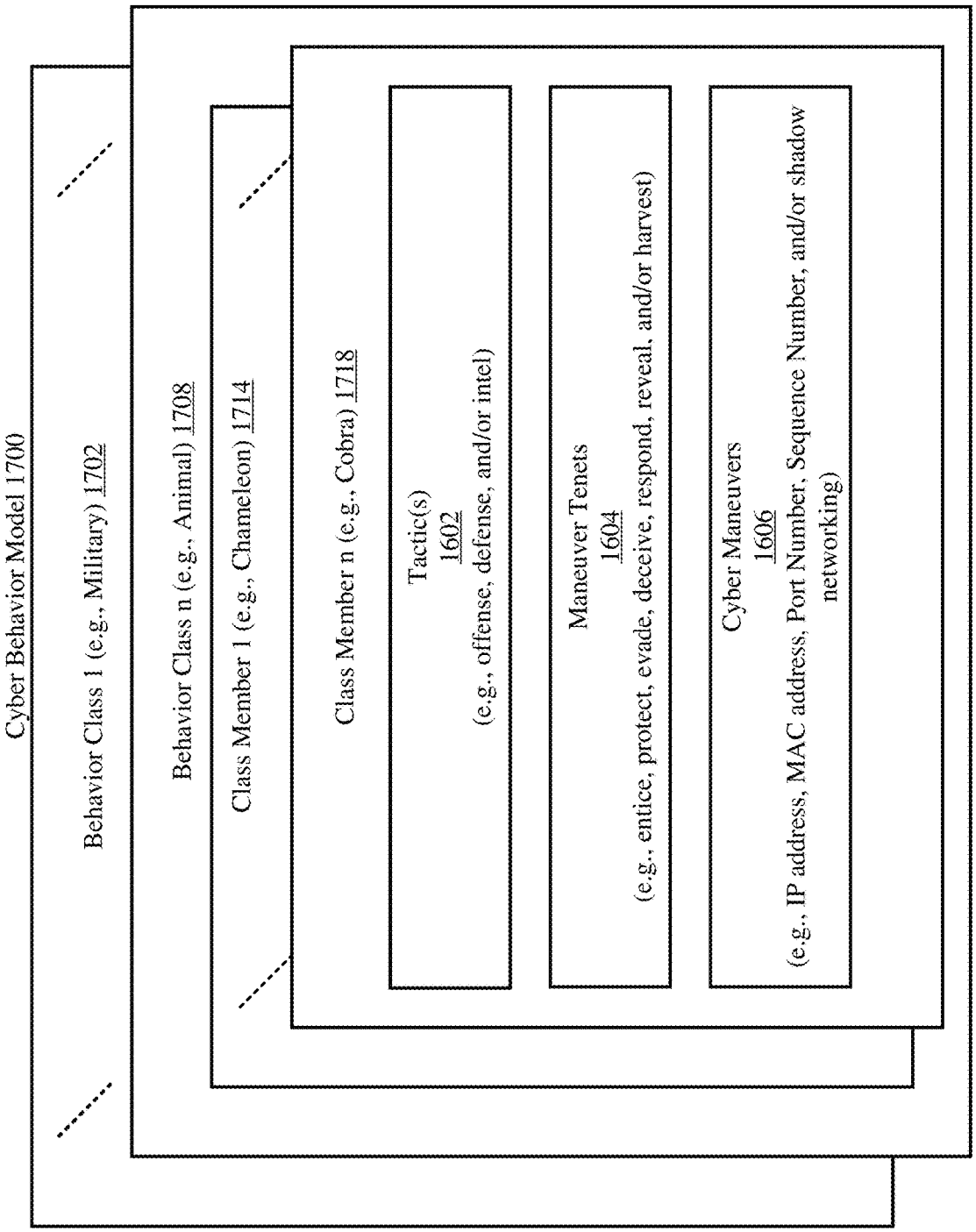
FIG. 18 is a schematic illustration that is useful for understanding how cyber behavior models are stored in a datastore.

Based on the user-selection, information associated with one or more CBMs is presented to the user. This information comprises identifiers for a plurality of behavior classes 1702, 1704, 1706 and 1708. A behavior class is a class of maneuverability behavior for a network. The behavior classes include, but are not limited to, animal, military, and/or music. In each class, there are a plurality of member sub-classes 1714-1718 as shown in FIGS. 17-18. For example, the animal class includes a chameleon class member and a cobra class member. Each member sub-class 1714-1718 is defined by or associated with at least one tactic 1602, maneuver tenet 1604 and cyber-maneuver 1606.

In addition to the behavior class information, a graphical means is also presented which allows the user to define time period(s) at which one or more CBMs, behavior classes and/or member sub-classes is(are) to operate. These time periods are used to define a time schedule for implementation of the CBM(s). Once the time schedule is generated, maneuver processing is performed by a maneuver processor 1710 (e.g., implemented as a CPU 2204 and/or hardware entity 2210 of a computing device 2200 shown in FIG. 22) to obtain information for the CBM(s) particulars. This information is then used by a mission plan generator 1712 (e.g., implemented as a CPU 2204 and/or hardware entity of 2210 of a computing device 2200 shown in FIG. 22) to generate or obtain a mission plan as shown by functional block 1712.

In some scenarios, the mission plan can be generated automatically or obtained by selecting at least one mission plan from a plurality of pre-generated mission plans based on the user defined criteria. In other scenarios, the bounds of the mission plan are generated based on the user defined criteria. A user then uses the defined bounds to manually generate the mission plan. For example, the bounds define a template mission plan that can be customized by the user.

In some scenarios, the pre-generated mission plans (e.g., mission plans 1450 of FIG. 14) are stored in a data store (e.g., database 1406 of FIG. 14). The pre-generated mission models are stored so as to be associated with respective CBMs. This association can be achieved using a hierarchy structure or other relation specifying data organization (e.g., tables). Each CBM can have one or more pre-generated mission models associated therewith. Additionally, two CBMs can have one or more of the same pre-generated mission models associated therewith.

An exemplary mission plan 2100 is shown in FIG. 21. The mission plan 2100 includes at least one mission model 2102 with a plurality of possible values for a variable identity parameter (e.g., an IP address). The plurality of possible values is generated or obtained by the mission plan generator 1712. In this regard, the mission plan generator 1712 comprises an IDP false value generator 1730 employing chaotic, random and/or pseudo-random algorithms or hand-picked algorithms which can be used to derive the possible values or select the possible values from a LUT. A seed value for the algorithms can include, but is not limited to, an identifier for a particular CBM or mission model. The mission model(s) is(are) then used to define the mission plan 2100.

Figure 19:
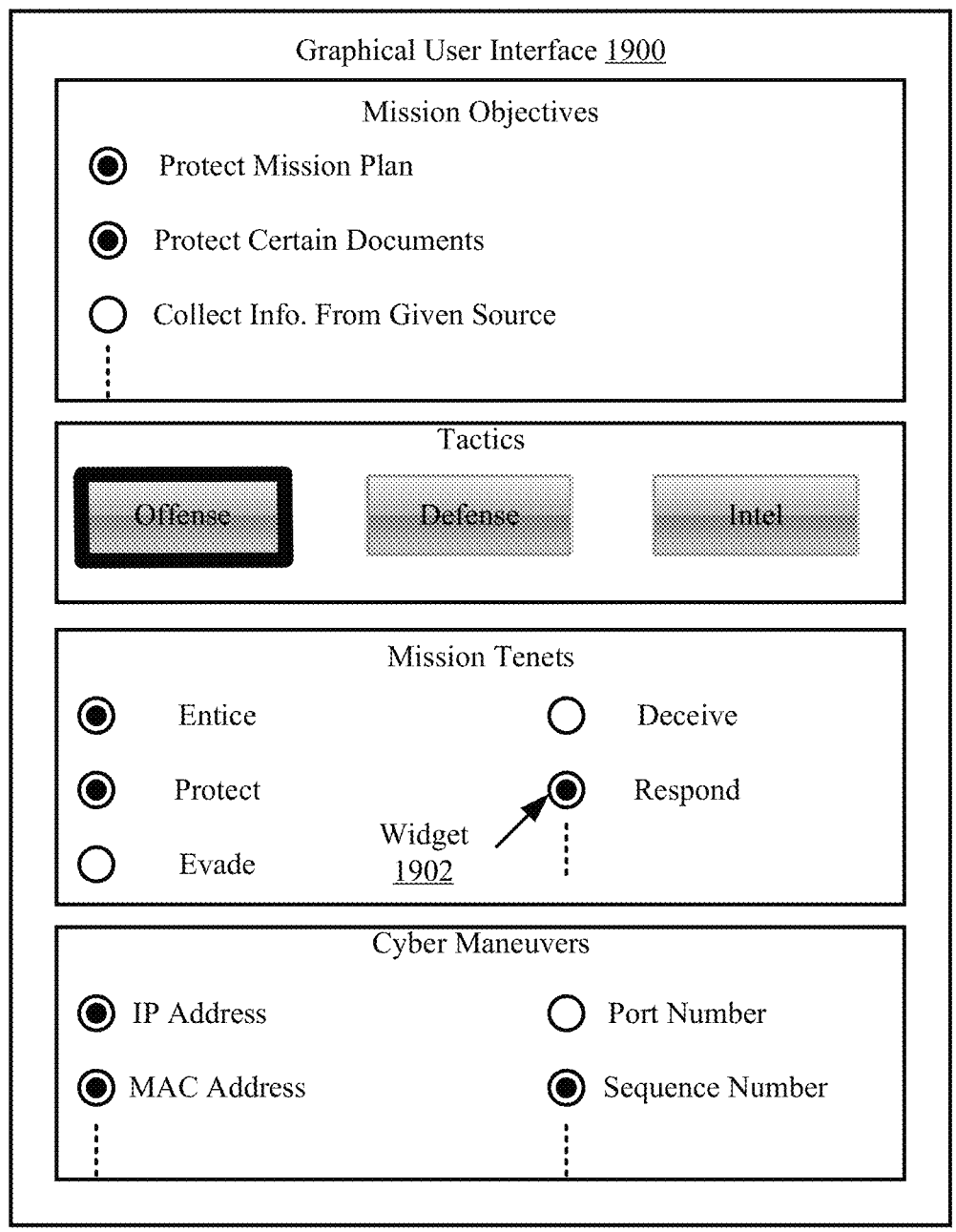
FIG. 19 is a schematic illustration of an exemplary graphical user interface for selecting mission objectives, tactics, tenets and cyber maneuvers.
Figure 20:
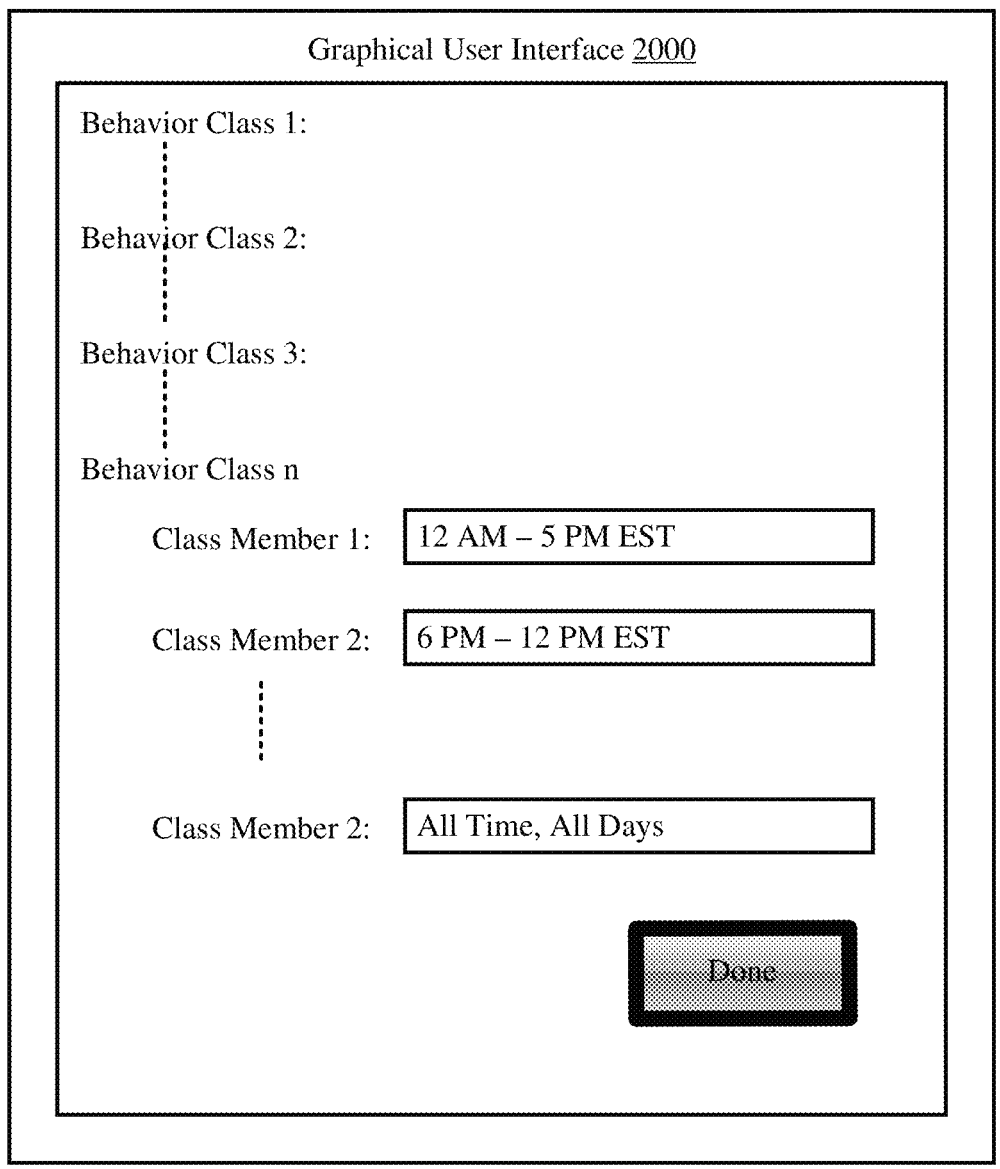
FIG. 20 is a schematic illustration of an exemplary graphical user interface that is useful for specifying times at which certain behavior classes should be employed.

The mission plan generation can be achieved using one or more GUIs. Illustrations of exemplary GUIs 1900, 2000 are provided in FIGS. 19-20. GUIs 1900, 2000 are designed to allow a user-software interaction for selecting CBM criteria. The GUI 1900 comprises a plurality of widgets 1902 which facilitate user-software interactions for selecting mission objectives, tactics, mission tenets and/or cyber maneuvers. The GUI 2000 comprises a plurality of text boxes and/or other graphic elements that allow a user to specify times at which all or portions of a CBM are to be employed for purposes of network maneuverability. The widgets and other graphical elements can include, but are not limited to, virtual buttons, check boxes, drop down menus (not shown), scroll bars (not shown), and/or any other known or to be known graphical control element.

Figure 22:
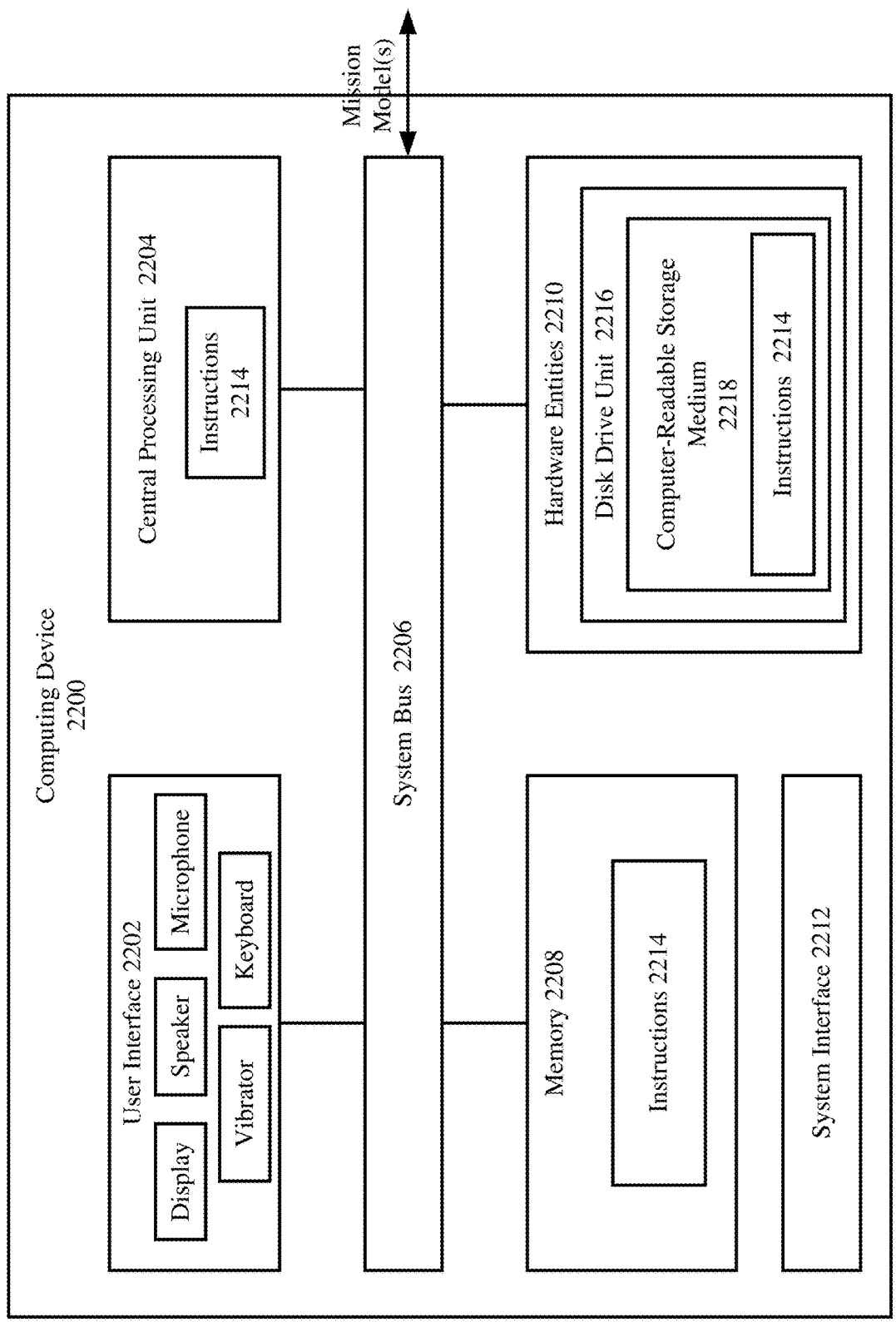
FIG. 22 is an illustration of an exemplary computer device.

Referring now to FIG. 22, there is provided a schematic illustration an exemplary computing device 2200. The computing device can include, but is not limited to, a personal computer, a laptop computer, a desktop computer and/or a server. The computing device 2200 is generally configured to perform operations for providing dynamic computer networks in which cyber behavior models drive cyber mission models. As such, the computing system 2200 comprises a plurality of components 2202-2212. The computing system 2200 can include more or less components than those shown in FIG. 22. However, the components shown are sufficient to disclose an illustrative embodiment implementing the present solution. Notably, the hardware shown in FIG. 22 can include physical hardware and/or virtual hardware.

The hardware architecture of FIG. 22 represents one (1) embodiment of a representative computing device configured to facilitate the provision of a dynamic computer network in which cyber behavior models drive cyber mission models. As such, the computing system 2200 implements methods of the present solution.

As shown in FIG. 22, the computing system 2200 includes a system interface 2212, a user interface 2202 (e.g., a keyboard for data input and a display for data output), a Central Processing Unit ("CPU") 2204, a system bus 2206, a memory 2208 connected to and accessible by other portions of the computing system 2200 through system bus 2206, and hardware entities 2210 connected to system bus 2206. System bus 2206 is also used to communicate one or more mission plans to and from the computing system 2200. At least some of the hardware entities 2210 perform actions involving access to and use of memory 2208, which can be a Random Access Memory ("RAM"), a disk driver and/or a Compact Disc Read Only Memory ("CD-ROM"). System interface 2212 allows the computing system 2200 to communicate directly or indirectly with external devices (e.g., sensors, servers and client computers).

Hardware entities 2210 can include microprocessors, Application Specific Integrated Circuits ("ASICs") and other hardware. Hardware entities 2210 can include a microprocessor programmed to facilitate the provision of a dynamic computer network in which cyber behavior models drive cyber mission models.

As shown in FIG. 22, the hardware entities 2210 can include a disk drive unit 2216 comprising a computer-readable storage medium 2218 on which is stored one or more sets of instructions 2214 (e.g., software code) configured to implement one or more of the methodologies, procedures, or functions described herein. The instructions 2214 can also reside, completely or at least partially, within the memory 2208 and/or the CPU 2204 during execution thereof by the computing device 2200. The components 2208 and 2204 also can constitute machine-readable media. The term "machine-readable media", as used here, refers to a single medium or multiple media (e.g., a centralized or distributed database, and/or associated caches and servers) that store the one or more sets of instructions 2214. The term "machine-readable media", as used here, also refers to any medium that is capable of storing, encoding or carrying a set of instructions 2214 for execution by the computing device 2200 and that cause the computing device 2200 to perform any one or more of the methodologies of the present disclosure.

Notably, the present solution can be implemented in a single computing device as shown in FIG. 22. The present solution is not limited in this regard. Alternatively, the present solution can be implemented in a distributed network system. For example, the present solution can take advantage of multiple CPU cores over a distributed network of computing devices in a cloud or cloud-like environment. The distributed network architecture ensures that the computing time of the statistics and enhanced functionality is reduced to a minimum, allowing end-users to perform more queries and to receive reports at a faster rate. The distributed network architecture also ensures that the implementing software is ready for being deployed on an organization's internal servers or on cloud services in order to take advantage of its scaling abilities (e.g., request more or less CPU cores dynamically as a function of the quantity of data to process or the number of parameters to evaluate).

Distribution and Loading of Mission Plans

The distribution and loading of mission plans as disclosed herein will now be described in further detail. Referring once again to FIG. 1, it can be observed that the modules 105-107, 113, 114 are distributed throughout the network 100 at one or more locations. The modules are integrated within the communications pathways to intercept communications at such locations, perform the necessary manipulations, and forward data to other computing devices within the network. With the foregoing arrangement, any necessary maintenance of the modules described herein (e.g., maintenance to update a mission plan) will have the potential to disrupt network communications while the modules are replaced or reprogrammed. Such disruptions are undesirable in many situations where reliability and availability of network services is essential. For example, uninterrupted network operation can be essential for computer networks used by military, emergency services and businesses.

In order to ensure uninterrupted network operations, each module preferably has several operating states. These operating states include (1) an off state in which the module is powered down and does not process any packets, (2) an initialization state in which the module installs software scripts in accordance with the mission plan, (3) an active state in which data is processed in accordance with a current mission plan, and (4) a by-pass state in which packets can flow through the module as if the module was not present. The module is configured so that, when it is in the active state or the by-pass state, the module can receive and load an updated mission plan provided by a network administrator. The module operating states can be manually controlled by the network administrator by means of the NCSA executing, for example, on NAC 104. For example, the user can select operating states for various modules through the use of a graphical user interface control panel. Commands for controlling the operating states of the network are communicated over the network 100, or can be communicated by any other suitable means. For example, a separate wired or wireless network (not shown) can be used for that purpose.

Figure 6:
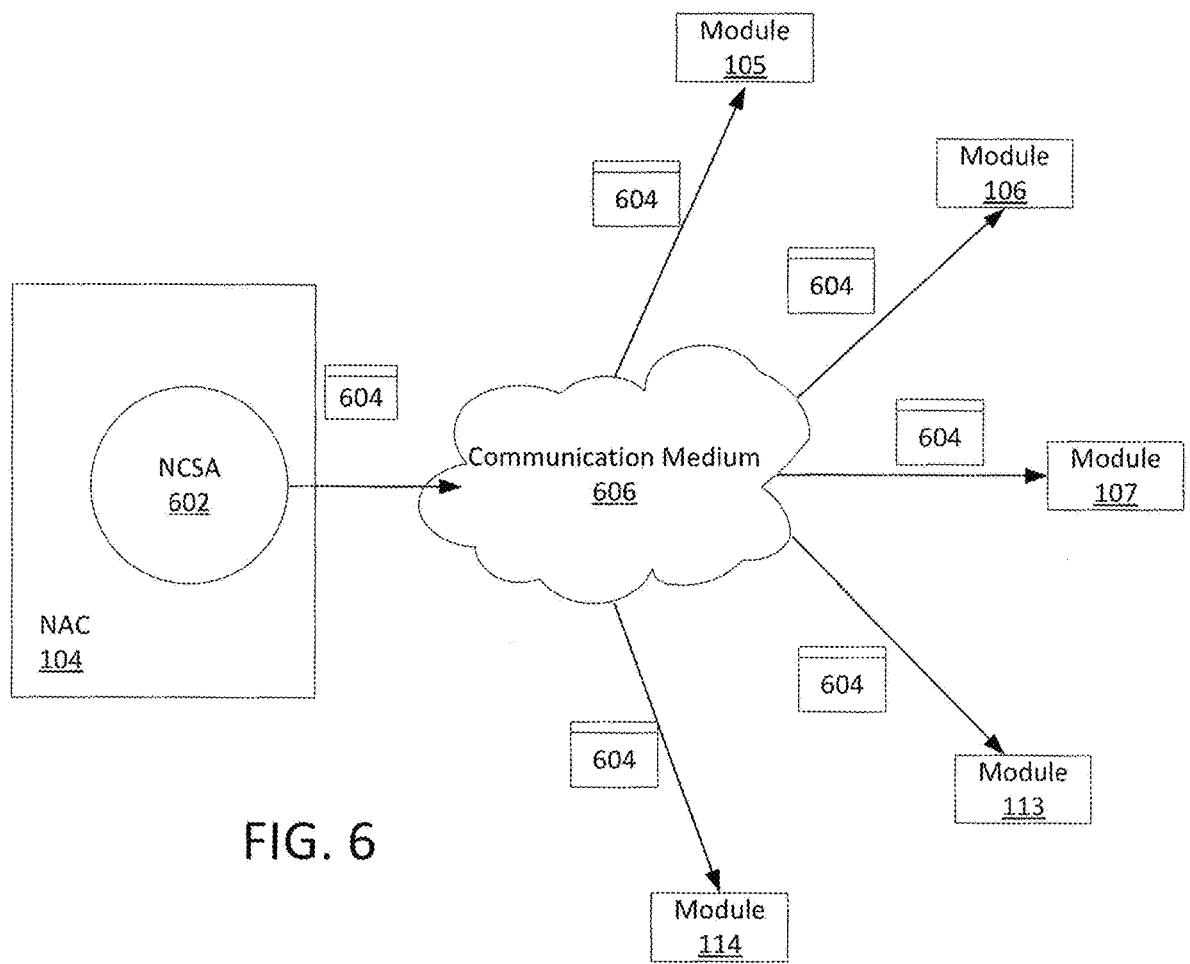
FIG. 6 is a diagram that is useful for understanding the way in which a mission plan can be communicated to a plurality of modules in the network in FIG. 1.
Figure 7:
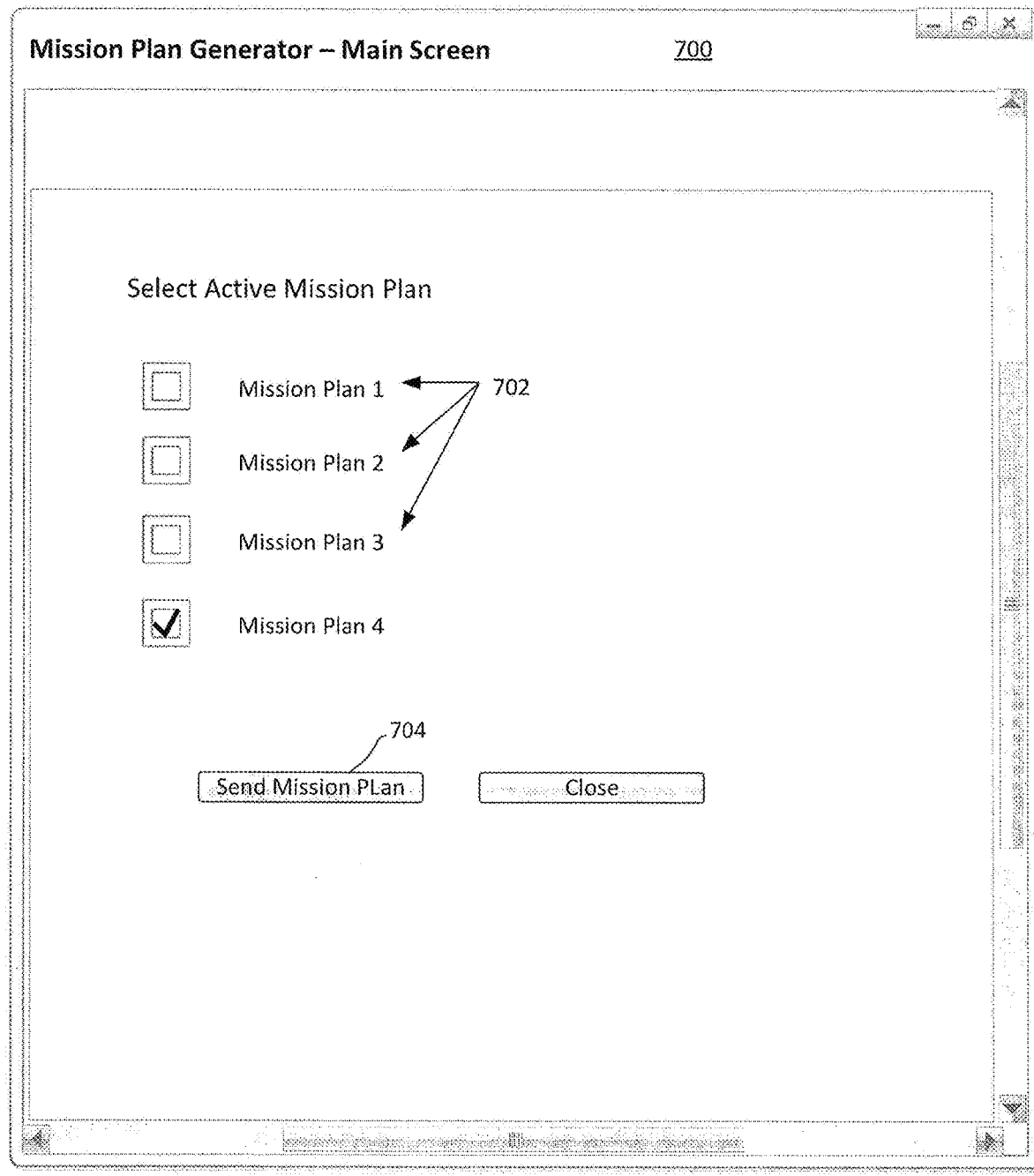
FIG. 7 is an example of a dialog box of a graphical user interface that can be used to select a mission plan and communicate the mission plan to the modules as shown in FIG. 6.

The mission plan can be loaded directly at the physical location of each module, or it can be communicated to the module from the NCSA. This concept is illustrated in FIG. 6, which shows mission plans 604 being communicated from NCSA 602 to each of the modules 105-107, 113, 114 over a communication medium 606. In the example shown, the NCSA software application is executing on NAC 104 operated by a network administrator. The communication medium can in some scenarios include in-band signaling using computer network 100. Alternatively, an out-of-band network (e.g., a separate wireless network) can be used as the communication medium 606 to communicate the updated mission plan from the NCSA to each module. As shown in FIG. 7, the NCSA can provide a dialog box 700 to facilitate selection of one of several mission plans 702. Each of these mission plans 702 can be stored on NAC 104. The network administrator can select from one of the several mission plans 702, after which they can activate a Send Mission Plan button 704. Alternatively, a plurality of mission plans can be communicated to each module and stored there. In either scenario, the user can choose one of the defined mission plans to activate.

In response to the command to send the mission plan, the selected mission plan is communicated to the modules while they are in an active state in which they are configured for actively performing dynamic modification of IDPs as described herein. Such an arrangement minimizes the time during which the network operates in the clear and without manipulating IDPs. However, the updated mission plan can also be communicated to the modules while they are in the by-pass mode, and this approach may be desirable in certain cases.

Once the mission plan is received by a module, it is automatically stored in a memory location within the module. Thereafter, the module can be caused to enter the by-pass state and, while still in that state, the module can load the data associated with the new mission plan. This process of entering into the by-pass state and loading the new mission plan data can occur automatically in response to receipt of the mission plan, or can occur in response to a command from the NCSA software controlled by the network administrator. The new mission plan preferably includes changes in the way that IDP values are varied. Once the new mission plan has been loaded, the modules 105-107, 113 and 114 can be transitioned from the by-pass mode to the active mode in a synchronized way to ensure that data communication errors do not occur. The mission plan can specify a time when the modules are to return to the active mode, or the network administrator can use the NCSA to communicate a command to the various modules, directing them to enter into the active mode. The foregoing process of updating a mission plan advantageously allows changes in network security procedures to occur without disrupting communication among the various computing devices attached to the computer network 100.

The dynamic manipulation of various IDPs at each module 105, 106, 107, 113 and 114 can be controlled by the application software executing on each module 105-107, 113, 114. However, the behavior of the application software is advantageously controlled by the mission plan(s).

Exemplary Module Operations

Figure 8:
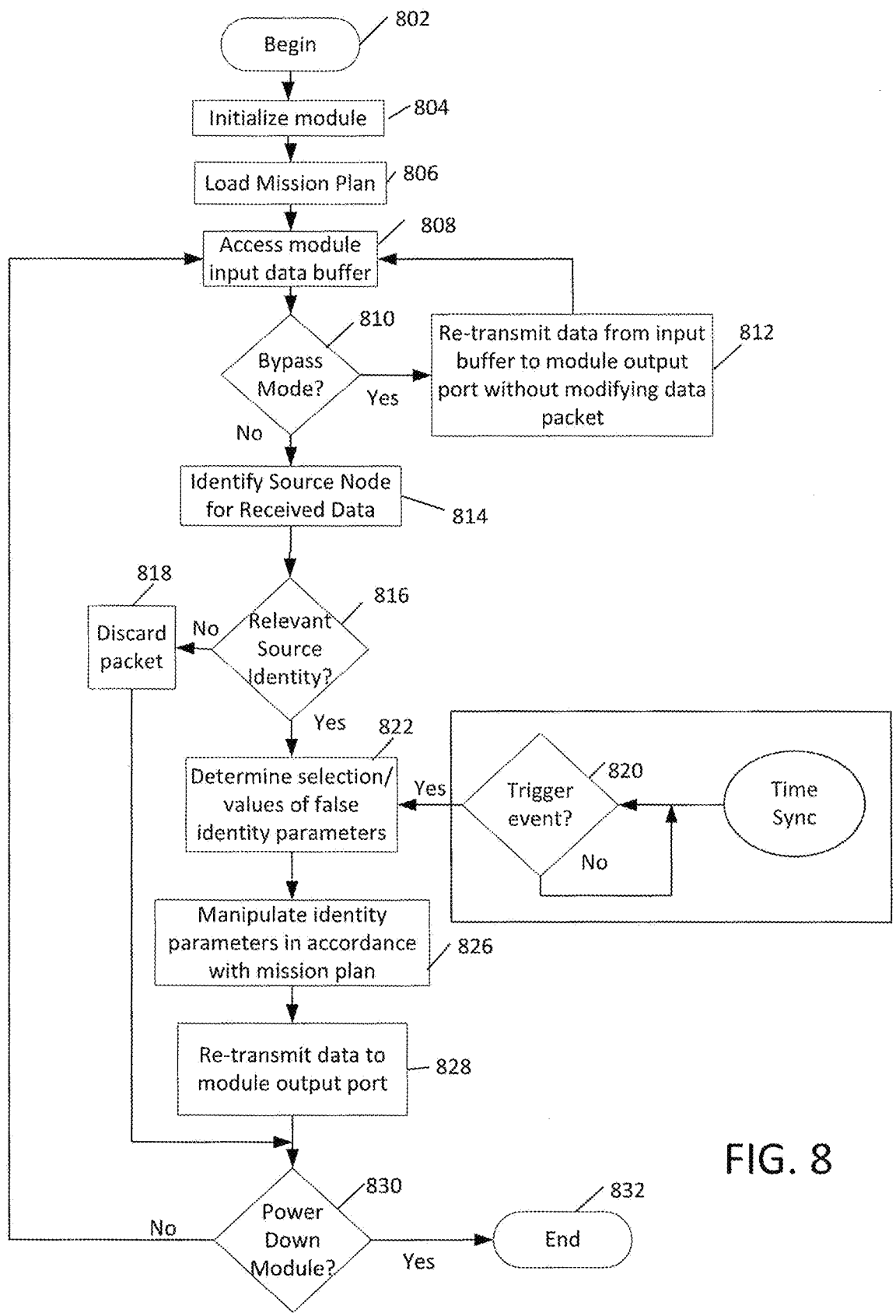
FIG. 8 is a flowchart that is useful for understanding the operation of a module in FIG. 1.

Referring now to FIG. 8, there is provided a flowchart which summarizes the operation of each module 105-107, 113, 114. To avoid confusion, the process is described with respect to communications in a single direction. For example, in the case of module 105, the single direction could involve data transmitted from client computer 101 to hub 108. In practice however, modules 105-107, 113, 114 may operate bi-directionally. The process begins at step 802 when the module is powered up and continues to step 804 where module application software is initialized for executing the methods described herein. In step 806, a mission plan is loaded from a memory location within the module. At this point, the module is ready to begin processing data and proceeds to do so at step 808, where it accesses a data packet from an input data buffer of the module. In step 810, the module checks to determine if it is in a bypass mode of operation. If so, the data packet accessed in step 808 is retransmitted in step 812 without any modification of the data packet. If the module is not in bypass mode, then it must be in its active mode of operation and continues on to step 814. In step 814, the module reads the data packet to determine the identity of a source node from which the data packet originated. In step 816, it examines the packet to determine if the source node is valid. The specified source node can be compared to a list of valid nodes to determine if the specified source node is currently valid. If it is not a valid node, then the packet is discarded in step 818. In step 820, the process checks to determine if a trigger event occurred. The occurrence of a trigger event will influence the selection of false identify values to use. Accordingly in step 822, the module determines the false identify values to use based on one or more of the trigger information, clock time and mission plan. The module then continues to step 826 where it manipulates IDPs of the data packet. Once manipulations are complete, the data packet is re-transmitted to an adjacent node from the output port of the module. In step 830, a determination is made as to whether the module has been commanded to power down. If so, the process ends at step 832. In step 808, the process continues and the next data packet is accessed from the module's input data buffer.

Exemplary Methods for Managing a Dynamic Computer Network

Figure 9:
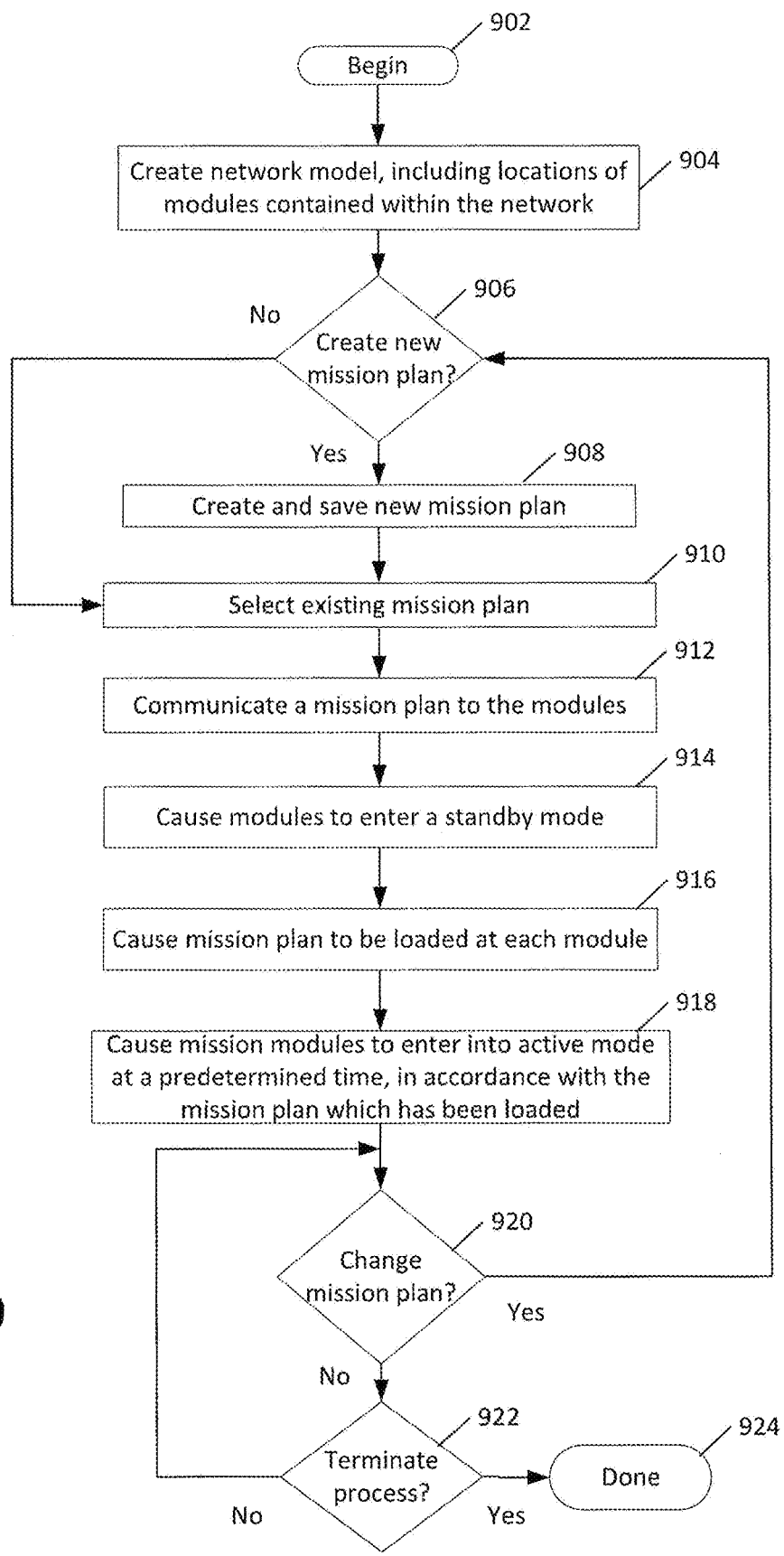
FIG. 9 is a flowchart that is useful for understanding the operation of a Network Control Software Application ("NCSA") in relation to creating and loading mission plans.

Referring now to FIG. 9, there is provided a flowchart which summarizes the methods described herein for managing a dynamic computer network. The process begins in step 902 and continues to step 904, where a network model is created (e.g., as shown and described in relation to FIG. 3). In step 906, a determination is made as to whether a new mission plan is to be created. If so, a new mission plan is created in step 908 and the process continues to step 910, where the new mission plan is selected. Alternatively, if in step 906 a desired mission plan has already been created, then the method can continue directly to step 910 where an existing mission plan is selected. In step 912, the mission plan is communicated to the modules (e.g., modules 105-107, 113, 114), where the mission plan is stored in a memory location. When the network administrator is ready to implement the new mission model, a command is sent in step 914 which causes the modules to enter a standby mode as described herein. While the modules are in this standby mode, the mission plan is loaded at step 916. Loading of the mission plan occurs at each module so that the mission plan can be used to control the operations of an application software executing on the module. In particular, the mission plan is used to control the way in which the application software performs dynamic manipulations of IDPs. In step 918, the mission modules are again caused to enter into an active operational mode in which each mission module performs manipulations of IDPs in accordance with the mission plan. Steps 914, 916 and 918 can occur in response to specific commands sent from a network administrator, or can occur automatically at each module in response to receiving the mission plan in step 912. After step 918, the modules continue performing processing in accordance with the mission plan which has been loaded. In step 920, the process continues by checking to determine if the user has indicated a desired to change the mission plan. If so, the process returns to step 906 where it continues as described above. If there is no indication that the user or network administrator wishes to change an existing mission plan, then the process determines in step 922 whether it has been instructed to terminate. If so, the process terminates in step 924. If no termination instruction is received, the process returns to step 920 and continues.

Exemplary Architectures for Various Components

Figure 10:
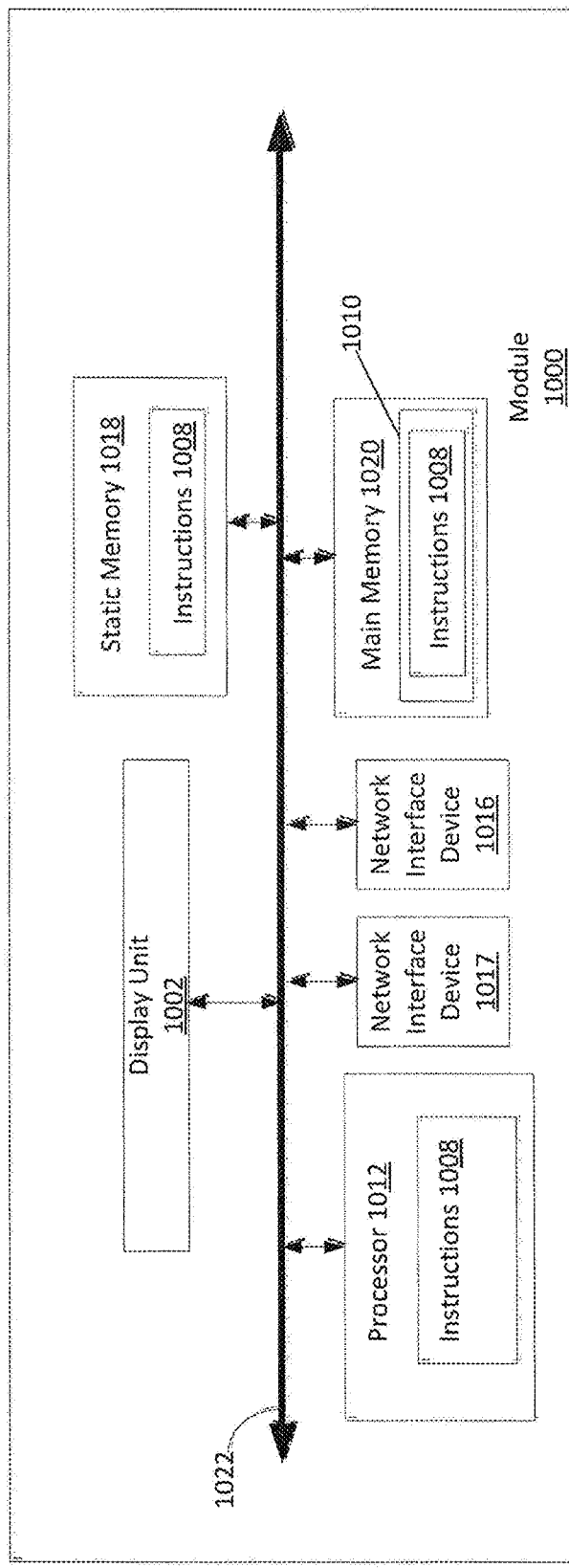
FIG. 10 is a block diagram of a computer architecture that can be used to implement the modules in FIG. 1.

Referring now to FIG. 10, there is provided a block diagram which shows a computer architecture of an exemplary module 1000 which can be used for performing the manipulation of IDPs described herein. The module 1000 includes a processor 1012 (such as a Central Processing Unit ("CPU"), a main memory 1020 and a static memory 1018, which communicate with each other via a bus 1022. The computer system 1000 can further include a display unit 1002, such as a Liquid Crystal Display ("LCD") to indicate the status of the module. The module 1000 can also include one or more network interface devices 1016, 1017 which allow the module to receive and transmit data concurrently on two separate data lines. The two network interface ports facilitate the arrangement shown in FIG. 1, where each module is configured to concurrently intercept and re-transmit data packets received from two separate computing devices on the network.

The main memory 1020 includes a computer-readable storage medium 1010 on which is stored one or more sets of instructions 1008 (e.g., software code) configured to implement one or more of the methodologies, procedures, or functions described herein. The instructions 1008 can also reside, completely or at least partially, within the static memory 1018, and/or within the processor 1012 during execution thereof by the module. The static memory 1018 and the processor 1012 also can constitute machine-readable media. In the various scenarios, a network interface device 1016 connected to a network environment communicates over the network using the instructions 1008.

Figure 11:
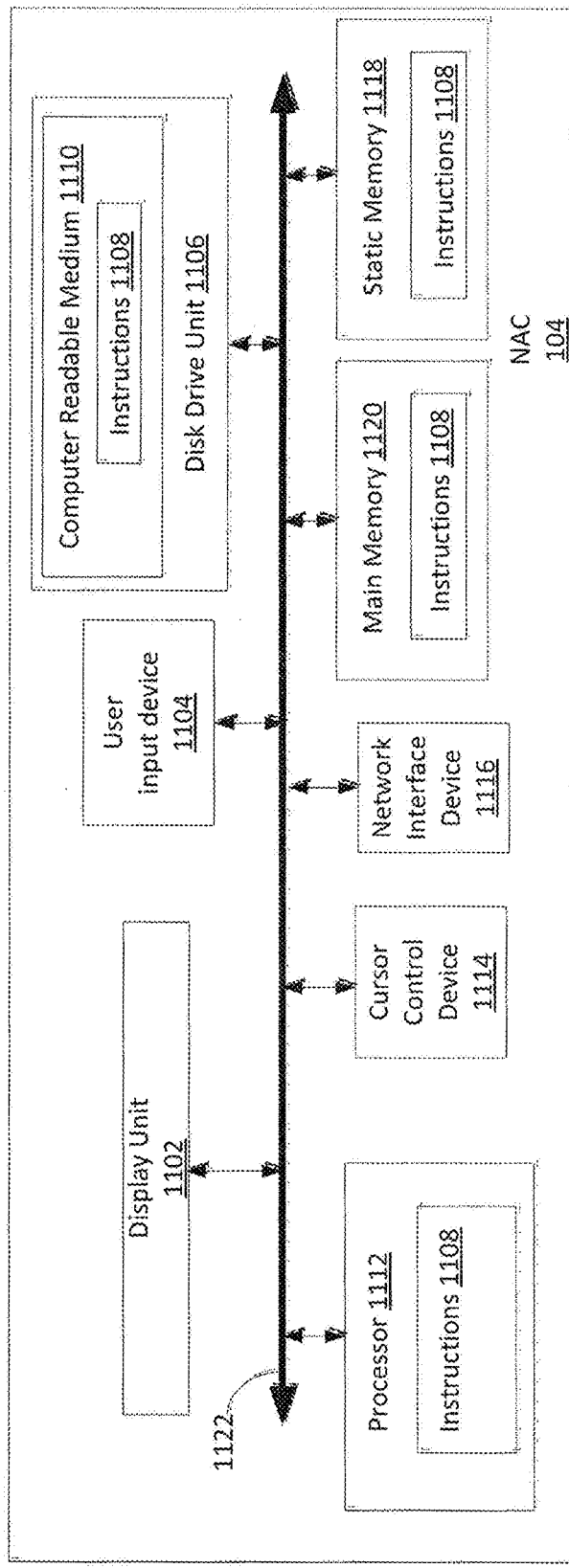
FIG. 11 is a block diagram of a computer architecture that can be used to implement the Network Administration Computer ("NAC") in FIG. 1.

Referring now to FIG. 11, there is shown an exemplary NAC 114 in accordance with the inventive arrangements. The NAC can comprise various types of computing systems and devices, including a server computer, a client user computer, a Personal Computer ("PC"), a tablet PC, a laptop computer, a desktop computer, a control system or any other device capable of executing a set of instructions (sequential or otherwise) that specifies actions to be taken by that device. Further, while a single computer is illustrated in FIG. 11, the phrase "NAC" shall be understood to include any collection of computing devices that individually or jointly execute a set (or multiple sets) of instructions to perform any one or more of the methodologies discussed herein.

Referring now to FIG. 11, the NAC 104 includes a processor 1112 (such as a central processing unit (CPU), a disk drive unit 1106, a main memory 1120 and a static memory 1118, which communicate with each other via a bus 1122. The NAC 104 can further include a display unit 1102, such as a video display (e.g., an LCD), a flat panel, a solid state display, or a Cathode Ray Tube ("CRT")). The NAC 104 can include a user input device 1104 (e.g., a keyboard), a cursor control device 1114 (e.g., a mouse) and a network interface device 1116.

The disk drive unit 1106 includes a computer-readable storage medium 1110 on which is stored one or more sets of instructions 1108 (e.g., software code) configured to implement one or more of the methodologies, procedures, or functions described herein. The instructions 1108 can also reside, completely or at least partially, within the main memory 1120, the static memory 1118, and/or within the processor 1112 during execution thereof. The main memory 1120 and the processor 1112 also can constitute machine-readable media.

Those skilled in the art will appreciate that the module architecture illustrated in FIG. 10 and the NAC architecture in FIG. 11, each represent merely one possible example of a computing device that can be used respectively for performing the methods described herein. However, the present solution is not limited in this regard and any other suitable computing device architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various scenarios broadly include a variety of electronic and computer systems. Some implementations of the present solution may implement functions in two or more specific interconnected hardware devices with related control and data signals communicated between and through the modules, or as portions of an application-specific integrated circuit. Thus, the exemplary system is applicable to software, firmware, and hardware implementations.

In accordance with the present solution, the methods described herein are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein.

While the computer-readable storage medium 1010, 1110 is shown in FIGS. 10 and 11 to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but is not be limited to, solid-state memories such as a memory card or other package that houses one or more read-only (non-volatile) memories, random access memories, or other re-writable (volatile) memories; magneto-optical or optical mediums such as a disk or tape. Accordingly, the disclosure is considered to include any one or more of a computer-readable medium as listed herein and to include recognized equivalents and successor media, in which the software implementations herein are stored.

Communications with Computing Devices Outside the Dynamic Network

While the methods described herein for dynamic manipulation of IDPs can work well within a network 100, they do present some problems for communicating with computers outside the network 100. For example, computers outside of the network 100 will not be aware of the dynamic processes at work for manipulating IDPs. Accordingly, communications with computers outside the network 100 are likely to be disrupted if appropriate actions are not taken. Accordingly, the network 100 advantageously includes at least one bridge 115 which is arranged to process communications entering or leaving the network 100. The bridge ensures that such communications between computing devices within the network 100 and computing devices outside the network 100 can occur without errors.

The bridge 115 is a computing device that will have a functional block diagram that is similar to that of a module as shown in FIG. 2. The bridge 115 can also have a computer architecture that is similar to that which is shown in FIG. 10. The operations performed by the bridge 115 are similar to those performed by the modules 105-107, 113, 114. The bridge will receive data communications from network 100 and will manipulate IDPs in accordance with a mission plan before re-transmitting such data communications to a second network 124. In some scenarios, such manipulations will involve conversion of false IDPs back to true IDPs, where the true IDPs are determined based on information contained in the mission plan. Such an arrangement is sufficient where the second network does not dynamically modify IDP information.

In an alternative scenario, the second network 124 is a dynamic network that operates in a manner similar to the network 100. As such, the second network may have its own mission plan (second mission plan). In that case, the bridge will receive IDPs in a data communication from the first network, and will transform a first set of those IDPs having false values to instead have true values. The mission plan for the second network 124 can specify an entirely different dynamic network. For example, the mission plan for the second network can specify different IDPs to be modified, different trigger timing, and so on. Accordingly, the bridge will need to receive a message from the first network, correct the false values in the first set in accordance with the mission plan of the first network 100, and then dynamically modify the same (or different) IDPs in a second set in accordance with the mission plan of the second network. Once the second set of IDPs has been properly converted to false values, the data communication is transmitted to the second network.

It will be appreciated that the first set is determined in accordance with a first mission plan associated with the first network, and the second set is determined in accordance with a second mission plan associated with the second network. Similarly, the false information contained in said first set is determined in accordance with first mission plan and the false information contained in the second set is determined in accordance with the second mission plan. The first set of IDPs can be the same or different as compared to the second set of IDPs. Also, it should be appreciated that the first and second set can include all or some of the IDPs included in the data communication. The data communication will generally be a packet data communication containing a plurality of IDPs. The bridge will also receive data communications from second network 124, and will manipulate the IDPs in such data communications in accordance with the mission plan of the first network, the second network or both. For example, the bridge can receive a second data communication from the second data network, which can include a second plurality of IDPs. The second IDPs may or may not specify false information, depending on whether the second network dynamically modifies IDPs. If the second network does not dynamically modify IDPs, then the bridge only needs to use the mission plan associated with the first network to dynamically transform a set of the second plurality of IDPs to specify false information.

If the second network does dynamically modify IDPs, then the bridge will need to use the mission plan associated with the second network to convert a first set of the second plurality of IDPs (having false values) to true values. This step is preferably performed before the bridge uses the mission plan associated with the first network to transform a second set of the second plurality of IDPs to false values. The first and second set can be the same or different, and will be determined in each case by the mission plan for each network. Likewise, the transformations performed to convert IDPs to false values can be the same or different, and will depend on the mission plan associated with each network. Thereafter, the bridge will re-transmit such data communications to the network 100.

In some scenarios, the false IDPs for network 100, 124 are determined in accordance with a pseudorandom process. In that case, the pseudorandom process and/or the seed values for the pseudorandom process can be determined by the mission plan for the associated network. Likewise, the selection of IDPs to be manipulated can be determined by a pseudorandom process, where the process and/or the seed values for such process are respectively determined by the mission plan associated with each network. The bridge will make changes to the false IDP values and/or the selection of IDPs to be manipulated in accordance with the occurrence of one or more trigger event as described above with reference to the modules. Unlike the modules, the bridge 115 will need to perform such actions with respect to trigger events occurring with respect to the first and second networks.

Aside from the need to potentially manage dynamic operations associated with more than one mission plan, the operation of the bridge 115 is similar to that of the modules. Still, it should be appreciated that the operations of the bridge 115 is different as compared to the operation of the modules 105-107, 113, 114. For example, unlike the modules, the location where IDP manipulations are performed does not change in the case of the bridge 115. Instead, bridge 115 will always be in the active mode when at least one module in the network 100 is in the active mode, since the bridge forms a link with computing devices outside the network 100.

Figure 12:
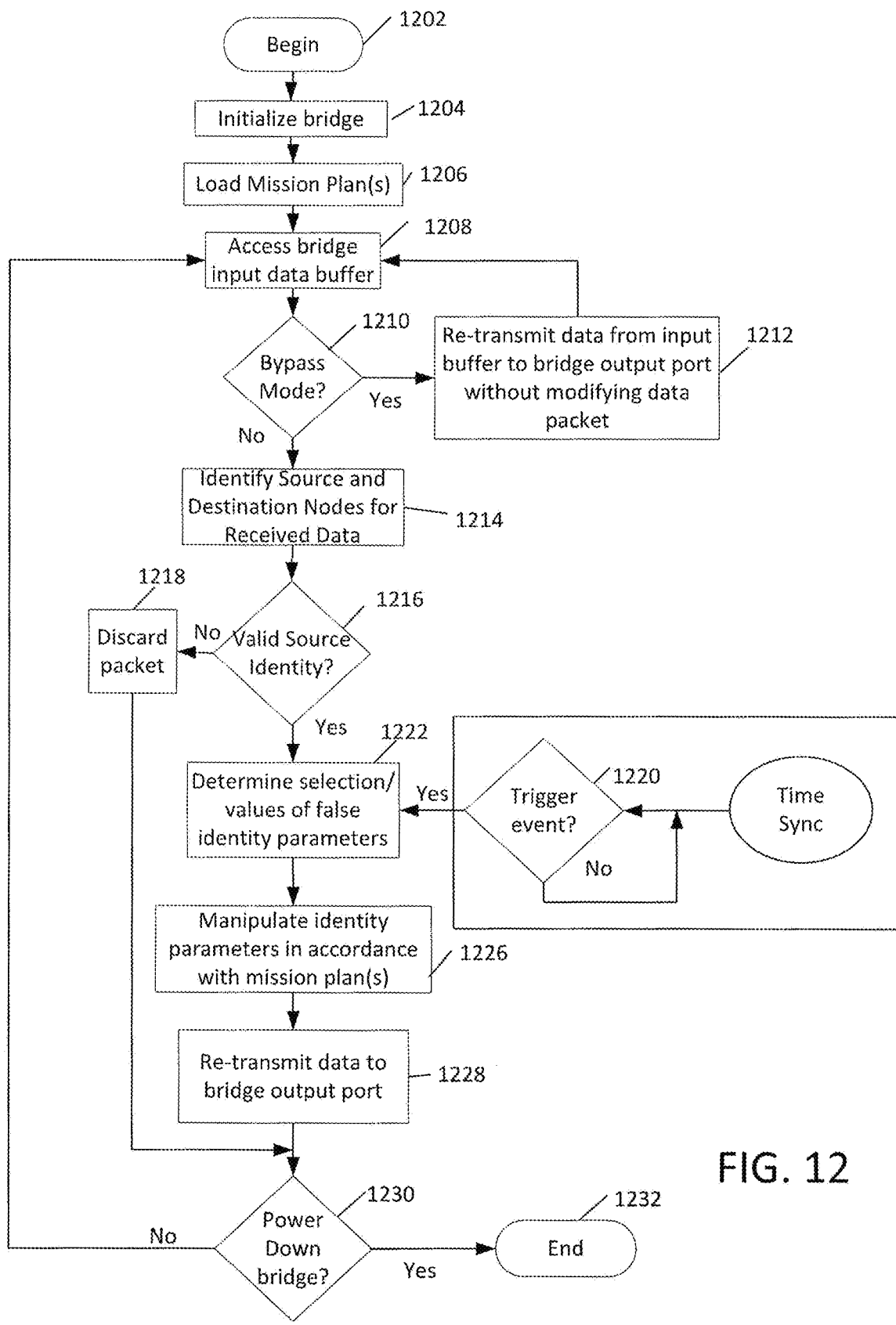
FIG. 12 is a flowchart that is useful for understanding the operation of a bridge in FIG. 1.

Referring now to FIG. 12, there is provided a flowchart which summarizes the operation of bridge 115. The process begins at step 1202 when the bridge is powered up and continues to step 1204 where bridge application software is initialized for executing the methods described herein. In step 1206, one or more mission plans are loaded from a memory location within the bridge. If the bridge is connected to a network that does not engage in dynamic manipulation of IDPs, then only a single mission plan is needed. However, if the bridge connects two or more networks that each dynamic modification of IDPs as described herein, then more than one mission plan will be loaded in step 1206. A first mission plan can define a dynamic maneuvering of a first network and a second mission plan can define a dynamic maneuvering of a second network. At this point, the bridge is ready to begin processing data and proceeds to do so at step 1208, where it accesses a data packet from an input data buffer of the bridge. In step 1210, the bridge checks to determine if it is in a bypass mode of operation. If so, the data packet accessed in step 1208 is retransmitted in step 1212 without any modification of the data packet. If the bridge is not in bypass mode, then it must be in its active mode of operation and continues on to step 1214.

In step 1214, the bridge reads the data packet to determine the identity of a source node from which the data packet originated, and the destination node. In step 1216, the bridge examines the data packet to determine if the source node valid. This can be accomplished by comparing the source node specified in the data packet to a current list of valid source nodes. If source node information is not valid then the packet is discarded in step 1218. In step 1220, the process checks to determine if a trigger event has occurred. This is an important step because the occurrence of a trigger event can have a significant effect upon the calculation of proper false identify values. If the bridge is using two or more mission plans, this step includes determining whether trigger events have occurred with respect to either mission plan. Notably, each mission plan can involve different trigger events.

The source and destination address information of the received data is important because it is needed to permit the bridge to determine how to properly manipulate the IDPs contained within the data communication. Once this information has been determined, the bridge then continues to step 1222 where it determines a selection/values of false IDPs. The process then continues on to step 1226 at which the bridge manipulates IDPs of the data packet in accordance with one or more mission plans. Once manipulations are complete, the data packet is re-transmitted at 1228 to an adjacent node from the output port of the bridge. In step 1230, a determination is made as to whether the bridge has been commanded to power down. If so, the process ends at step 1232. Otherwise, the process returns to 1208. In step 1208, the process continues and the next data packet is accessed from the bridge's input data buffer. As explained above, the type of manipulations performed at step 1216 will depend upon the source and destination of the data communications, and whether there is one, or more than one, networks that are being dynamically maneuvered.

Types of IDPs that can be Varied

Referring now to FIG. 13, there is provided a list of various IDPs that can be manipulated in accordance with the inventive arrangements. The list is not intended to be exclusive and other IDPs can also be manipulated without limitation.

The list shown in FIG. 13 includes some IDPs that can be manipulated by the modules 105-107, 113, 114 and/or by bridge 115. Each of the parameters listed in FIG. 13 is included in a data communication included in a network using a TCP/IP communication protocol. Most of the information types listed in FIG. 13 are well known to those skilled in the art. However, a brief description of each type of information and its use as an IDP is provided herein. Also provided is a brief discussion of the ways in which each IDP can be manipulated.

IP Address. An IP Address is a numerical identifier assigned to each computing device participating in a computer network where the network uses the well known Internet Protocol for communication. The IP address can be a thirty-two (32) bit or one hundred twenty-eight (128) bit number. For purposes of the present solution, the IP address number can be changed to a false value that is selected randomly (e.g., using a pseudorandom number generator). Alternatively, the false IP address value can be randomly selected from a predetermined list of false values (e.g., a list specified by a mission plan). The source and destination IP addresses are included in TCP header portion of a data packet. Accordingly, manipulation of these values is performed by simply changing by using packet manipulation techniques which change the IP header information. When the packet arrives at a second module (the location of which can be manipulated), the false IP address values are transformed back to their true values. The second module uses the same pseudorandom process (or its inverse) to derive the true IP address value based on the false value.

MAC Address. A MAC address is a unique value assigned to a network interface device by a manufacturer and stored in an onboard ROM. For purposes of the present solution, the source and/or destination MAC address can be changed to a false value that is selected randomly (e.g., using a pseudorandom number generator). Alternatively, the false MAC value can be randomly selected from a predetermined list of false values (e.g., a list specified by a mission plan). The source and destination MAC addresses are included in IP header portion of data packet. Accordingly, manipulation of these values is performed by simply changing an Ethernet header information of each packet. When the packet arrives at a second module (the location of which can be manipulated), the false MAC address values are transformed back to their true values. A module receiving a packet will use the same pseudorandom process (or its inverse) to derive the true MAC address value based on the false value.

Network/Subnet. In some scenarios, the IP address can be thought of as a single IDP. However, an IP address is generally defined as including at least two parts which include a network prefix portion and a host number portion. The network prefix portion identifies a network to which a data packet is to be communicated. The host number identifies the particular node within a Local Area Network ("LAN"). A sub-network (sometimes referred to as a subnet) is a logical portion of an IP network. Where a network is divided into two or more sub-networks, a portion of the host number section of the IP address is used to specify a subnet number. For purposes of the present solution, the network prefix, the subnet number and the host number can each be considered to be a separate IDP. Accordingly, each of these IDPs can be separately manipulated independently of the others in a pseudorandom way. Moreover, it will be appreciated that a data packet will include a source IP address and a destination IP address. Accordingly, the network prefix, the subnet number and host number can be manipulated in the source IP address and/or the destination IP address, for a total of six different variable IDPs that can be manipulated in a pseudorandom way. A module receiving a packet will use the same pseudorandom process as an originating node (or the inverse of such process) to derive the true Network/subnet information value based on the false value.

TCP Sequence. Two client computers communicating with each other on opposite sides of a TCP session will each maintain a TCP sequence number. The sequence number allows each computer to track how much data it has communicated. The TCP sequence number is included in the TCP header portion of each packet which is communicated during the session. At the initiation of a TCP session, the initial sequence number value is randomly selected. For purposes of the present solution, the TCP sequence number can be manipulated as an IDP in accordance with a pseudorandom process. For example, the TCP sequence number can be changed to a false value that is selected randomly (e.g. using a pseudorandom number generator). When the packet is received at a different module of the network (the location of which will be dynamically varied), the TCP sequence number can be transformed from a false value back to a true value, using an inverse of the pseudorandom process.

Port Number. A TCP/IP port number is included in the TCP or UDP header portion of a data packet. Ports as used in the TCP/IP communication protocol are well known in the art and therefore will not be described herein in detail. The port information is contained within the TCP header portion of the data packet. Accordingly, manipulation of the port information is accomplished by simply modifying the TCP header information to change a true port value to a false port value. As with the other IDPs discussed here, the port number information can be manipulated or transformed to a false value in accordance with a pseudorandom process at a first module. The port information can later be transformed from a false value to a true value at a second module, using an inverse of the pseudorandom process.

In sum, as explained above, there are many parameters of maneuverability. For example, these parameters include, but are not limited to, IDPs, physical transport medium, payload data (cryptography), transport protocols, end point behavior profile, traffic profile, mathematical function (e.g., for the transformation codes for selecting false IDPs and/or rate of change of IDPs), virtual end point parameters, and/or other maneuver parameters.

Ontogenesis Engine

The following discussion describes an ontogenesis engine that can be used in a variety of applications. These applications include, but are not limited to, cyber-maneuver applications, robotic applications, autonomous vehicle applications, ethical intelligent behavior applications, predictive behavior model applications, and/or any complex behavior-cognitive multi-agent dynamic system application (e.g., a drone system, an autonomous vehicle or robotic delivery system, etc.). The ontogenesis engine will be described below in relation to the cyber-maneuver applications simply for ease and clarity of discussion. The present solution is not limited to the particulars of the cyber-maneuver applications.

The word "ontogenesis", as used herein, refers to a process for developing behavioral features and/or behavior knowledge from the earliest stage to maturity. Accordingly, the ontogenesis engine is generally a dynamic behavior defining and control engine which captures, generates and analyzes temporal and contextual knowledge and maintains the same over time. The knowledge may change over time and/or become obsolete. The ontogenesis engine is able to recognize new knowledge, determine when the knowledge needs to be changed, and/or determine when the knowledge becomes obsolete. In response to such determination(s), the ontogenesis engine can modify the knowledge or replace the knowledge with new knowledge.

The knowledge generation of the ontogenesis engine can be integrated with an Observe Orient Decide Act ("OODA") loop function or framework to improve contextual awareness in multiple dimensions (e.g., time, location, geospatial and haptic) and/or modify system behaviors to produce a desired result. For example, the knowledge of the ontogenesis engine can be used in an OODA loop which causes a CBM (e.g., CBM 1410 of FIG. 14, 1600 of FIG. 16, or 1700 of FIG. 17), a behavior model and/or mission plan (e.g., mission plan 2100 of FIG. 21) to be modified or revised over time.

The ontogenesis engine can be implemented by a centralized computing device (e.g., computing device 2200 of FIG. 22) or have operations that are distributed amongst a plurality of computing devices. For example, in some scenarios, operations of the ontogenesis engine are performed by the NAC 104 of FIG. 1, server 111 of FIG. 1, server 112 of FIG. 1, or another computing device of the network 100 to improve rapid, complex decision making in mission operations, planning and system configuration. However, in other scenarios, operations of the ontogenesis engine are performed by two or more of the listed devices, respectively. The present solution is not limited to the particulars of this example.

Figure 23:
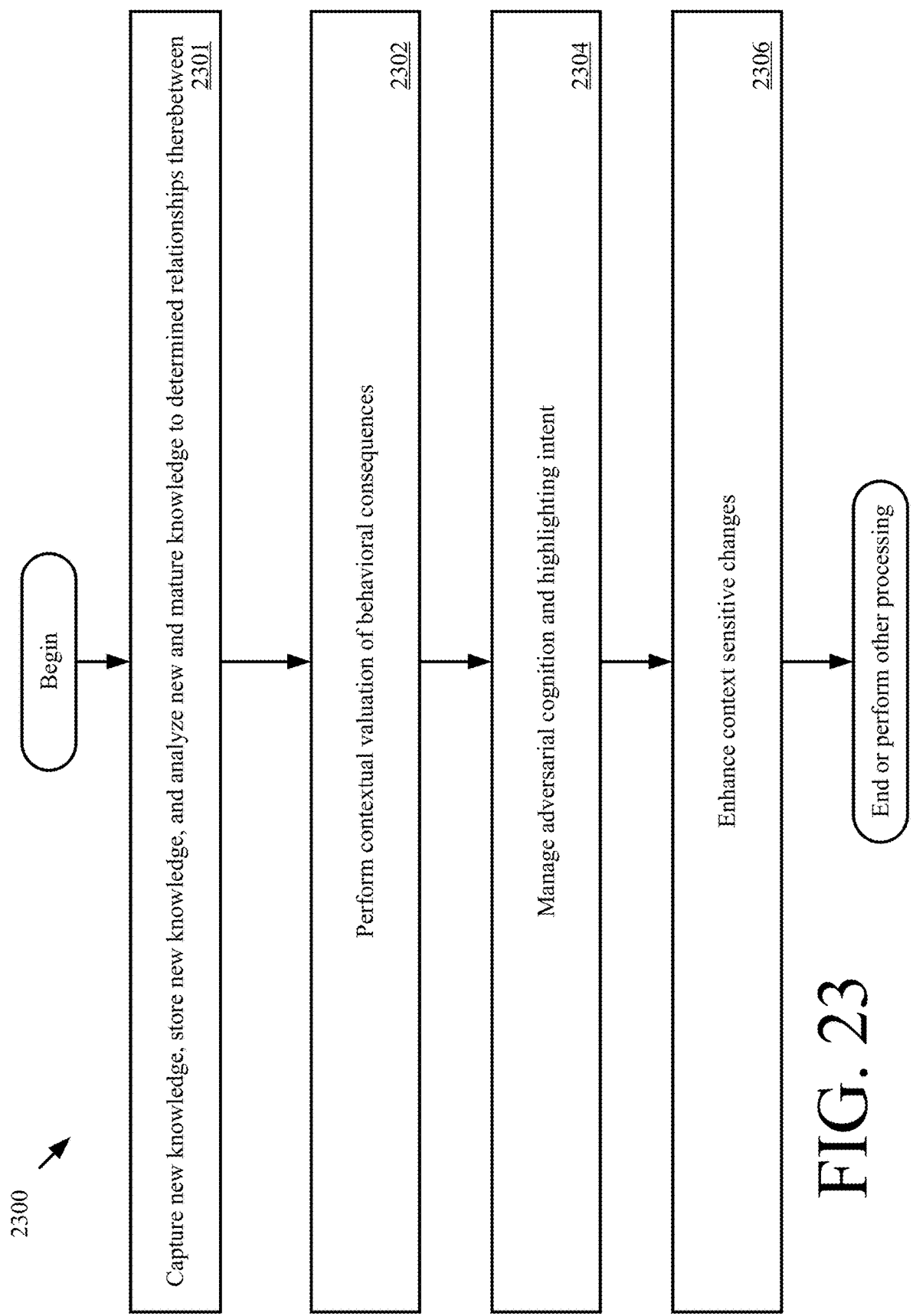
FIG. 23 provides an illustration that is useful for understanding operations performed by an ontogenesis engine.

A flow diagram of an illustrative method 2300 that is performed by the ontogenesis engine is provided in FIG. 23. The present solution is not limited to the order of the operations 2304-2306 shown in FIG. 23. The operations 2304-2306 can be performed in the same or different order than that shown in FIG. 23. The order in which operations 2304-2306 are performed is application dependent. Alternatively, the operations 2304-2306 can be discrete operations rather than connected to each other as shown in FIG. 23, can be dependent on other discrete operations, and/or have relationships defined within the CBMs.

In accordance with method 2300, the ontogenesis engine performs automated ontogenesis (knowledge recognition/ acquisition/generation) for the capture and storage of knowledge (e.g., new and/or existing data objects) as shown by 2301, the creation, analysis and control of contextual valuation of behavioral consequences as shown by 2302, the management of adversarial cognition and highlighting intent as shown by 2304, and the enhancement of context sensitive changes as shown by 2306.

With regard to 2301, the ontogenesis engine may capture new knowledge, store new knowledge in a data store (e.g., a database), and analyze the new knowledge and mature (or old) knowledge to determine relationships therebetween. The mature (or old) knowledge comprises knowledge which was previously captured and stored in the data store. The new knowledge is captured, for example, using sensors distributed throughout a computer system or network system. The sensors can include, but are not limited to, environmental sensors, cameras, proximity sensors, biometric sensors, heat sensors, temperature sensors, humidity sensors, motion sensors, and/or location sensors. The new knowledge may additionally or alternatively be captured based on results of a data analysis in which information is inferred or derived. The relationships between new and mature knowledge may be determined based on the inferred or derived information.

With regard to 2302, the context of a given situation is determined based on the new knowledge and/or the mature knowledge previously captured, for example, in 2301. The new knowledge and/or mature knowledge can include information identifying the people or data objects associated with the situation, the behavior of the people or data objects associated with the situation, the objective and/or aims of the people or data objects associated with the situation, the vehicles associated with the situation, the purpose of vehicle operations/behaviors, the computing device(s) associated with the situation, the purpose of the computing device operations/behaviors, the network nodes associated with the situation, the purpose of network node operations/behaviors, and/or the means by which the situation is brought about. This context is also referred to herein as situational context. The terms "context" and "situational context", as used here, refers to information that describes the reason why something is occurring, the behaviors associated with the situation, the circumstances associated with the situation, and/or the specific setting in which events occur. Techniques for determining situational context by computing devices are well known in the art, and therefore will not be described herein. Any known or to be known technique for determining situational context can be used herein without limitation.

The ontogenesis engine defines parameters, factors and/or coefficients for a plurality of different sets of actions that could occur in the situational context. For example, in the cyber maneuver applications, the situation can include, but is not limited to, enabling a network to exhibit a behavior and resultant structure to entice attack vectors from adversaries or opponents. The context can include, but is not limited to, strengthening a network prior to upgrading or strengthening a network after a coordinated attack effort. The different sets of actions can include, but are not limited to, creation of a shadow network to set one or more operations for identifying the adversary and/or obtaining an understanding of the adversary's behavior. The parameters can include, but are not limited to, false IDPs, identifiers for network nodes that are perform the IDP translations, and/or a time period for performing the IDP translations. The factors can include, but are not limited to, a number of shadow networks and/or the maneuver velocities The coefficients can include, but are to limited to, rate of maneuver of individual IDPs. The present solution is not limited to the particulars of this example.

The ontogenesis engine then simulates the sets of actions to generate predicted consequences resulting from the performance of certain behaviors by the people, vehicle(s), computing device(s) and/or network nodes in the context of the situation. Techniques for simulating sets of actions of network systems, computer systems and/or other electronic devices (e.g., vehicles) are well known in the art, and therefore will not be described herein. Any known or to be known simulation technique can be used herein. In some scenarios, computer models of the network systems, computer systems and/or other electronic devices are used to facilitate the simulations.

In the cyber maneuver scenarios, the simulations performed by the ontogenesis engine are intended to present information to adversaries in an environment and determine the intent of the adversaries utilizing various tactics (e.g., a strategy planned to achieve a specific end (or mission objective) and maneuver tenets (e.g., a principle of network maneuverability for implementing a specific offensive, defensive or intelligence collection strategy (or tactic).

The predicted consequences are then evaluated to determine their relative values. In some scenarios, the relative values are determined based on whether or not certain actions, conditions or results are reflected by the predicted consequences. For example, if the predicted consequence is more desirable to a given individual or entity, then the predicted consequence is deemed to have greater value than other predicted consequence which are less desirable to the given individual or entity. If a predicted consequence indicates that one or more individuals will incur an injury (or alternatively will not incur an injury) as a result of performance of the corresponding behavior by the individual(s)/vehicle(s)/computing device(s)/network node(s), then that predicted consequence is deemed to have less value (or alternatively greater value) than the other predicted consequence(s) which indicate that no injuries will result from performance of the corresponding behavior by the individual (s)/vehicle(s)/computing device(s)/network node(s). If a predicted consequence indicates that a monetary profit will result from performance of the corresponding behavior by the individual(s)/vehicle(s)/computing device(s)/network node(s), then the predicted consequence is deemed to have a greater value than other predicted consequence(s) that indicate a monetary loss will result from performance of the corresponding behavior by the individual(s)/vehicle(s)/computing device(s)/network node(s). If the predicted consequence indicates that benefits will be bestowed on people or entities directly or indirectly involved in the situation, then the predicted consequence is deemed to have greater value than other predicted consequence which indicate that people/entities will not experience any benefits. One or more different factors can be considered when determining the relative values of predicted consequences. Accordingly, weights may be used to reflect the factors relative importance. For example, injury is weighted greater than monetary gain. The present solution is not limited to the particulars of this example.

As a result of the evaluation, each predicted consequence may be assigned a number representing its relative value. For example, a first predicted consequence is assigned a one and a second predicted consequence is assigned a five. These two numbers one and five indicate that the second predicted consequence has a greater value then the first predicted consequence. The present solution is not limited in this regard.

With regard to 2304, an analysis is performed to determine whether an adversary or opponent would be able to recognize the intent of the behavior associated with one or more of the predicted consequences (e.g., the N predicted consequences with the greatest or least value, when N is an integer equal to or greater than one). This analysis involves: observing the behavior of the adversary or opponent; making inferences from the observed behavior about the intelligence and technological capabilities of the adversary or opponent; and using the inferences and simulations to determine whether or not the adversary or opponent is likely to recognize the intent of the behavior associated with one or more of the predicted consequences or to get the adversary to respond to a particular behavior. These actions are tools to reveal what are the aims of the adversary's behavior/intent and/or to hide the implemented behavior for protecting the network from reconnaissance by the adversary. Computer implemented methods for making inferences about the intellectual and/or technological capabilities of adversaries and/or opponents based on observed behaviors are well known in the art, and therefore will not be described herein. Any known or to be known computer implemented method for making inferences about the mental and/or technological capabilities of adversaries and/or opponents based on observed behaviors can be used herein.

Based on results of the analysis performed in 2304, a predicted consequence is selected by the ontogenesis engine. For example, the ontogenesis engine selects the predicted consequence that is associated with the least likely possibility that the adversary or opponent will recognize the intent of the behavior associated therewith. Next, the ontogenesis engine causes the behaviors associated with the selected predicted consequence to be performed by individual(s), vehicle(s), computing device(s), and/or network node(s). For example, in the cyber maneuver applications, one or more CBMs and/or mission plans is modified. In effect, the locations at which IDPs are modified within a network is changed and/or the IDPs which are to be modified in the network are changed. The present solution is not limited to the particulars of this example.

With regard to 2306, a data analysis is performed to detect changes therein. In some scenarios, the behaviors which the individual(s), vehicle(s), computing device(s) and/or network node(s) performed in 2304 cause the change in the data. In other scenarios, the change in data results from the behavior of another individual, vehicle, computing device and/or network node which was not caused by the ontogenesis engine in 2304. If the change indicates that a particular event occurred (e.g., a funny noise was generated by a car or a system error/fault was detected by a network node), then the behavior of one or more individuals, vehicles or network nodes is controlled to cause the particular event to occur once again so that more data is elicited which can be used to uncover the meaning of the change in data, what is prompting the change in the data, and/or what is the cause of the change in data. This information provides an understanding of the situational context and the sensitivity to the changes in the behavior of the individual(s), vehicle(s), computing device(s) and/or network node(s).

In the cyber-maneuver application, the above described process 2300 provides a dynamic behavioral learning engine that: acquires and revises behavioral models and activity repertoire over time; and correlates behaviors to behavior goals by leveraging scenario testing/simulation and the influence of moderating and mediating variables (for example, destruction may not be an option). The process 2300 drives the maturity of relevant behavior libraries incorporating OODA loop factual learning, and provides a measure of effectiveness and efficiency of CBMs, behavior models and/or mission plans.

Notably, human experience and processing is governed by physical limitations and artifacts of biological cognition (forgetting, narrow consciousness, attentional limits, lack of self-awareness and patterns, failure to retrieve relevant information, and/or self-interest). The ontogenesis engine augments (ameliorates cognitive and physical limitation of) humans during critical decision making (more options=more time to decide). The ontogenesis engine evolves to serve the human to decrease workload, enhance behaviors, improve decisions, accelerate changes, and increase overall human effectiveness.

Figure 24:
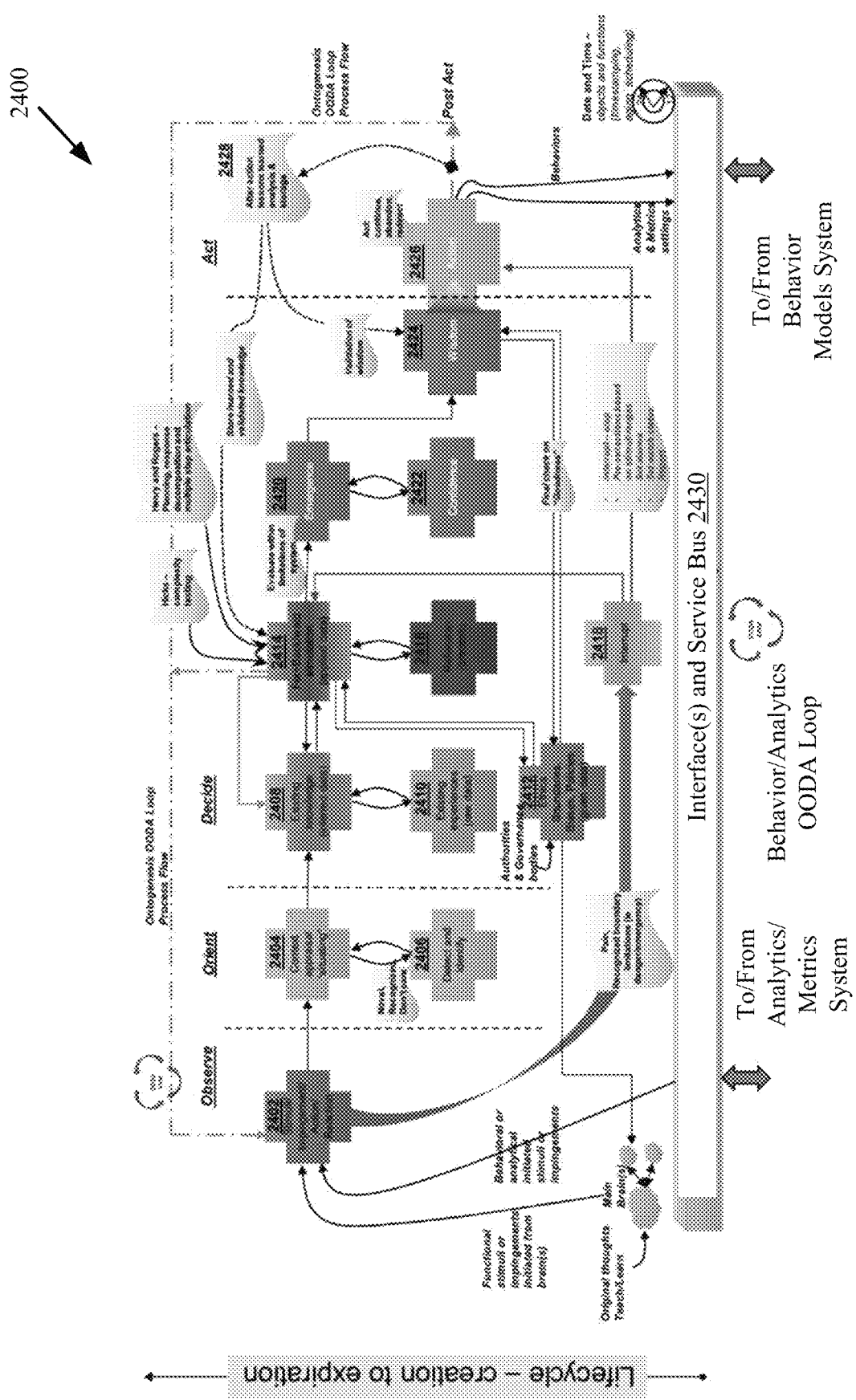
FIG. 24 provides an illustration of an illustrative module architecture for the ontogenesis engine.

Referring now to FIG. 24, there is provided an illustration of an illustrative architecture 2400 for the ontogenesis engine. The ontogenesis engine comprises a non-transitory computer-readable storage medium comprising programming instructions that are configured to cause one or more processors (e.g., CPU 2204 of FIG. 22) to implement the process 2300. The programming instructions comprise instructions to cause operations of modules 2402-2426 to be performed in a manner similar to an OODA loop, overlaid on an OODA loop process, and/or at least partially embedded within an OODA loop of a system (e.g., system 100 of FIG. 1). For example, operation of module 2402 may correspond to the observe portion of the OODA loop, operations of modules 2402-2406 may correspond to the orient portion of the OODA loop, operations of modules 2408-2424 may correspond to the decide portion of the OODA loop, and operation of module 2426 may correspond to the act portion of the OODA loop. The term "module", as used herein, refers to a part of a software program and/or the hardware on which the software program is loaded and run.

The operations of module 2402 involve detecting occurrences of and collecting data related to a newly detected conditions, a stimuli and/or an impingement action. The stimuli and/or impingement action can result from sensor operations, system training operations and/or system learning operations. The stimuli can include, but is not limited to, a particular event involving an individual, vehicle, computing device or network node (e.g., a vehicle crash or a network node fault/error), and/or a change in a measured surrounding environment's characteristic (e.g., heat, moisture, light, etc.). The impingement action can include, but is not limited to, a cyber-attack occurrence, a change in an object's relationship with a data object, and/or an object that changes proximity to an individual, vehicle, computing device, network node, or data object.

The operations of module 2404 involve performing an analysis of the data collected in module 2402 to determine the situational context associated with the stimuli and/or impingement action. The situational context can include, but is not limited to, a time, a location, information specifying characteristics of at least one individual, information specifying characteristics of at least one vehicle, and/or information specifying characteristics of a surrounding environment. A situational context of a given situation may be determined based on the people or data objects associated with the situation, the behavior of the people or data objects associated with the situation, the objective and/or aims of the people or data objects associated with the situation, the vehicles associated with the situation, the purpose of vehicle operations/behaviors, the computing device(s) associated with the situation, the purpose of the computing device operations/behaviors, the network nodes associated with the situation, the purpose of network node operations/behaviors, and/or the means by which the situation is brought about.

The operations of 2406 involve analyzing the data collected in 2402 to detect and identify any individual, object, and/or inferred relationship associated with the impingement action. For example, the data analysis identifies a person that is in close proximity to a given unmanned ground vehicle, identifies a vehicle that is in close proximity to a given building, identifies an unmanned aerial vehicle that is in close proximity to an air craft carrying people, and/or determines an inferred relationship between two or more data objects. The present solution is not limited to the particulars of this example.

The operations of modules 2408-2424 are performed to determine whether an action should be taken in view of the stimuli and/or impingement action, and if so what action should be taken in 2426. In a cyber-maneuver application, the action taken can include, but is not limited to, revising CBMs/behavioral models/mission plans, and revising activity repertoire.

Operations of 2408 involve analyzing an existing knowledge data store 2410 to determine if actions, given a CBM, were previously performed by an individual, vehicle and/or network node when the same or similar stimuli and/or impingement action occurred on one or more previous occasions. If so, then a determination is made as to whether the total number of stimuli and/or impingement action occurrences exceeds a threshold number. A determination may also be made as to whether the stimuli and/or impingement action occurred at least once during a threshold period of time. However, operations of 2408 also involve whether the stimuli and/or impingement action is new and/or related to another data object. If so, then a new information object and information specifying the new information object's relationship with the another data object are stored in the knowledge data store, and subsequently used in simulation operations. For example, if a new attack vector is identified and determined to be related to a previous attack vector, then a data object for the new attack vector is stored in the knowledge data store along with information indicating the relationship between the new and previous attack vectors.

If the stimuli and/or impingement action previously occurred less than or more than a threshold number of times and/or occurred within a threshold period of time, then simulation operations of module 2414 are performed using results of previous simulations associated with the particular stimuli and/or impingement action. For example, the sets of parameters, factors and/or coefficients used in previous simulations are used to generate new sets of parameters, factors and/or coefficients. At least one value of each new set has a different value than that of a corresponding previous simulation set value. In some scenarios, new sets of parameters/factors/coefficients are generated by incrementally increasing and/or decreasing at least one previous simulation's value within a pre-defined range (e.g., ±1 until the value reaches a certain level).

The new sets of parameters, factors and/or coefficients are used by module 2414 to simulate certain behaviors by individual(s), vehicle(s) and/or network nodes in the context of the situation. The simulation operations of module 2414 are performed in accordance with relevant ethical polices, ethical rules, and/or pre-defined boundary governance definitions stored in the data store (2412). The ethical policies in 2412 establish expectations for system performance, vehicle performance, network node performance, and/or individual performance. The ethical rules define mechanisms for ensuring ethical policy compliance. The boundary governance definitions describe what is included in and/or excluded from the scope of certain projects or missions. The simulation operations of 2414 produce one or more predicted consequences.

If the stimuli and/or impingement action did not previously occur more than the threshold number of times and/or did not occur within the threshold period of time, then the raw data associated with the previously performed action(s)

is(are) retrieved by module 2410 from the data store. The raw data is then used in module 2414 to simulate certain behaviors by individual(s), vehicle(s), computer device(s) and/or network nodes in the context of the situation. For example, the raw data is used to generate sets of parameters/factors/coefficients to be used for the simulation of system operations in the context of the situation. The simulation operations of module 2414 are performed in accordance with relevant ethical polices, ethical rules, and/or pre-defined boundary governance definitions stored in the data store.

In the case where this is the first occurrence of the stimuli and/or impingement action, the ontogenies engine 2400 generates one or more sets of parameters/factors/coefficients to be used in the simulation operations of module 2414. The sets of parameters/factors/coefficients are generated based on a random selection scheme, an arbitrary selection scheme, an additive selection scheme, a substantive selection scheme, and/or a behavior changing scheme. The random selection scheme involves randomly selecting values from within a pre-defined range of values. The arbitrary selection scheme involves arbitrarily selecting values from within a pre-defined range of values. The additive selection scheme involves adding pre-specified amounts to a pre-defined initial value. The subtractive selection scheme involves subtracting pre-specified amounts from a pre-defined initial value. The behavior changing scheme involves using sets of values which cause different known behaviors.

After the simulations are performed, the predicted consequences are then evaluated in module 2414 to determine their relative values based on certain criteria. In some scenarios, the relative values are determined based on whether or not certain actions, conditions or results are reflected by the predicted consequences. For example, if a predicted consequence indicates that one or more individuals will incur an injury as a result of performance of the corresponding behavior by the individual(s)/vehicle(s)/computing device(s)/network node(s), then that predicted consequence is deemed to have less value than the other predicted consequence(s) which indicate that no injuries will result from performance of the corresponding behavior by the individual(s)/vehicle(s)/computing device(s)/network node(s). If a predicted consequence indicates that a monetary profit will result from performance of the corresponding behavior by the individual(s)/vehicle(s)/computing device(s)/network node(s), then the predicted consequence is deemed to have a greater value than other predicted consequence(s) that indicate a monetary loss will result from performance of the corresponding behavior by the individual(s)/vehicle(s)/computing device(s)/network node(s). If the predicted consequence is more desirable to a given individual or entity, then the predicted consequence is deemed to have greater value than other predicted consequence which are less desirable to the given individual or entity. If the predicted consequence indicates that benefits will be bestowed on people or entities directly or indirectly involved in the situation, then the predicted consequence is deemed to have greater value than other predicted consequence which indicate that people/entities will not experience any benefits. One or more different factors can be considered when determining the relative values of predicted consequences. Accordingly, weights may be used to reflect the factors relative importance. For example, injury and/or equipment damage is weighted greater than monetary gain. The present solution is not limited to the particulars of this example.

As a result of the evaluation, each predicted consequence may be assigned a number representing its relative value. For example, a first predicted consequence is assigned a one and a second predicted consequence is assigned a five. These two numbers one and five indicate that the second predicted consequence has a greater value then the first predicted consequence. The present solution is not limited in this regard. At least one of the predicted consequences is selected based on the relative values thereof. For example, the predicted consequence with the greatest or lowest value is selected. The present solution is not limited to the particulars of this example.

In module 2416, a validation is made as to whether the selected predicted consequence of the simulation operations will likely achieve a desired or particular outcome (e.g., another occurrence of the stimuli or the resolution of system error/fault). A comparison function is employed here to make this validation. The comparison function involves comparing the parameters/factors/coefficients in the set associated with the selected predicted consequence with data stored in the existing knowledge data store and/or data represented by other simulation results to determine tolerances for each parameter/factor/coefficient and the selected predicted consequence. The existing knowledge data store includes information specifying previous actions taken by individuals, vehicles, computing device(s) and/or system nodes, information specifying the results from performing those actions, and/or information specifying values of parameters, factors and/or coefficients associated with the actions.

The operations of module 2418 involve interrupting operations of the ontogenesis engine 2400 when a particular stimuli and/or impingement action is detected. As a result of the interruption, at least one pre-programmed course of action is caused by module 2426 to be taken by the system and/or the simulation operations of 2414 are re-performed using different parameters/factors/coefficients selected in accordance with the context of the stimuli and/or impingement action. In the cyber maneuver applications, the pre-programmed courses of action can include, but are not limited to, performing system operations in accordance with a given original behavior model, CBM and/or mission plan, and/or performing system operations in accordance with a given modified behavior model, CBM and/or mission plan.

The operations of module 2420 involve determining which system actions from a set of allowable actions (determined from 2414 simulation(s)) should be performed in view of the selected predicted consequence. The set of allowable actions is computed in accordance with the following set theory equations. The set theory equations are illustrated herein in relation to a cyber maneuver system application. However, the present solution is not limited in this regard, and the set theory equations shown below can be modified in accordance with any application.

$S_{AA}$=set of allowable actions $\{S_{AA}\}=\{AA_1; \ldots ; AA_x\}$ as determined in the simulation operations of 2414.

If $P_{SA}=f(x) \cdot (N_A/|M_S|)$, $P_{SA}$ represents the probability of a successful attack on the network and is defined in U.S. patent application Ser. No. 15/362,936 (which is incorporated herein by reference in its entirety), $N_A$ represents the number of attacks, $M_S$ represents a size of maneuver space, $f(x)$ is a behavioral function, $f(x)Beh_D$ is a defensive behavioral functional, $f(x)Beh_O$ is an operational behavioral functional, and f(x)Beh$_I$ is an information gathering behavioral functional (e.g., like setting up a maneuverable shadow network), then $$\{S_{AAA}\}=S_{AAA}|\max| \text{ of } [100-(\text{Sim}f(x)(\text{Beh}_D)\cdot(N_A/|M_S|)+C_{MC}]|_{Tenet0}^{Tenetx},$$

$$\{S_{AAB}\}=S_{AAB}|\max| \text{ of } [\text{Sim}f(x)(\text{Beh}_O)\cdot(N_A/|M_S|)+C_{MC}]|_{Tenet0}^{Tenetx}, \text{ and}$$

$$\{S_{AAC}\}=S_{AAC}|\max| \text{ of } [\text{Sim}f(x)(\text{Beh}_I)\cdot(N_A/|M_S|)+C_{MC}]|_{Tenet0}^{Tenetx}.$$

Given the desired ontogenic knowledge, campaign goals, and/or contextual situational environment, the construction of emergent S0

$$EmergS0 = \begin{vmatrix} AA_A & \text{if } AA_A \geq AA_B \text{ and} \geq AA_C \\ AA_B & \text{if } AA_B \geq AA_A \text{ and} \geq AA_C \\ AA_C & \text{if } AA_C \geq AA_A \text{ and} \geq AA_B \end{vmatrix}.$$

However, given a particular growth of $C_{MC}$, the EmergS0 will grow over time in accordance with the following mathematical equation.

$$\text{EmergS0}=AA_{A1}+AA_{B1}+AA_{C1}, \text{ or some variant of some } f(x)[\{AA_{Ax}\}+\{AA_{Bx}\}+\{AA_{Cx}\}]$$

where $C_{MC}$ represents a mathematical time growth value (number) determined from historical data or ontogenic insight, or algorithms within a range of $\{0\leftrightarrow x\}$, where higher values represent a more mature or capable actor (of actions/behaviors against the system). Lower values are derived from historical data where an action (behavior) was successful against an opposing action (behavior from an actor). In the cyber maneuver applications, the system actions can include, but are not limited to, the modification of one or more behavior models, CBMs and/or mission plans. For example, the system action involves modifying which IDPs are to be changed during a given period of time. The present solution is not limited to the particulars of this example.

The operations of module 2422 involves analyzing the system action(s) to determine a confidence level that a given result will occur in view of the set of tolerances determined 2416 and a probability of success. In some scenarios, the confidence level is computed in accordance with the following mathematical equations.

$$CL=\{\max \text{ of } wn\}|_{wpn_I}^{w_x n_x}$$

$$P_C=f(x)\cdot CL$$

CL represents a confidence level which is optimized based on at least the tolerance values and existing knowledge of system past operations. $n_1, \ldots, n_x$ represent parameter/factor/coefficient values. $w_1$-$w_x$ represent weighting values selected based on the respective tolerances. $P_C$ represents a probability of success of the solutions being able to define and control the dynamic behavior within the defined operating envelop obtained from simulation operations. CL is determined against each simulation result using the respective tolerance values and existing knowledge of system past operations. If a set of confidence levels are above a threshold value and corresponding probabilities of successful system controls and behaviors are within an operating envelope, the system action(s) is passed to 2424. Otherwise, the system action(s) are discarded (e.g., deleted from memory, or remembered and not forwarded to another operation), and/or another iteration of 2408-2422 is performed using different parameters, factors and/or coefficients for the simulation.

The operations of module 2424 involves comparing the system action to the contents of a data store that specifies previously performed system actions and consequences thereof. The results of this comparing can provide insight into whether the system action might cause an unintended consequence which is not desirable, might cause an intended consequence which is desirable, and/or can be improved to obtain optimal consequences. If unintended consequences might occur, then a determination is made as to whether one or more ethical rules/policies and/or boundaries will still be met if the corresponding behavior is performed. The system action is not taken when the ethical rules/policies and/or boundaries will not be met. However, there are exceptions when the ethical rules/policies and/or boundaries are overridden (e.g., by an appropriate authority such as a law enforcement official). In contrast, the system action will be taken in 2426 when the ethical rules/policies and/or boundaries will still be met, and the actions and effects will be tracked over time. For example, the ontogenesis engine 2400 causes a behavior model, CBM and/or mission plan to be modified, as well as causes the system to perform operations in accordance with the modified behavior model, CBM and/or mission plan and/or causes the system to watch and measure the analytics according to U.S. patent Ser. No. 15/362,936 (which is incorporated herein by reference in its entirety). The present solution is not limited to the particulars of this example.

An after action analysis may optionally be performed in 2428 to validate the wisdom and store the data associated with the performed system action(s). Also, this after action analysis may occur over a given period of time.

The ontogenesis engine 2400 is comprised of ontogenesis memory objects, architecture components (e.g., interface(s) and service bus 2430 of FIG. 24), functions, and processes. Each module 2402-2426 is implemented by one or more of these listed components of the ontogenesis engine 2400.

An ontogenesis memory object comprises a storage space in a data store (e.g., a database or other memory) intended to keep permanently all related information about a concrete physical individual, vehicle, network node, or item. The ontogenesis memory object comprises a plurality of information segments arranged by topics. The topics are linked to each other in a mesh-like configuration, where the links represent respective associations between the topics. One or more of the topics may comprise sub-topics that are also linked to each other in a mesh-like configuration, where the links represent respective associations between the sub-topics. The information segments contained in the ontogenesis memory object can be static over time or dynamically change over time in accordance with a given application.

Figure 25:
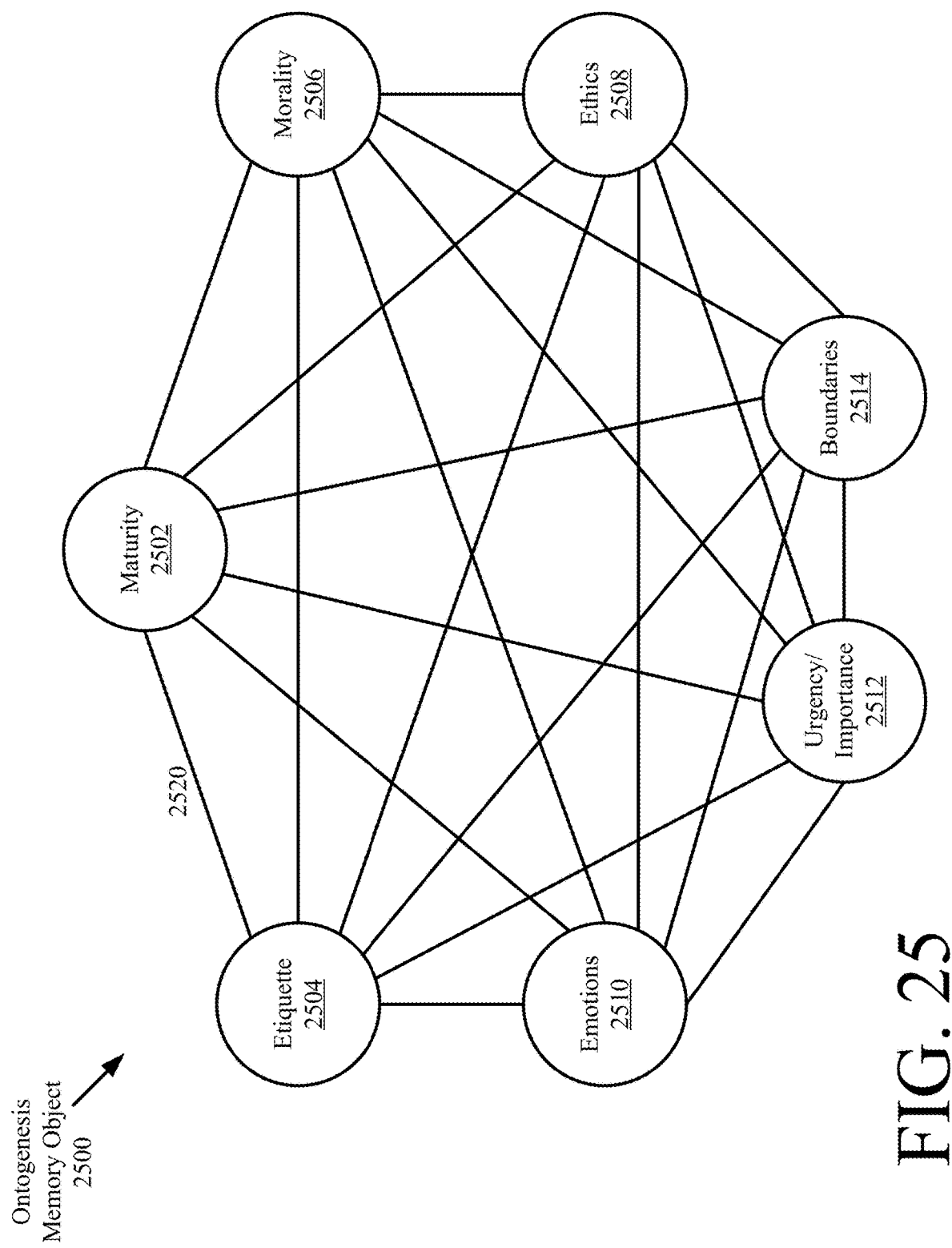
FIG. 25 provides an illustration of an illustrative architecture for an ontogenesis memory object.

For example, in the scenario shown in FIG. 25, an ontogenesis memory object 2500 for an individual includes information segments 2502-2514 arranged by topics in a mesh-like configuration. The mesh-like configuration comprises links 2520 that represent respective associations or relationships between the topics or information segments 2502-2514. The information segment 2502 includes information associated with the individual's maturity (e.g., lifespan, age, birth date, and/or reason for birth). The information segment 2504 includes information associated with the individual's or object's etiquette. The information segment 2506 includes information associated with the individual's or object's morality. The information segment 2508 includes information associated with the individual's or object's ethics. The information segment 2510 includes information associated with the individual's or object's emotions. The information segment 2512 includes information associated with the individual's urgency or importance. The information segment 2514 includes information associated with the individual's boundaries (e.g., physical, emotional, health, and safety). The present solution is not limited to the particulars of this example.

The functions comprise the operations that access, use, analyze and/or modify the ontogenesis memory objects to facilitate the generation and maintenance of knowledge. The functions can include, but are not limited to, health checks and status checks. Health and status checks are well known in the art, and therefore will not be described herein. Any known or to be known health check and/or status check can be used herein without limitation.

The functions also include maintenance operations to adjust or replace parameter values in accordance with given applications. The maintenance operations can involve: identifying system error(s) and/or fault(s); performing simulations using different sets of parameter values to generate predicted consequences; analyzing the predicted consequences to determine the respective values thereof; selecting the predicted consequence with the greatest or lowest value; and using the set of parameter values associated with the selected predicted consequence to adjust the system so as to resolve the system error(s) and/or fault(s). The system can be adjusted by modifying or replacing one or more parameter values with the parameter values in the set associated with the selected predicted consequence.

The functions further include planning operations to determine how often the health/status checks will be performed. The health/status checks may be performed in accordance with a pre-defined schedule, at pre-defined times (e.g., every 3 months), or in reaction to a given event. For example, the system notices a contextual change in the data. In response, the schedule for health/status checks is modified in accordance with the contextual change (e.g., changed from every three months to every week).

The functions include action operations that are performed based on the cognitive simulation outcome. The action can include, but is not limited to, changing other functions of the ontogenesis engine and/or changing one or more parameters of a CBM, behavior model, and/or mission plan. The action can be performed in accordance with a system described in U.S. Pat. No. 10,243,993. The contents of which are incorporated herein by references.

In some scenarios, a health/status/progress check is caused to be performed when such an action occurs within the system. The results of the check may include, but are not limited to, analytics or other metrics which can be used in subsequent maintenance operations and/or planning operations. The progress check can be performed in accordance with a system described in U.S. patent Ser. No. 15/362,936. The contents of which are incorporated herein by references.

The processes include the program code which causes simulation activities to be performed by the ontogenesis engine 2400. The program code can implement procedures defining ways of performing simulations. The procedures can include, but are not limited to, original operating procedures, standard operating procedures, if-then-else statement procedures, step-by-step processing procedures, parallel processing procedures, morphing procedures to add/subtract/change behaviors of individuals/vehicle/network node, and/or procedures for modifying behaviors of individuals/vehicle/network node. The program code can alternatively or additionally implement functions defining ways in which actions are to be performed. The functions can include, but are not limited to, operational pausing functions, back-up functions, flight/fight functions, sacrifice for greater good functions, growth/maturity functions, and/or vetting/adjusting CBMs for cyber maneuver systems.

Given the experimentations by Hicks and Henry & Rodgers, ontogenesis architectures and program code may also implement multiple architectures of parallel processing and complexity segmentation to maintain low response times.

Figure 26:
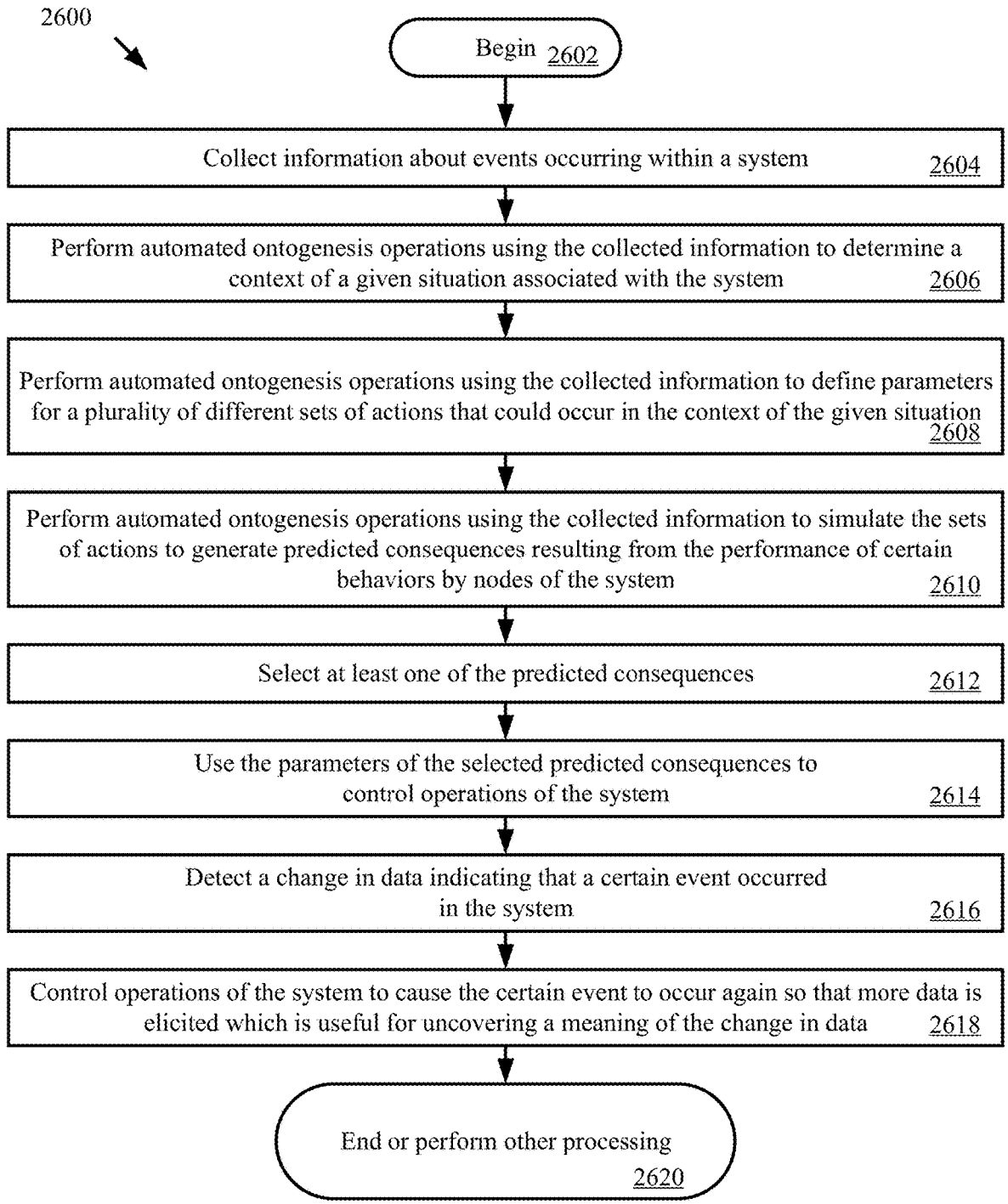
FIG. 26 provides a flow diagram of an illustrative method for operating a network system in accordance with the present solution.

Referring now to FIG. 26, there is provided a flow diagram of an illustrative method 2600 for operating a network system (e.g., system 100 of FIG. 1). Method 2600 begins with 2602 and continues with 2604 where information about events occurring in the network system is collected. In 2606-2610, automated ontogenesis operations are performed using the collected information to determine a context of a given situation associated with the network system, define parameters for a plurality of different sets of actions that could occur in the context of the given situation, and simulate the sets of actions to generate predicted consequences resulting from the performance of certain behaviors by network nodes of the network system. The context may be defined by identities of individuals or data objects associated with the situation, behaviors of the individuals or data objects associated with the situation, objective and/or aims of the individuals or data objects associated with the situation, identifies of vehicles associated with the situation, a purpose of vehicle operations, identifies of network nodes associated with the situation, behaviors of the network nodes, a purpose of network node operations, and means by which the situation was brought about.

Upon completing the automated ontogenesis operations, at least one of the predicted consequences is selected as shown by 2612. In some scenarios, the predicted consequence is selected by: determining relative values of the predicted consequences; and selecting a predicted consequence from the predicted consequences which has a greatest or lowest value of all the relative values. Alternatively or additionally, the predicted consequence is selected by: determining whether an intent of behavior associated with each of the predicted consequences is recognizable by an adversary; and selecting a predicted consequence from the predicted consequences with an intent of behavior that is unrecognizable by the adversary. In 2614, the parameters of the selected predicted consequence are used to control operations of the network system. In cyber maneuver applications, the network system is controlled to so that a CBM, behavior model and/or mission plan is modified.

In 2616, a change in data is detected. The change indicates that a certain event occurred in the network system. Operations of the network system are controlled in 2618 so as to cause the certain event to occur again so that more data is elicited which is useful for uncovering a meaning of the change in data. Subsequently, 2620 is performed where method 2600 ends or other processing is performed (e.g., return to 2604).

Ontogenesis Emergence and Confidence Engine(s)

Figure 27:
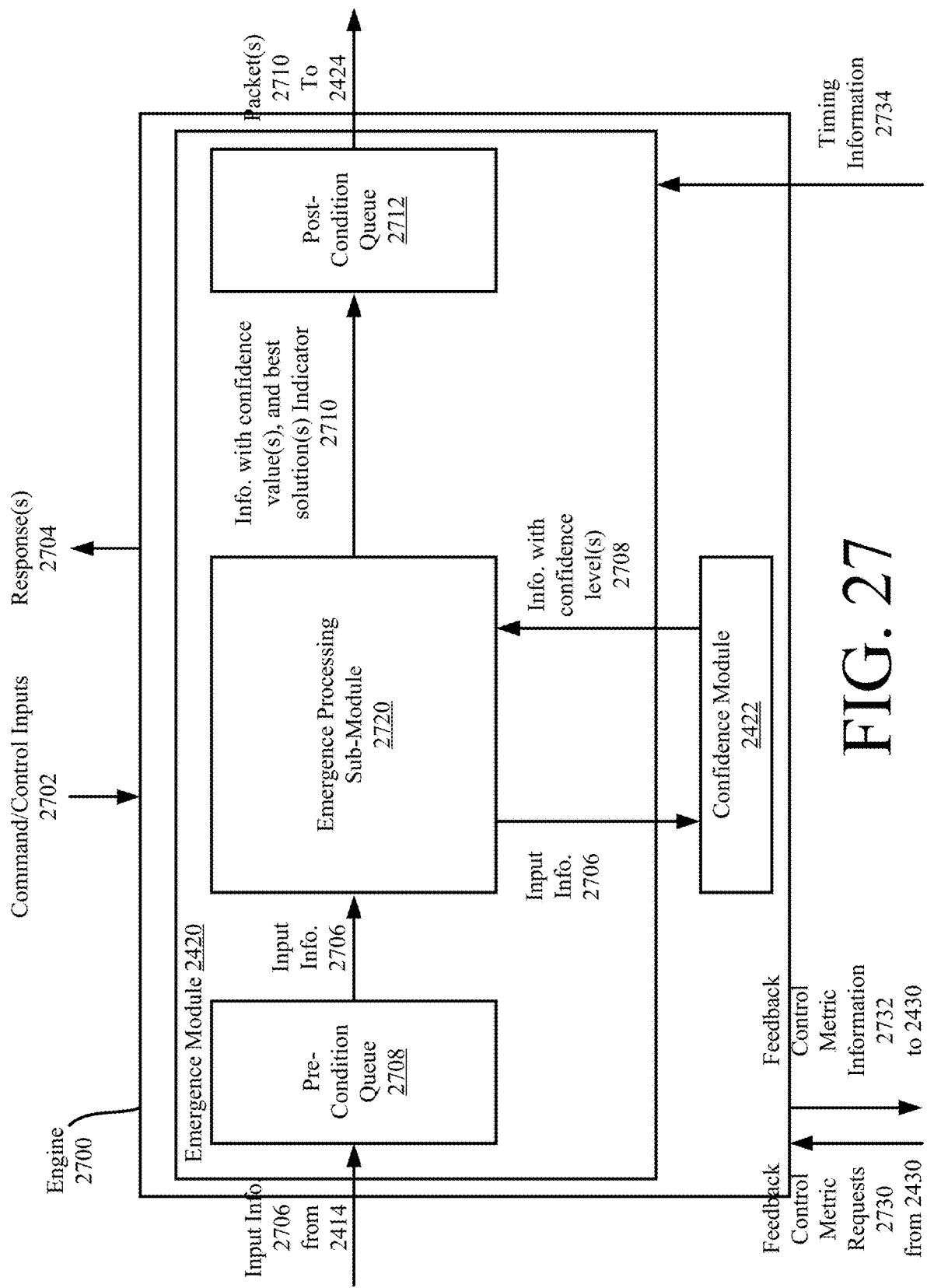
FIG. 27 is an illustration that is useful for understanding ontogenesis emergence and confidence operations.

Referring now to FIG. 27, there is provided an illustration that is useful for further understanding the ontogenesis emergence and confidence modules 2420, 2422 of FIG. 24. The modules 2420, 2422 can be implemented as a one or more engines 2700 executed and run by a single computing device (e.g., server), a plurality of computing devices in a distributed fashion, a grid computing system, a cloud computing system, a virtualization computing system, a hot failover computing system, and/or a threat tolerant computing system. Architectures for the listed computing systems are well known in the art, and therefore will not be described herein. One such architecture for a computing device is shown in FIG. 22. The modules 2420, 2422 may also be implemented in a back-up or redundant system.

As shown in FIG. 27, the engine(s) 2700 receive(s) command and control inputs 2702 from the main brain engine and provides responses 2704 to the same (e.g., acknowledgment messages and/or notifications of successful actions taken). The command and control inputs 2702 are provided to control operations and functioning of the engine 2700. The command and control inputs 2702 can include, but are not limited to, system functions, confidence engine processes, prioritization rules, and/or timing information. The command and control inputs 2702 can cause the engine(s) 2700 to: turn on; perform initialization operations (e.g., set parameter and/or memory values to zero); start receiving, queuing and processing information 2706 output from simulation module 2414; stop receiving, queuing and processing information output from the simulation module 2414; flush all data in memory, processing and queues; perform health checks; report results of health checks; to cleanup and discard any temporary, cache and log files; perform maintenance operations; schedule a function once an event has occurred (e.g., in reaction to an error condition); pro-actively schedule a function in advance; and/or turn off.

In some scenarios, engine 2700 comprises a primary engine for which there are one or more back-up secondary engines. Accordingly, a start processing command to a secondary engine can be triggered when the primary engine is not operating properly. The present solution is not limited to the particulars of this scenario.

In engine(s) 2700, there are points where new knowledge is created or knowledge is grown/matured via an additive process and/or a subtractive process. The new knowledge can come from, but is not limited to, the following.

New simulation result(s) and/or operating envelope(s) for a network node or system (e.g., a newly added network node and/or a new range for node or system operating parameters).

New relationship(s(and/or inference(s) specified within data.

New object(s) identified within the data and/or parameters about the new object(s), where the object comprises a device (e.g., a sensor), a measurement, and/or a command.

Once the new knowledge is created, a schema is updated and/or syntax checkers in the pre-condition queue 2708 and post-condition queue 2712 adapt to new knowledge. Additionally or alternatively, metrics and analytics could cause the boundary calculations and medians to be updated in view of the new knowledge. These adaptations within the system necessitate new levels or kinds of confidence(s) to new simulations and/or operating envelopes.

Given the ontogenetic creation and/or maturity of data objects, relationships, metrics, memory, processing, and functions that operate across the modules 2420, 2422, the engine(s) 2700 present(s) change in accordance with the following. Such changes can be made automatically by the system without any human input, or alternatively in accordance with human input.

The presentation of change comes from the processes and functions through calculations recognizing that data is new or grown and does not fit into the data object bounds or data schema/architecture. While change can be highlighted, ultimate changes to the system comes from positive human acknowledgment and/or automatically as knowledge is gained about the environments and behaviors. In some scenarios, the change(s) may come from within the system via at least one computer implemented check and balance operation (e.g., three or more voting schemes), and/or the change(s) may require human acknowledgement/approval prior to being implemented within the system.

Original Change—A new piece of knowledge or stimuli enters the system. This ripples thru the system with each engine, memory, f(x) processing, memory, and behavior outcomes, metrics, etc. recognizing and being updated to deal with the new data objects and the associated processing, storage, etc. The schemas are expanded, updated, grown, added to, subtracted, split, pruned, etc.

Morphing (or maturity based) Change—This is the process by which the system recognizes change and how the change needs to happen. In some cases, stimuli and events cause data objects, data structures, ontology, schemas, memory, processing to be outside of the "normal" operating envelope. Therefore, these items are adjusted upward/outward increasing the operating envelope—the items are "additive" in nature. The opposite is also possible, with the items being "subtractive" in nature. This is where, once the stimuli or object is measured and understood, those mentioned computer elements are (1) morphed in an additive or subtractive manner (e.g., a characteristic and/or parameter value is increased by a certain amount) or (2) discarded in a subtractive manner. An additive operation involves taking one data object and expanding at least one characteristic of the same by adding incremental values. A subtractive operation involves taking one data object and subtracting from another whereby a value increases, decreases or remains the same. A "True-False" test is used to validate that the knowledge has been created or grown enough to fit the new object. The "True-False" test analyzes changes to a given hierarchical tree classification scheme for an object (relative to an originating hierarchical tree classification scheme) using a plurality of measured characteristic and/or parameter values that are different from corresponding original characteristic and/or parameter values, where the different characteristic and/or parameter values are selected to fall within ranges (e.g., ±N from original to characteristic and/or parameter values) defined by rules used by the module 2412. In some scenarios, the ranges are defined by a minimum allowed amount of change within the system and/or a maximum allowed amount of change within the system. The variability of the values for the parameters falling within each range defines an elastic distance for system changes and/or an objective boundary for system changes. The "True-False" test also determines a rate of change associated with the plurality of measured characteristic and/or parameter values, and verifies that the rate of change falls within a given range of rate of change allowed for the hierarchical tree classification scheme. In some scenarios, a decision is made that the system is under attack by an adversary when the rate of change falls outside of the given rate of change allowed for the hierarchical tree classification scheme. Otherwise, the system is deemed to be operating in a proper, acceptable or allowable manner (i.e., the system is maturing).

The prioritization rules are the rules to be followed when (1) reading data from the pre-condition and post-condition queues 2708, 2712 and (2) processing the read data at the modules 2420, 2422. In some scenarios, high priority data is obtained from the pre-condition queue 2708 prior to low priority data. Accordingly, high priority data is processed by modules 2420, 2422 prior to low priority data. The goal of the priority rules is to prevent "priority inversion" (i.e., low priority data blocking high priority data from being processed in a timely manner because the low priority data was input into the pre-condition queue 2708 before the high priority data was input into the pre-condition queue 2708) and allow efficient well-formed priority processing. Analytics are generated and updated to measure priority tasking processing wait times based on prioritization. The analytics are used to apply for and harness additional resources when the established limits are approached (with a tolerance) or violated.

The engine(s) 2700 are provided feedback control metric requests 2730 from the main brain engine or other engine via service bus 2430. Metrics can be obtained in response to the requests. Feedback control metric information 2732 is then provided to the main brain engine or other engine via the service bus 2430. The metrics can include, but are not limited to, a number of input signals into the engine 2700, a number of solutions output from the engine 2700, and/or a time rate density ratio of the number of input signals into the engine 2700 to the number of solutions output from the engine 2700.

The engine(s) 2700 also receive timing information 2734 from a timing source. The timing information includes, but is not limited to, a day and/or a time. The timing information is used by engine(s) 2700 to set and/or synchronize operations with the operations of other modules 2402-2418, 2424 and/or 2426 of the ontogenesis engine 2400. The timing information is also used to set a timer (not shown) that can be used to provide timestamps for logging data.

During operations, the emergence module 2420 receives input information 2706 from the simulation module 2414 of FIG. 24. The input information can be generated by the simulation module 2414 when a choice is made that (a) the system is to perform one or more actions in view of a given situation or environment, (b) when a prediction is made that that an adversary is going to perform certain behavior(s) in a given situation or environment, and/or (c) a decision is made that the system is to perform one or more actions in view of a detected change in data or a pre-set/pre-programmed function.

The input information can be provided in any format supported by the system (e.g., system 100 of FIG. 1). In some scenarios, the input information is provided in a packet format. The packet(s) include(s), but is(are) not limited to, information specifying simulation results or solutions. The simulation results or solutions can include, but are not limited to, one or more sets of allowable system actions $S_{AA}$ that should be performed in view of selected predicted consequences associated with one or more particular stimuli and/or impingement actions. In the cyber maneuver applications, the system actions can include, but are not limited to, the modification of one or more behavior models, CBMs and/or mission plans. For example, the system action involves modifying which IDPs are to be changed during a given period of time. The present solution is not limited to the particulars of this example.

An illustration of an illustrative architecture for a packet 2900 including input information 2706 is provided in FIG. 29. Packet 2900 comprises a unique identifier 2902 identifying a set of simulation results or solutions. The unique identifier 2902 can include one or more numbers, one or more letters, and/or one or more symbols. Packet 2706 also includes metadata 2904 about the set of simulation results or solutions. The metadata 2904 includes, but is not limited to, information indicating whether the set includes a single simulation solution, information about an associated situational environment, information defining a proposed operational envelope, information specifying an associated stimuli and/or impingement action(s) which caused performance of the simulation operations, information identifying and/or defining one or more prioritization rules, timing information (e.g., a timestamp), and/or information describing a construction and/or processing efficiency of the engine(s) 2700. Packet 2900 further includes simulation result information 2906. This information specifies simulation results and/or simulations generated by simulation module 2414 of FIG. 24. Information 2906 can be expressed in any format (e.g., a graph theory map format, a reference-to-memory location format, or a database record format). The present solution is not limited to the particular packet architecture shown in FIG. 29.

Referring again to FIG. 27, the input information 2706 is passed to the pre-condition queue 2708. The pre-condition queue 2708 can be a multi-threaded queue. The pre-condition queue 2708 comprises blocks in a data store (e.g., a database or memory), linked list(s), and/or similar architecture. The input information is organized into buckets by the pre-condition queue 2708. The input information can be organized based on the simulation identifiers, the associated stimuli and/or the associated impingement action(s). For example, packets including simulation results or solutions of a first set generated during a first simulation process are organized into a first bucket, while packets including simulation results or solutions of a second different set generated during a second subsequent simulation process are organized into a second bucket. The present solution is not limited to the particulars of this example.

At the pre-condition queue 2708, the input information 2706 is processed to determine if certain pre-conditions are met. The pre-conditions can include, but are not limited to, a condition that the modules 2420, 2422 are turned on and operating properly, a condition that the input information is in a proper form for processing by the modules 2420, 2422, a condition that the pre-condition and post-condition queues 2708, 2712 are turned on and operating properly, a condition that the emergence processing sub-module 2720 is ready to receive data from the pre-condition queue 2708, a condition that prioritization rules are defined and/or met, and/or a condition that the simulation results or solutions were generated in a given period of time from a current time (e.g., time-to-live criteria).

If the pre-condition(s) is(are) met, then pre-condition queue 2708 notifies the emergence processing sub-module 2720 of this fact. In response to this notification, the emergence processing sub-module 2720 obtains input information from the pre-condition queue 2708. The input information can be obtained based on a first-in-first out schema, time stamp information, simulation priority information, a type of associated stimuli, and/or a type of associated impingement action(s).

The input information can include a plurality of packets (e.g., packets 2900 shown in FIG. 29) as discussed above. In this case, the packets of a given bucket or pointers to the packets of the given bucket are sequentially or simultaneously obtained from the pre-condition queue 2708. Accordingly, the simulation results or solutions specified in the packets are processed in a serial manner or in a parallel manner. In the serial case, the packets are obtained in accordance with the priorities of the simulation results or solutions specified therein. For example, a packet containing a simulation result or solution with a high priority level is obtained from the pre-condition queue 2708 prior to a packet containing a simulation result or solution with a low priority level. The present solution is not limited to the particulars of this example. The packets can be obtained from the precondition queue 2708 in accordance with any priority scheme selected in accordance with a given application.

The emergence processing sub-module 2720 then passes the obtained input information 2706 (e.g., packet) to the confidence module 2422. At the confidence module 2422, the input information is processed to assess a likelihood of successful outcome if the system action(s) defined by the simulation result or solution contained therein is(are) performed by the system. More particularly, the confidence module 2422 analyzing the system action(s) to determine a confidence level that a given result will occur in view of the set of tolerances determined 2416 and a probability of success. The confidence level may be computed as discussed above in relation to FIG. 24. Once a confidence level is computed, the confidence module 2422 provides information 2708 specifying the same to the emergence processing sub-module 2720.

In some scenarios, this information 2708 only includes information identifying the given simulation result/solution and information specifying the corresponding confidence level. In other scenarios, this information 2708 comprises the input information 2706 and additional confidence level information. For example, a packet including the input information 2706 is modified to include confidence level information. An illustration of an illustrative packet 3000 generated by and output from the confidence module 2422 is provided in FIG. 30. Packet 3000 includes items 2902-2906 of packet 2900 as well as confidence level information 3002. The confidence level information can include, but is not limited to, a numerical value indicating the likelihood or probability of achieving a successful or desired outcome if the system action(s) defined by the simulation results or solutions contained therein is(are) performed by the system. For example, a numerical value of one indicates that it is unlikely a successful outcome will occur if the system action(s) defined by the simulation result or solution contained therein is(are) performed by the system. In contrast, a numerical value of ten indicates that it is likely a successful outcome will occur if the system action(s) defined by the simulation result or solution contained therein is(are) performed by the system. The present solution is not limited in this regard.

The confidence level information for the simulation results/solutions of a given set are analyzed by the emergence processing sub-module 2720 to identify which simulation result/solution of the set has the best or most desirable confidence level associated therewith relative to the confidence levels of the other simulation results/solutions of the set. For example, there are three simulation results/solutions in a given set. A first simulation result/solution has a confidence level of two associated therewith. A second simulation result/solution has a confidence level of zero associated therewith. A third simulation result/solution has a confidence level of twenty associated therewith. The third simulation result/solution is identified as the simulation result/solution with the best or most desirable confidence level. The present solution is not limited in this regard. The best or most desirable simulation result/solution is identified in accordance with any ranking scheme. Thus in some cases, the first simulation result/solution is identified as the simulation result/solution with the best or most desirable confidence level as opposed to the third simulation result/solution.

Once the best or most desirable simulation result/solution is identified, the emergence processing sub-module 2720 determines whether there is a threshold value specified for the stimuli and/or impingement action(s) associated with the best or most desirable simulation result/solution. If a threshold value is specified, then the confidence level value for the best or most desirable simulation result/solution is compared to the threshold value. The emergence processing sub-module 2720 generates output information for the best or most desirable simulation result/solution when the confidence level value is less than, equal to or greater than the threshold value. The emergence processing sub-module 2720 then passes the output information (e.g., packet 3100 of FIG. 30) to the post-condition queue 2712. Otherwise, the set of simulation results/solutions are discarded and another iteration of operations performed by modules 2408-2422 of FIG. 24 are performed using different parameters, factors and/or coefficients for the simulation.

In contrast if a threshold value is not specified, then the emergence processing sub-module 2720 performs the following operations: notifies an individual that a threshold value is not specified for the present scenario; and/or waits a pre-defined period of time. If the individual provides a threshold value, then the emergence processing sub-module 2720 performs a comparison of the confidence level value to the threshold specified by the individual as described above. The emergence processing sub-module 2720 generates output information for the best or most desirable simulation result/solution when the confidence level value is less than, equal to or greater than the threshold value. The output information (e.g., packet 3100 of FIG. 30) is then passed from the emergence processing sub-module 2720 to the post-condition queue 2712. If pre-defined period of time expires and/or the individual did not provide a threshold value, then the emergence processing sub-module 2720 generates output information for the best or most desirable simulation result/solution. The output information (e.g., packet 3100 of FIG. 30) is then passed from the emergence processing sub-module 2720 to the post-condition queue 2712.

In some scenarios, the output information is generated by the emergence processing sub-module 2720 in a packet format. An illustration of an illustrative packet 3100 that is generated by the emergence processing sub-module 2720 is provided in FIG. 31. As shown in FIG. 31, the packet 3100 comprises the component 2901-2906 and 3002 of packet 3000. Packet 3100 additionally comprises a best solution indicator 3102. The best solution indicator can be a flag set to either a zero value or a one value. The present solution is not limited in this regard.

At the post-condition queue 2712, the output information is processed to determine if certain post-conditions are met. The post-conditions can include, but are not limited to, a condition that the output information is in a proper form for processing by a downstream module 2424 of the ontogenesis engine 2400, a condition that the downstream module 2424 is ready to receive data from the emergence module 2420, and/or a condition that prioritization rules are defined and/or met. If the post-condition(s) is(are) met, then post-condition queue 2712 notifies the downstream module 2424 of this fact and/or provides the output information to module 2424. Otherwise, the output information may be discarded.

Figure 28A:
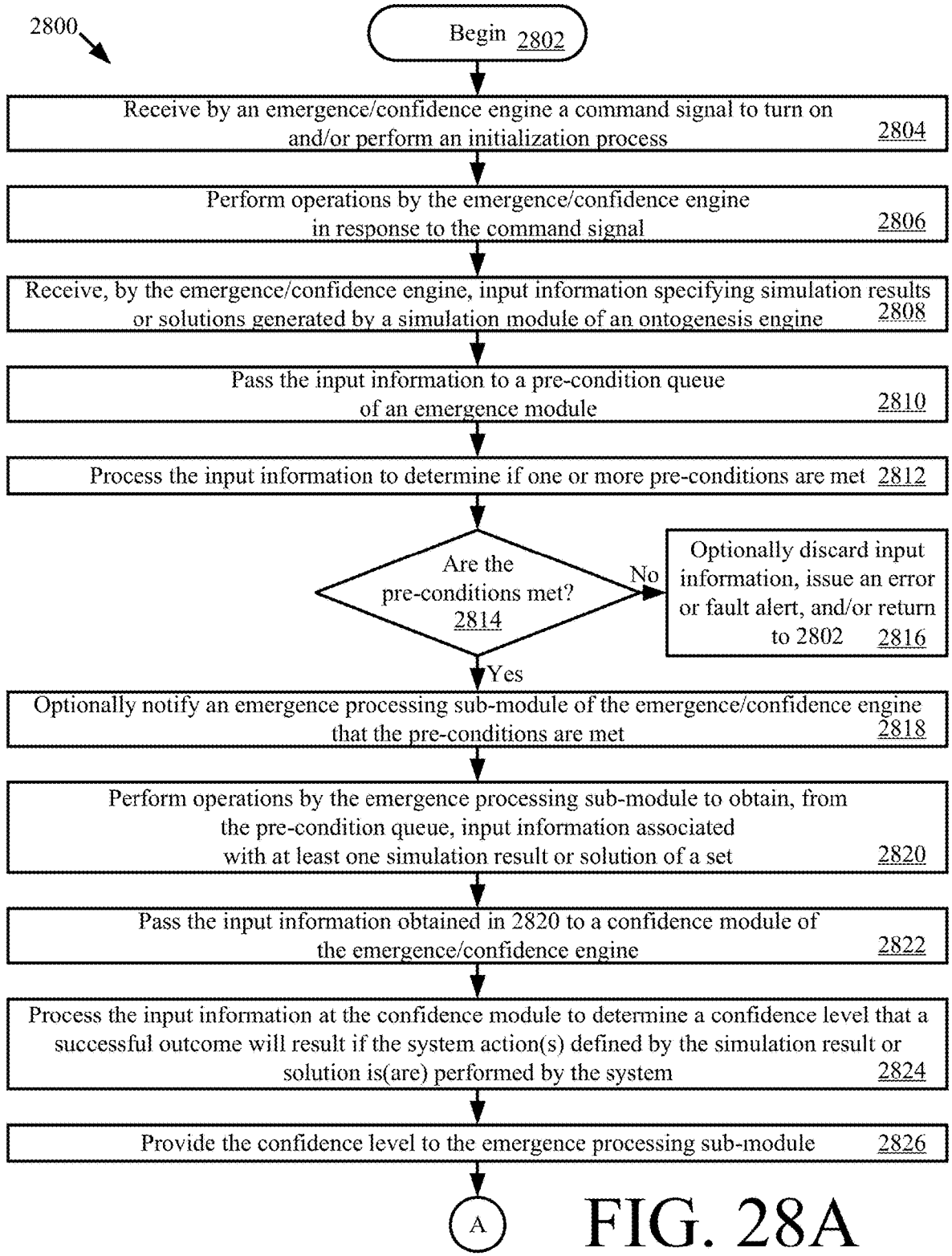
Figure 28C:
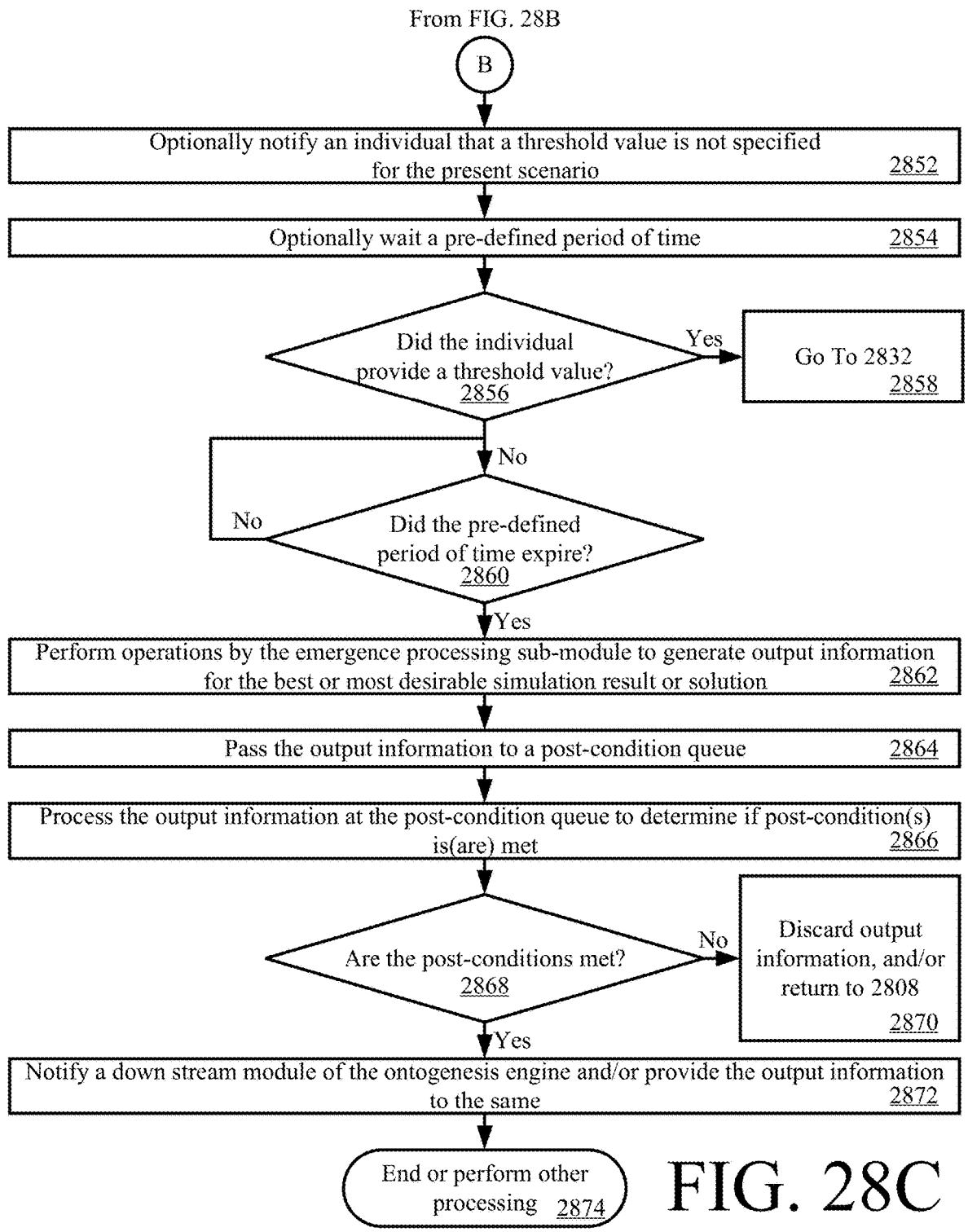

FIG. 28 is a flow diagram of a method 2800 for performing ontogenesis emergence and confidence operations. Method 2800 begins with 2802 and continues with 2804 where an emergence and confidence engine (e.g., engine 2700 of FIG. 27) receives a command signal (e.g., command signal 2702 of FIG. 27) to turn on and/or perform an initialization process. Initialization processes are well known, and therefore will not be described herein. Next in

2806, the emergence and confidence engine performs operations in response to the command signal. For example, the engine sets parameter values in memory to zero. The present solution is not limited to the particulars of this example.

In 2808, the emergence and confidence engine receives input information (e.g., input information 2706 of FIG. 27) specifying simulation results or solutions generated by a simulation module (e.g., module 2414 of FIG. 24) of an ontogenesis engine (e.g., ontogenesis engine 2400 of FIG. 24). The input information is passed to a pre-condition queue of an emergence module (e.g., emergence module 2420 of FIGS. 24 and 27). At the pre-condition queue, the input information is processed to determine if one or more certain pre-conditions are met as shown by 2814. The pre-conditions can include, but are not limited to, a condition that a particular module is turned on and operating properly, a condition that the input information is in a proper form for processing by a particular module, a condition that the emergence processing sub-module is ready to receive data from the pre-condition queue, a condition that prioritization rules are defined and/or met, and/or a condition that the simulation results or solutions were generated in a given period of time from a current time.

If the pre-condition(s) is(are) not met [2814:NO], then the input information is optionally discarded in 2816. An error or fault alert may also be issued in 2816. Additionally or alternatively, method 2800 returns to 2802.

In contrast, if the pre-condition(s) is(are) met [2814:YES], then an emergence processing sub-module (e.g., emergence processing sub-module 2720 of FIG. 27) is optionally notified that the pre-conditions are met as shown by 2818. In 2820, the emergence processing sub-module performs operations to obtain from the pre-condition queue input information associated with at least one simulation result or solution of a set. The input information obtained in 2820 is then passed to a confidence module (e.g., confidence module 2422 of FIGS. 24 and 27) of the emergence and confidence engine as shown by 2822. In 2824, the input information is processed at the confidence module to determine a confidence level that a successful or desired outcome will result if the system action(s) defined by the simulation result or solution is(are) performed by the system (e.g., system 100 of FIG. 1). The confidence level is provided to the emergence processing sub-module in 2826. Upon completing 2826, method 2800 continues with 2828 of FIG. 28B.

As shown in FIG. 28B, 2828 involves analyzing the confidence levels determined for the simulation results or solutions of the set to identify which simulation result or solution is associated with the best or most desirable confidence level. For example, the simulation result or solution with the highest or lowest confidence level value is considered the best or most desirable simulation result or solution. The present solution is not limited in this regard. Once the best or most desirable simulation result or solution is identified or selected, method 2800 continues with 2830 where a determination is made as to whether there is a threshold value specified for the stimuli or impingement action associated with the best or most desirable simulation result or solution.

If there is a threshold value [2830:YES], then method 2800 continues with 2832 where the confidence level value for the best or most desirable simulation result or solution is compared to the threshold value. If the confidence level value is less than the threshold value [2834:NO], then the set of simulation results or solutions is discarded in 2836. Another iteration of the simulation process may also be performed using different parameters, factors and/or coefficients for the simulation.

If the confidence level value is equal to or greater than the threshold value [2834:YES], then the emergence processing sub-module performs operations in 2838 to generate output information for the best or most desirable simulation result or solution. The output information is passed to a post-condition queue (e.g., post-condition queue 2712 of FIG. 27) in 2840. The output information is processed in 2842 by the post-condition queue to determine if one or more post-conditions are met. If the post-condition(s) is(are) not met [2844:NO], then the output information is discarded in 2846. Method 2800 may also return to 2808. If the post-condition(s) is(are) met [2844:YES], then a downstream module (e.g., module 2424 of FIG. 24) is notified in 2848. Additionally or alternatively, the output information is provided to the downstream module. Subsequently, 2850 is performed where method 2800 ends or other processing is performed (e.g., return to 2802 of FIG. 28A).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described scenarios. Rather, the scope of the present solution should be defined in accordance with the following claims and their equivalents.

We claim:

1. A method for controlling operations of a computer system, comprising:
    collecting, by at least one computing device of the computer system, information about events occurring in the computer system;
    performing annotated ontogenesis operations by the at least one computing device using the collected information to
        determine a context of a given situation associated with the computer system using a stored ontogenetic knowledge,
        define parameters for a plurality of different sets of actions that could occur in the context of the given situation, and
        simulate the sets of actions to generate a set of simulation results defining predicted consequences resulting from the performance of certain behaviors by nodes of the computer system;
    determining whether an intent of the behavior associated with each said predicted consequence is likely recognizable by a given entity;
    selecting the predicted consequence with intents of the behavior that are unlikely to be recognized by the given entity;
    determining a confidence value for each said simulation result that is associated with the selected predicted consequences, the confidence value indicating level of confidence that a successful outcome will result if one or more actions associated with the simulation result are performed by the computer system;

analyzing the confidence values to identify a simulation result of the set of simulation results that is associated with the best confidence level;
considering the identified simulation result as a best simulation result;
comparing the confidence value for the best simulation result to a threshold value specified for a stimuli or impingement action associated with the best simulation result; and
using the parameters associated with the best simulation result to optimize control and performance of the computer system based on results of the comparing.

2. The method according to claim 1, wherein the information that is collected by the at least one computing device specifies at least one of a new object, a new relationship between two or more objects, a new simulation result and a new operating parameter value for a network node or system.

3. The method according to claim 1, further comprising processing the set of simulation results to determine if one or more pre-conditions are met.

4. The method according to claim 1, further comprising determining whether the threshold value is specified for the stimuli or impingement action associated with the best simulation result, prior to said comparing.

5. The method according to claim 4, further comprising generating output information for the best simulation result when a determination is made that a threshold value is not specified for the stimuli or impingement action associated with the best simulation result.

6. The method according to claim 5, further comprising:
processing the output information to determine whether one or more post-conditions are met; and
discarding the output information is the one or more post-conditions are not met.

7. The method according to claim 5, wherein the output information is used to facilitate the control and optimization of the computer system operations.

8. The method according to claim 4, wherein the confidence value for the best simulation result is compared to the threshold value when a determination is made that the threshold value is specified for the stimuli or impingement action associated with the best simulation result.

9. The method according to claim 8, further comprising discarding the set of simulation results when the confidence value is less than the threshold value.

10. The method according to claim 8, further comprising generating output information for the best simulation result when the confidence level is equal to or greater than the threshold value.

11. The method according to claim 10, further comprising:
processing the output information to determine if one or more post-conditions are met; and
discarding the set of simulation results when a determination is made that the one or more post-conditions are not met.

12. The method according to claim 10, wherein the output information is used to facilitate the control of the computer system operations.

13. A system, comprising:
a processor;
a non-transitory computer-readable storage medium comprising programming instructions that are configured to cause the processor to implement a method for controlling operations of a computer system, wherein the programming instructions comprise instructions to:
collect information about events occurring in the computer system;
perform automated ontogenesis operations using the collected information to
determine a context of a given situation associated with the computer system using stored ontogenetic knowledge,
define parameters for a plurality of different sets of actions that could occur in the context of the given situation, and
simulate the sets of actions to generate a set of simulation results defining predicted consequences resulting from the performance of certain behavior by nodes of the computer system;
determine whether an intent of the behavior associated with each said predicted consequence is likely recognizable by a given entity;
select the predicted consequences with intents of the behavior that are unlikely to be recognized by the given entity;
determine a confidence value for each said simulation result that is associated with the selected predicted consequences, the confidence value indicating a level of confidence that a successful outcome will result if one or more actions associated with the simulation result are performed by the computer system;
analyze the confidence values to identify a simulation result of the set of simulation results that is associated with the best confidence level; and
consider the identified simulation result as a best simulation result;
compare the confidence value for the best simulation result to a threshold value specified for a stimuli or impingement action associated with the best simulation result; and
use the parameters associated with the best simulation result to optimize control and performance of the computer system based on results from comparing the confidence value for the best simulation result to the threshold value.

14. The system according to claim 13, wherein the information that is collected specifies at least one of a new object, a new relationship between two or more objects, a new simulation result and a new operating parameter value for a network node or system.

15. The system according to claim 13, wherein the programming instructions further comprise instructions to process the set of simulation results to determine if one or more pre-conditions are met.

16. The system according to claim 13, wherein the programming instructions further comprise instructions to determine whether the threshold value is specified for the stimuli or impingement action associated with the best simulation result.

17. The system according to claim 15, wherein the programming instructions further comprise instructions to generate output information for the best simulation result when a determination is made that a threshold value is not specified for a stimuli or impingement action associated with the best simulation result.

18. The system according to claim 17, wherein the programming instructions further comprise instructions to:
process the output information to determine whether one or more post-conditions are met; and
discard the output information is the one or more post-conditions are not met.

19. The system method according to claim 17, wherein the output information is used to facilitate the control and optimization of the computer system operations.

20. The system according to claim 15, wherein the confidence value for the best simulation result is compared to the threshold value when a determination is made that the threshold value is specified for the stimuli or impingement action associated with the best simulation result.

21. The system according to claim 20, wherein the programming instructions further comprise instructions to discard the set of simulation results when the confidence value is less than the threshold value.

22. The system according to claim 20, wherein the programming instructions further comprise instructions to generate output information for the best simulation result when the confidence level is equal to or greater than the threshold value.

23. The system according to claim 22, wherein the programming instructions further comprise instructions to:
   process the output information to determine if one or more post-conditions are met; and
   discard the set of simulation results when a determination is made that the one or more post-conditions are not met.

24. The system according to claim 22, wherein the output information is used to facilitate the control of the computer system operations.

* * * * *